United States Patent
Michael et al.

(10) Patent No.: US 11,005,594 B2
(45) Date of Patent: May 11, 2021

(54) TRANSMISSION APPARATUS, TRANSMISSION METHOD, RECEPTION APPARATUS, AND RECEPTION METHOD FOR FORWARD ERROR CORRECTION FRAME

(71) Applicant: SONY CORPORATION, Tokyo (JP)

(72) Inventors: Lachlan Bruce Michael, Saitama (JP); Kazuyuki Takahashi, Chiba (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 16/346,351

(22) PCT Filed: Dec. 1, 2017

(86) PCT No.: PCT/JP2017/043236
§ 371 (c)(1),
(2) Date: Apr. 30, 2019

(87) PCT Pub. No.: WO2018/110315
PCT Pub. Date: Jun. 21, 2018

(65) Prior Publication Data
US 2019/0280811 A1    Sep. 12, 2019

(30) Foreign Application Priority Data

Dec. 16, 2016  (JP) .............................. JP2016-244528
Jan. 31, 2017  (JP) .............................. JP2017-015418

(51) Int. Cl.
*H04L 1/00*    (2006.01)
*H04N 21/23*   (2011.01)
(Continued)

(52) U.S. Cl.
CPC .......... *H04L 1/0041* (2013.01); *H04H 20/95* (2013.01); *H04L 1/00* (2013.01); *H04L 69/22* (2013.01);
(Continued)

(58) Field of Classification Search
None
See application file for complete search history.

(56) References Cited

U.S. PATENT DOCUMENTS 9,130,769 B2 *  9/2015  Chapman ........... H04N 21/6168
9,608,770 B2 *  3/2017  Hwang ................. H04L 1/0061
(Continued)

FOREIGN PATENT DOCUMENTS

EP    2 362 650 A1    8/2011
JP    2014-96814 A    5/2014
(Continued)

OTHER PUBLICATIONS

Extended European Search Report dated Oct. 7, 2019 in Patent Application No. 17881865.4, citing documents AA-AE and AO therein, 9 pages.

(Continued)

*Primary Examiner* — Justin R Knapp
(74) *Attorney, Agent, or Firm* — Oblon, McClelland, Maier & Neustadt, L.L.P.

(57) ABSTRACT

The present technology relates to a transmission apparatus, a transmission method, a reception apparatus, and a reception method that allow for reliable notification of a start position of a transport packet or a transport stream during encapsulation of the transport packet or the transport stream in an error correction block.

The transmission apparatus generates an FEC block on the basis of an input packet or an input stream, generates an FEC frame on the basis of the FEC block, and sends the FEC frame. A header of the FEC block includes type identification information identifying a type of the input packet or the input stream, information detecting a header error, and a minimum fixed length header having start position information of the input packet or the input stream stored in a (Continued)

payload of the FEC frame. The present technology is applicable, for example, to data transport.

12 Claims, 66 Drawing Sheets

(51) Int. Cl.
  *H04H 20/95* (2008.01)
  *H04L 29/06* (2006.01)
  *H04N 21/235* (2011.01)
  *H04N 21/236* (2011.01)
(52) U.S. Cl.
  CPC ......... *H04N 21/235* (2013.01); *H04N 21/236* (2013.01); *H04N 21/23611* (2013.01)

(56) References Cited

U.S. PATENT DOCUMENTS

| 10,057,100 | B2* | 8/2018 | Hwang | ............... H04L 27/2649 |
| 2012/0327955 | A1 | 12/2012 | Herrmann et al. | |
| 2015/0036689 | A1 | 2/2015 | Hwang et al. | |
| 2015/0113584 | A1 | 4/2015 | Herrmann et al. | |
| 2016/0192033 | A1 | 6/2016 | Kitahara et al. | |
| 2016/0366251 | A1 | 12/2016 | Hwang et al. | |
| 2017/0094328 | A1 | 3/2017 | Herrmann et al. | |
| 2017/0188063 | A1 | 6/2017 | Takahashi et al. | |
| 2017/0223769 | A1 | 8/2017 | Takahashi et al. | |
| 2017/0279865 | A1 | 9/2017 | Iguchi et al. | |
| 2018/0278727 | A1 | 9/2018 | Hwang et al. | |

FOREIGN PATENT DOCUMENTS

| JP | 2015-61195 A | 3/2015 |
| JP | 2015-80029 A | 4/2015 |
| JP | 2016-116213 A | 6/2016 |
| JP | 2016-174299 A | 9/2016 |
| WO | WO 2015/072768 A1 | 5/2015 |
| WO | WO 2015/194395 A1 | 12/2015 |
| WO | WO 2016/098601 A1 | 6/2016 |

OTHER PUBLICATIONS

International Search Report dated Feb. 20, 2018 in PCT/JP2017/043236, citing documents AO-AV therein, 2 pages.

* cited by examiner

FIG. 4

- RESEARCH AND DEVELOPMENT BY MINISTRY OF INTERNAL AFFAIRS AND COMMUNICATIONS UNDERWAY REGARDING INCREASE IN SOPHISTICATION OF DOMESTIC DIGITAL TERRESTRIAL TELEVISION BROADCASTING
  - ✓ UNIQUE CODE AND UNIQUE MODULATION SCHEME (FDM) ARE ANTICIPATED
- TLV PACKET AS INPUT
  - ✓ VARIABLE LENGTH WITH IP PACKET INCLUDED
- NO PROPOSALS HAVE BEEN MADE AS TO HOW INPUT TLV PACKET IS ARRANGED IN AN FEC BLOCK

FIG. 5

① DURING ENCAPSULATION OF A TLV PACKET OF VARIABLE LENGTH IN AN FEC BLOCK, THE TLV PACKET MAY BE SPLIT INTO A PLURALITY OF FEC BLOCKS FOR ARRANGEMENT. THEREFORE, A START POSITION OF THE TLV PACKET MUST BE INDICATED.

② A SCHEME IS REQUIRED IN WHICH AN FEC BLOCK IS CONFIGURED EVEN WHEN THERE IS NO INPUT DATA.

③ IT IS DESIRABLE TO TRANSPORT NOT ONLY A TLV PACKET BUT ALSO A TS PACKET

④ IT IS DESIRABLE TO IMPROVE ROBUSTNESS OF AN FEC BLOCK HEADER

⑤ IT IS DESIRABLE TO PLACE A TLV PACKET INCLUDING NTP AT THE BEGINNING OF AN OFDM FRAME

FIG. 6

- ① IN ORDER TO INDICATE A START POSITION OF A TLV PACKET,
  → A POINTER IS USED THAT INDICATES THE START POSITION OF A FIRST TLV PACKET IN AN FEC BLOCK
- ② WHEN THERE IS NO INPUT DATA,
  → ALL THE FEC BLOCK FROM 1B IS PADDED IN THE FEC BLOCK
- ③ TO SEND A TS PACKET,
  → A FLAG IS USED THAT INDICATES A PACKET TYPE
- ④ TO RENDER THE FEC BLOCK HEADER MORE ROBUST
  → PLACE, IN THE FEC BLOCK HEADER, A Flag INDICATING WHETHER CRC IS PRESENT
  → PLACE CRC AFTER THE HEADER
- ⑤ PLACE Dummy cells AT THE END OF THE OFDM FRAME
  → THIS ALLOWS NTP TLV PACKET TO BE PLACED AT THE BEGINNING

FIG. 10

- 276480 BITS IN CODE LENGTH
- MAX CR = 14/16

→ MAX POINTER VALUE = 15 BITS

| CR | N_ldpc [bits] | N_bch [bits] | BCH [bits] | K_bch [bits] | K_bch [B] | Num Bits |
|---|---|---|---|---|---|---|
| 2/16 | 276480 | 34560 | 768 | 33792 | 4224 | 13 |
| 3/16 | 276480 | 51840 | 768 | 51072 | 6384 | 13 |
| 4/16 | 276480 | 69120 | 768 | 68352 | 8544 | 14 |
| 5/16 | 276480 | 86400 | 768 | 85632 | 10704 | 14 |
| 6/16 | 276480 | 103680 | 768 | 102912 | 12864 | 14 |
| 7/16 | 276480 | 120960 | 768 | 120192 | 15024 | 14 |
| 8/16 | 276480 | 138240 | 768 | 137472 | 17184 | 15 |
| 9/16 | 276480 | 155520 | 768 | 154752 | 19344 | 15 |
| 10/16 | 276480 | 172800 | 768 | 172032 | 21504 | 15 |
| 11/16 | 276480 | 190080 | 768 | 189312 | 23664 | 15 |
| 12/16 | 276480 | 207360 | 768 | 206592 | 25824 | 15 |
| 13/16 | 276480 | 224640 | 768 | 223872 | 27984 | 15 |
| 14/16 | 276480 | 241920 | 768 | 241152 | 30144 | 15 |

FEC BLOCK ← K_bch →

FIG. 12

- A PLURALITY OF FORMS ARE POSSIBLE
  - FORM 1 (SIMPLE)
    - 15 BITS FOR ALL IN CONSIDERATION OF MAX
  - FORM 2 (ASSUMING THERE IS NO Long CODE IN THE STANDARD)
    - 2-1: MAX LENGTH FOR EACH: 11 BITS
    - 2-2: MAX LENGTH FOR EACH: 13 BITS
  - FORM 3 (EMPHASIS PLACED ON EFFICIENCY ALTHOUGH Long CODE EXISTS IN THE STANDARD)
  - FORM 4 (Long CODE EXISTS IN THE STANDARD, AND POINTER EXPRESSED IN BITS)
  - OTHER DESIRED FUNCTIONS
    - Padding (IN THE CASE OF OTHER LAYER)
      - TLV PACKET IS AT LEAST 4B. THEREFORE, 1B TO 3B Padding IS NOT POSSIBLE.
      - LAYER VIOLATION (TLV LAYER MUST KNOW BBF LENGTH)
    - HEADER CRC
      - WHAT IS AVAILABLE CAN BE RELIABLY SAVED EVEN WHEN BCH CODING CANNOT BE PERFORMED PROPERLY

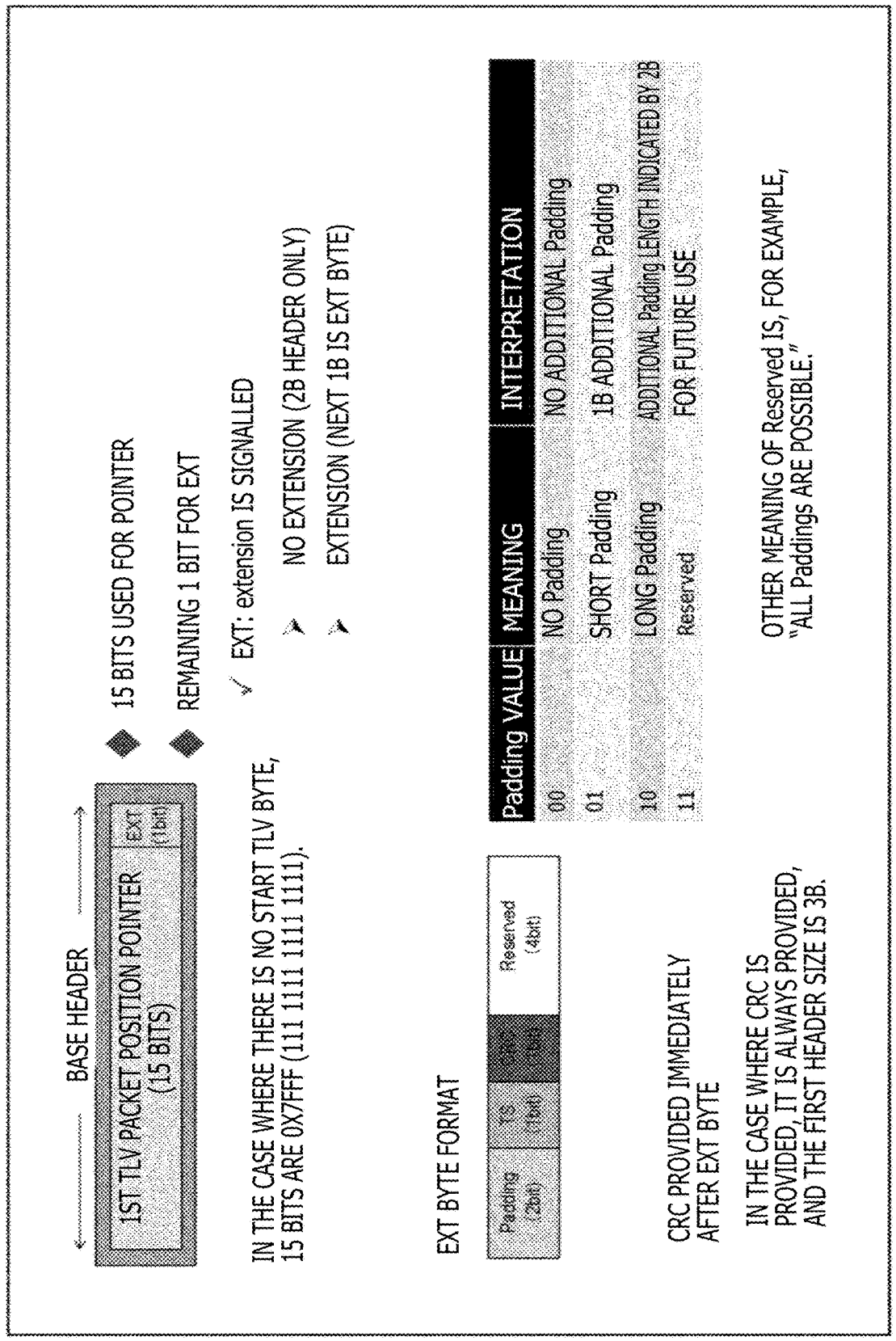

FIG. 25

1. NO Padding, EXT=1, TS=1

| 1ST TLV PACKET POSITION POINTER (13 BITS) | 00 | 1 | 00100000 |

2. Padding=2, EXT=1, TS=1

| 1ST TLV PACKET POSITION POINTER (13 BITS) | 01 | 1 | 00100000 | 00000000 |

1B Padding

3. Padding=2, EXT=1, TS=1

| 1ST TLV PACKET POSITION POINTER (13 BITS) | 10 | 1 | 00100000 | 00000000 | 00000000 |

←── Padding LENGTH ──→

4. Padding=3, EXT=0

| 1ST TLV PACKET POSITION POINTER (13 BITS) | 10 | 1 | 00100000 | 00000000 | 00000001 | 00000000 |

←── Padding LENGTH ──→

FIG. 31

BASEBAND FRAME SIZE (Middle)

| CR | N_ldpc [bits] | N_bch [bits] | BCH [bits] | K_bch [bits] | K_bch [B] | Num Bits |
|---|---|---|---|---|---|---|
| 2/16 | 69120 | 8640 | 192 | 8448 | 1056 | 11 |
| 3/16 | 69120 | 12960 | 192 | 12768 | 1596 | 11 |
| 4/16 | 69120 | 17280 | 192 | 17088 | 2136 | 12 |
| 5/16 | 69120 | 21600 | 192 | 21408 | 2676 | 12 |
| 6/16 | 69120 | 25920 | 192 | 25728 | 3216 | 12 |
| 7/16 | 69120 | 30240 | 192 | 30048 | 3756 | 12 |
| 8/16 | 69120 | 34560 | 192 | 34368 | 4296 | 13 |
| 9/16 | 69120 | 38880 | 192 | 38688 | 4836 | 13 |
| 10/16 | 69120 | 43200 | 192 | 43008 | 5376 | 13 |
| 11/16 | 69120 | 47520 | 192 | 47328 | 5916 | 13 |
| 12/16 | 69120 | 51840 | 192 | 51648 | 6456 | 13 |
| 13/16 | 69120 | 56160 | 192 | 55968 | 6996 | 13 |
| 14/16 | 69120 | 60480 | 192 | 60288 | 7536 | 13 |

FIG. 32

BASEBAND FRAME SIZE (Long)

| CR | N_ldpc [bits] | N_bch [bits] | BCH [bits] | K_bch [bits] | K_bch [B] | Num Bits |
|---|---|---|---|---|---|---|
| 2/16 | 276480 | 24560 | 768 | 33792 | 4224 | 13 |
| 3/16 | 276480 | 51840 | 768 | 51072 | 6384 | 13 |
| 4/16 | 276480 | 69120 | 768 | 68352 | 8544 | 14 |
| 5/16 | 276480 | 86400 | 768 | 85632 | 10704 | 14 |
| 6/16 | 276480 | 103680 | 768 | 102912 | 12864 | 14 |
| 7/16 | 276480 | 120960 | 768 | 120192 | 15024 | 14 |
| 8/16 | 276480 | 138240 | 768 | 137472 | 17184 | 15 |
| 9/16 | 276480 | 155520 | 768 | 154752 | 19344 | 15 |
| 10/16 | 276480 | 172800 | 768 | 172032 | 21504 | 15 |
| 11/16 | 276480 | 190080 | 768 | 189312 | 23664 | 15 |
| 12/16 | 276480 | 207360 | 768 | 206592 | 25824 | 15 |
| 13/16 | 276480 | 224640 | 768 | 223872 | 27984 | 15 |
| 14/16 | 276480 | 241920 | 768 | 241152 | 30144 | 15 |

FIG. 33

BASEBAND FRAME SIZE (Short)

| CR | N_ldpc [bits] | N_bch [bits] | BCH [bits] | K_bch [bits] | K_bch [B] | Num Bits |
|---|---|---|---|---|---|---|
| 2/16 | 17280 | 2160 | 168 | 1992 | 249 | 8 |
| 3/16 | 17280 | 3240 | 168 | 3072 | 384 | 9 |
| 4/16 | 17280 | 4320 | 168 | 4152 | 519 | 10 |
| 5/16 | 17280 | 5400 | 168 | 5232 | 654 | 10 |
| 6/16 | 17280 | 6480 | 168 | 6312 | 789 | 10 |
| 7/16 | 17280 | 7560 | 168 | 7392 | 924 | 10 |
| 8/16 | 17280 | 8640 | 168 | 8472 | 1059 | 11 |
| 9/16 | 17280 | 9720 | 168 | 9552 | 1194 | 11 |
| 10/16 | 17280 | 10800 | 168 | 10632 | 1329 | 11 |
| 11/16 | 17280 | 11880 | 168 | 11712 | 1464 | 11 |
| 12/16 | 17280 | 12960 | 168 | 12792 | 1599 | 11 |
| 13/16 | 17280 | 14040 | 168 | 13872 | 1734 | 11 |
| 14/16 | 17280 | 15120 | 168 | 14952 | 1869 | 11 |

FIG. 36

Padding VALUE IN FORM 1

| Padding VALUE | MEANING | INTERPRETATION |
|---|---|---|
| 00 | NO Padding | NO ADDITIONAL Padding |
| 01 | SHORT Padding | 1B ADDITIONAL Padding |
| 10 | LONG Padding | ADDITIONAL Padding LENGTH INDICATED BY 2B |
| 11 | Reserved | FOR FUTURE USE |

FIG. 38
DETAILED EXAMPLE 1 OF FORM 1
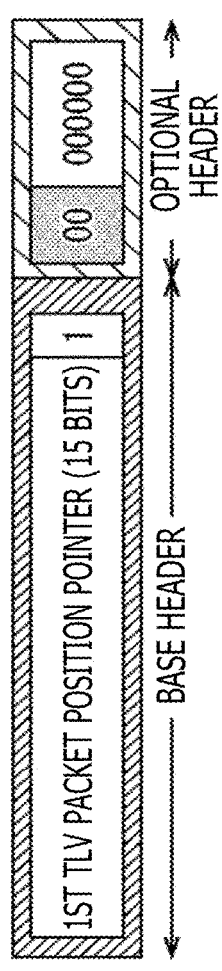
A  Padding=1, EXT=1, TS=0
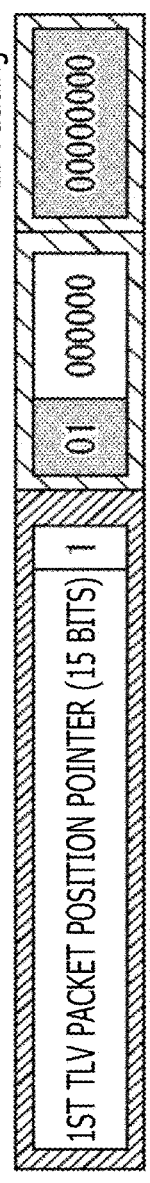
B  Padding=2, EXT=1, TS=0
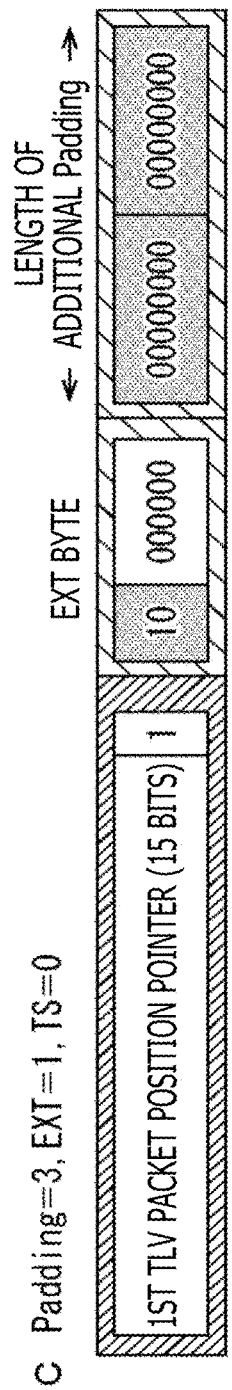
C  Padding=3, EXT=1, TS=0

FIG. 40
DETAILED EXAMPLE 2 OF FORM 1
A  Padding=1, EXT=1, TS=1
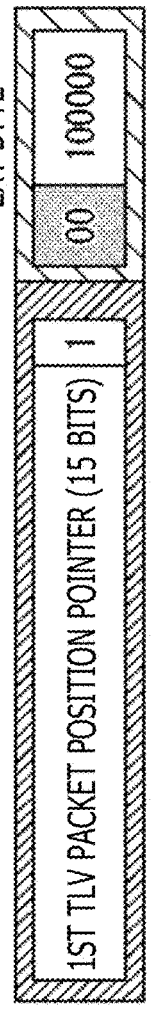
B  Padding=2, EXT=1, TS=1
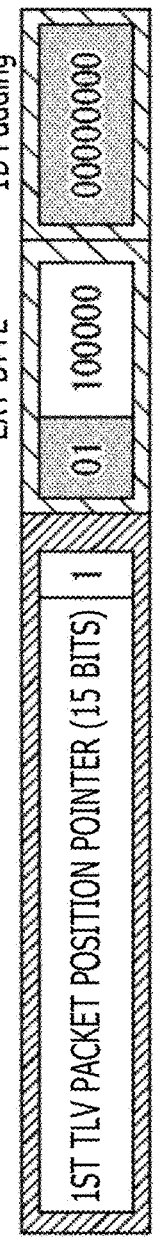
C  Padding=3, EXT=1, TS=1
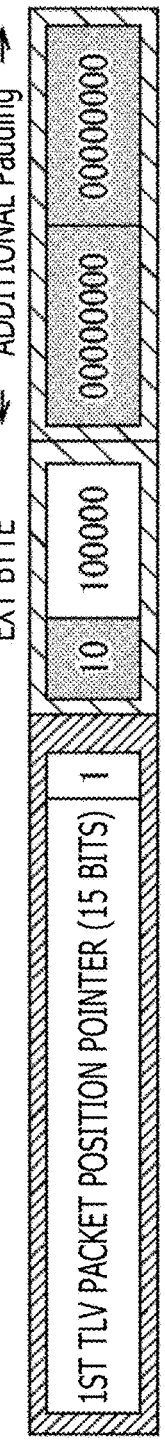

FIG. 42
DETAILED EXAMPLE 3 OF FORM 1
A  Padding=1, EXT=1, CRC=1
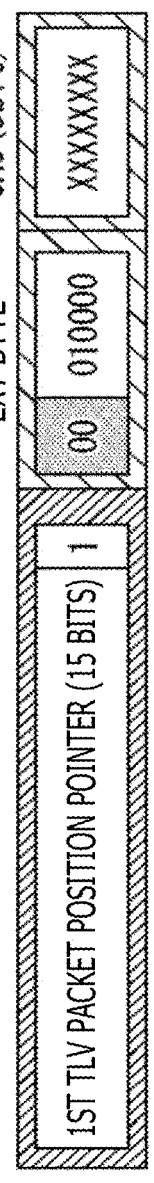
B  Padding=2, EXT=1, CRC=1
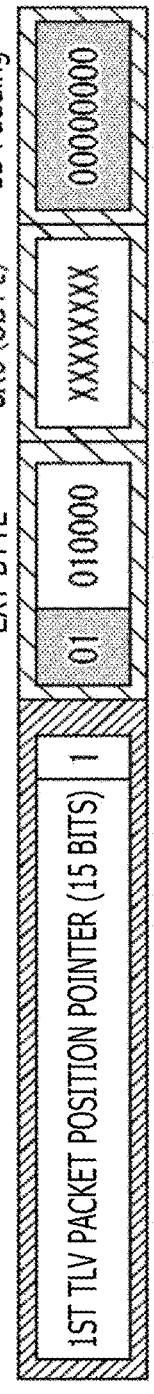
C  Padding=3, EXT=1, CRC=1
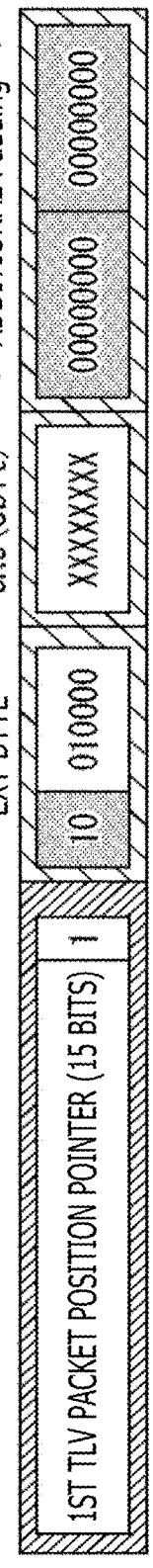

FIG. 45

Padding VALUE OF FORM 2-1

| Padding VALUE | MEANING | INTERPRETATION |
|---|---|---|
| 00 | NO Padding | NO ADDITIONAL Padding |
| 01 | SHORT Padding | 1B ADDITIONAL Padding |
| 10 | LONG Padding | ADDITIONAL Padding LENGTH INDICATED BY 2B |
| 11 | Reserved | FOR FUTURE USE |

FIG. 47

Padding VALUE OF FORM 2-2

| Padding VALUE | MEANING | INTERPRETATION |
|---|---|---|
| 00 | NO Padding | NO ADDITIONAL Padding |
| 01 | SHORT Padding | 1B ADDITIONAL Padding |
| 10 | LONG Padding | ADDITIONAL Padding LENGTH INDICATED BY 2B |
| 11 | Reserved | FOR FUTURE USE |

FIG. 50

Padding VALUE OF FORM 3

| Padding VALUE | MEANING | INTERPRETATION |
|---|---|---|
| 00 | NO Padding | NO ADDITIONAL Padding |
| 01 | SHORT Padding | 1B ADDITIONAL Padding |
| 10 | LONG Padding | ADDITIONAL Padding LENGTH INDICATED BY 2B |
| 11 | Reserved | FOR FUTURE USE |

FIG. 52

Padding VALUE OF FORM 3-1

| Padding VALUE | MEANING | INTERPRETATION |
|---|---|---|
| 00 | NO Padding | NO ADDITIONAL Padding |
| 01 | SHORT Padding | 1B ADDITIONAL Padding |
| 10 | LONG Padding | ADDITIONAL Padding LENGTH INDICATED BY 2B |
| 11 | Reserved | FOR FUTURE USE |

FIG.53

EXT BYTE FORMAT OF FORM 3-1

| LEN_MSB (2bit) | TS (1bit) | CRC (1bit) | Reserved (4bit) |
|---|---|---|---|

FIG. 54
DETAILED EXAMPLE 1 OF FORM 3-1
A  NO Padding, EXT=0
B  Padding=1, EXT=0
C  Padding=2, EXT=0
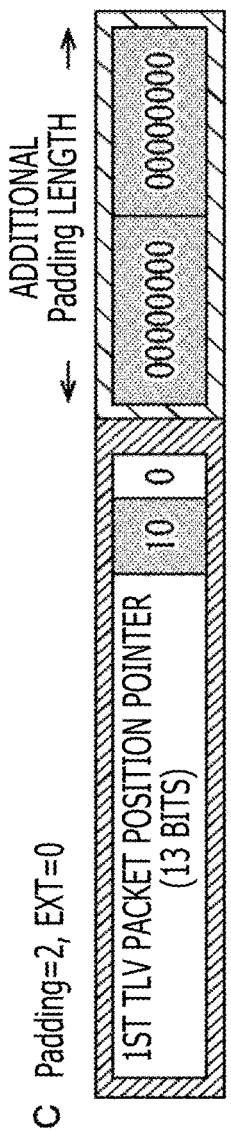

FIG. 57
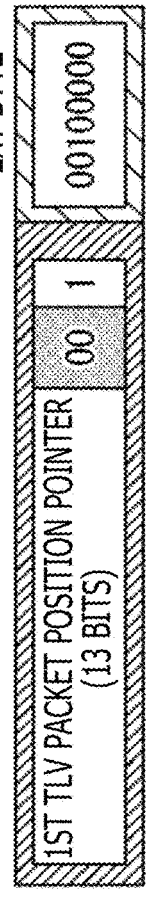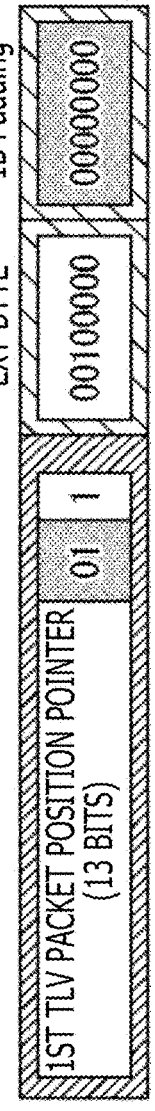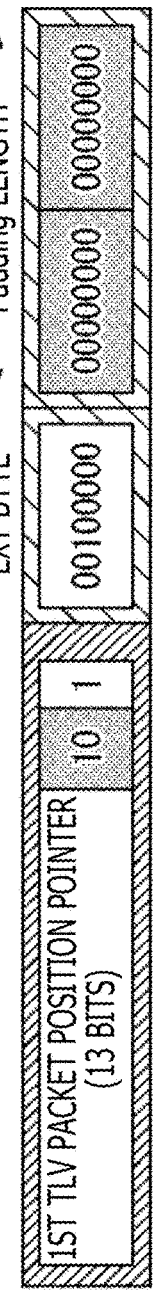

FIG. 59
DETAILED EXAMPLE 3 OF FORM 3-1
A  Padding=1, EXT=1, CRC=1
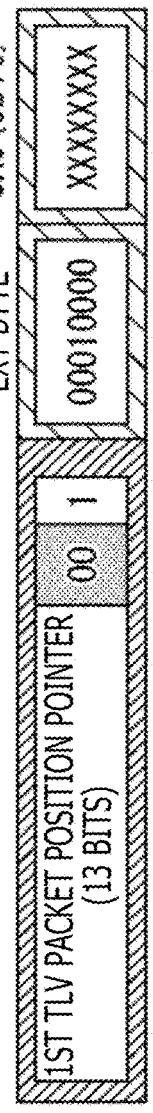
B  Padding=2, EXT=1, CRC=1
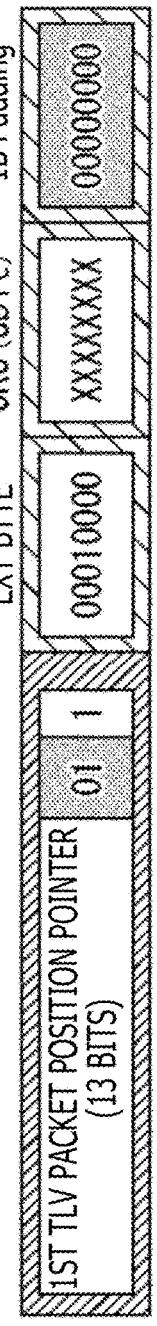
C  Padding=3, EXT=1, CRC=1

FIG. 63

Padding VALUE OF FORM 4

| Padding VALUE | MEANING | INTERPRETATION |
|---|---|---|
| 00 | NO Padding | NO ADDITIONAL Padding |
| 01 | SHORT Padding | 1B ADDITIONAL Padding |
| 10 | LONG Padding | ADDITIONAL Padding LENGTH INDICATED BY 2B |
| 11 | Reserved | FOR FUTURE USE |

TRANSMISSION APPARATUS, TRANSMISSION METHOD, RECEPTION APPARATUS, AND RECEPTION METHOD FOR FORWARD ERROR CORRECTION FRAME

TECHNICAL FIELD

The present technology relates to a transmission apparatus, a transmission method, a reception apparatus, and a reception method and relates, in particular, to a transmission apparatus, a transmission method, a reception apparatus, and a reception method that allow for reliable notification of a start position of a transport packet or a transport stream during encapsulation of the transport packet or the transport stream in an error correction block.

BACKGROUND ART

For example, ISDB-T (Integrated Services Digital Broadcasting-Terrestrial) adopted in Japan and other nations is available as a broadcasting scheme for digital terrestrial television broadcasting (refer, for example, to NPL 1).

Also, a TLV (Type Length Value) packet, a variable length packet, is known as a transport packet for transporting video and audio data (refer, for example, to NPL 2).

CITATION LIST

Non Patent Literature

[NPL 1]
ARIB STD-B31 Version 2.2, Association of Radio Industries and Businesses
[NPL 2]
ARIB STD-B31 Version 2.1, Association of Radio Industries and Businesses

SUMMARY

Technical Problem

Incidentally, increase in sophistication of digital terrestrial television broadcasting for its next generation is under study. In the next generation of digital terrestrial television broadcasting, data transport using a TLV packet is under study.

Here, a transport packet such as TLV packet and a transport stream are encapsulated in an error correction block such as FEC block first and then transported. However, a technological scheme for encapsulation of a transport packet or a transport stream in an error correction block has yet to be established. Therefore, proposals have been requested to reliably notify a start position of a transport packet or a transport stream during encapsulation of the transport packet or the transport stream in an error correction block.

The present technology has been devised in light of such circumstances, and it is an object of the present technology to reliably notify a start position of a transport packet or a transport stream during encapsulation of the transport packet or the transport stream in an error correction block.

Solution to Problem

A transmission apparatus of the present technology includes a first generation section, a second generation section, and a transmission section. The first generation section generates an FEC (Forward Error Correction) block on the basis of an input packet or an input stream. The second generation section generates an FEC frame on the basis of the FEC block. The transmission section transmits the FEC frame. A header of the FEC block includes type identification information identifying a type of the input packet or the input stream, information detecting a header error, and a minimum fixed length header having start position information of the input packet or the input stream stored in a payload of the FEC frame.

A transmission method of the present technology includes generating an FEC block on the basis of an input packet or an input stream, generating an FEC frame on the basis of the FEC block, and transmitting the FEC frame. A header of the FEC block includes type identification information identifying a type of the input packet or the input stream, information detecting a header error, and a minimum fixed length header having start position information of the input packet or the input stream stored in a payload of the FEC frame.

In the transmission apparatus and the transmission method of the present technology, an FEC block is generated on the basis of an input packet or an input stream, an FEC frame is generated on the basis of the FEC block, and the FEC frame is transmitted. A header of the FEC block includes type identification information identifying a type of the input packet or the input stream, information detecting a header error, and a minimum fixed length header having start position information of the input packet or the input stream stored in a payload of the FEC frame.

A reception apparatus of the present technology includes a reception section, a first generation section, and a second generation section. The reception section receives an incoming signal including an FEC frame. The first generation section generates an FEC block on the basis of the received FEC frame. The second generation section generates an input packet or an input stream on the basis of the FEC block. A header of the FEC block includes type identification information for identifying a type of the input packet or the input stream and a minimum fixed length header having start position information of the input packet or the input stream stored in a payload of the FEC frame.

A reception method of the present technology includes receiving an incoming signal including an FEC frame, generating an FEC block on the basis of the received FEC frame, and generating an input packet or an input stream on the basis of the FEC block. A header of the FEC block includes type identification information for identifying a type of the input packet or the input stream and a minimum fixed length header having start position information of the input packet or the input stream stored in a payload of the FEC frame.

In the reception apparatus and the reception method of the present technology, an incoming signal including an FEC frame is received, and an FEC block is generated on the basis of the received FEC frame. Then, an input packet or an input stream is generated on the basis of the FEC block. A header of the FEC block includes type identification information for identifying a type of the input packet or the input stream and a minimum fixed length header having start position information of the input packet or the input stream stored in a payload of the FEC frame.

Advantageous Effect of Invention

According to the present technology, it is possible to reliably notify a start position of a transport packet or a transport stream during encapsulation of the transport packet or the transport stream in an error correction block.

It should be noted that the effect described herein is not necessarily limited and may be any of the effects described in this disclosure.

BRIEF DESCRIPTION OF DRAWINGS

FIG. 4 is a diagram describing a backdrop relating to the present technology.

FIG. 5 is a diagram describing a problem solved by the present technology.

FIG. 6 is a diagram describing an overview of a method for solving the problem.

FIG. 10 is a diagram illustrating a second example of a baseband frame size.

FIG. 12 is a diagram describing an overview of a data form adopted in the present technology.

FIG. 13 is a diagram describing an example of a first data form adopted in the present technology.

FIG. 25 is a diagram describing an example of a third data form adopted in the present technology.

FIG. 31 is a diagram describing a maximum value of a first TLV packet position pointer in the case where a baseband frame size is a middle code.

FIG. 32 is a diagram describing a maximum value of a first TLV packet position pointer in the case where a baseband frame size is a long code.

FIG. 33 is a diagram describing a maximum value of a first TLV packet position pointer in the case where a baseband frame size is a short code.

FIG. 36 is a diagram illustrating examples of padding values in form 1.

FIG. 38 depicts diagrams illustrating detailed example 1 in form 1.

FIG. 40 depicts diagrams illustrating detailed example 2 in form 1.

FIG. 42 depicts diagrams illustrating detailed example 3 in form 1.

FIG. 45 is a diagram illustrating examples of padding values in form 2-1.

FIG. 47 is a diagram illustrating examples of padding values in form 2-2.

FIG. 50 is a diagram illustrating examples of padding values in form 3.

FIG. 52 is a diagram illustrating examples of padding values in form 3-1.

FIG. 53 is a diagram illustrating an example of an EXT byte format in form 3-1.

FIG. 54 depicts diagrams illustrating detailed example 1 in form 3-1.

FIG. 57 depicts diagrams illustrating detailed example 2 in form 3-1.

FIG. 59 depicts diagrams illustrating detailed example 3 in form 3-1.

FIG. 63 is a diagram illustrating examples of padding values in form 4.

DESCRIPTION OF EMBODIMENTS

A description will be given below of embodiments of the present technology with reference to drawings. It should be noted that the description will be given in the following order:
 1. System configuration
 2. Overview of the present technology
 3. Detailed contents of the present technology
 (3-1) First form
 (3-2) Second form
 (3-3) Third form
 (3-4) Fourth form
 4. Time information transmission timing of the present technology
 5. Operation on the transmitting and receiving sides
 6. Modification example
 7. Configuration of the computer

1. System Configuration (Configuration Example of the Transport System)

Figure 1:
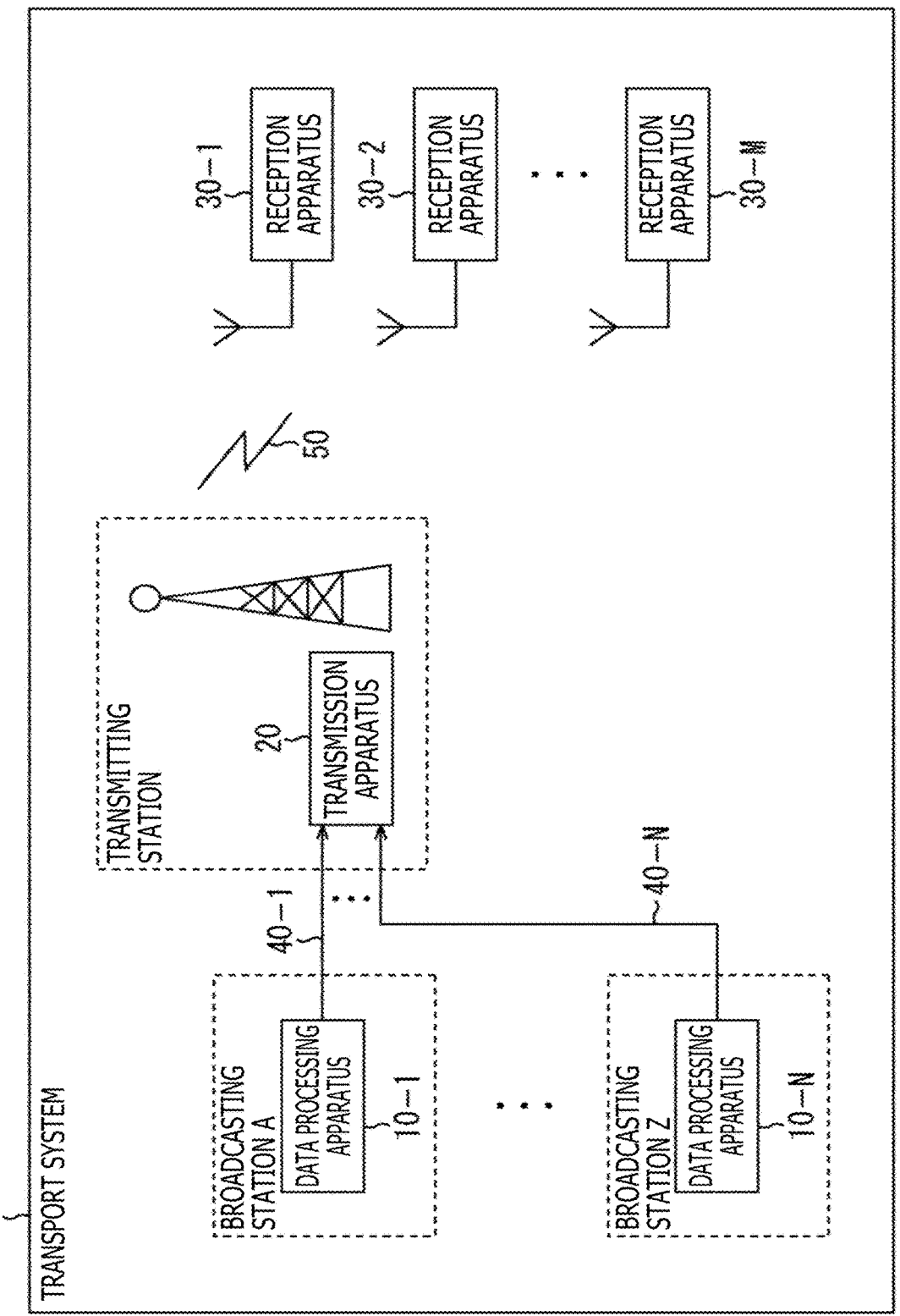
FIG. 1 is a block diagram illustrating a configuration of an embodiment of a transport system to which the present technology is applied.

FIG. 1 is a block diagram illustrating a configuration of an embodiment of a transport system to which the present technology is applied. It should be noted that a system refers to a logical set of a plurality of apparatuses.

In FIG. 1, a transport system 1 includes data processing apparatuses 10-1 to 10-N (where N is an integer equal to or larger than 1) installed in facilities related to respective broadcasting stations, a transmission apparatus 20 installed at a transmitting station, and reception apparatuses 30-1 to 30-M (where M is an integer equal to or larger than 1) owned by users.

Also, in the transport system 1, the data processing apparatuses 10-1 to 10-N are connected to the transmission apparatus 20 via communication lines 40-1 to 40-N. It should be noted that leased lines, for example, can be used as the communication lines 40-1 to 40-N.

The data processing apparatus 10-1 processes content such as broadcast program produced by a broadcasting station A and transmits data to be transported acquired as a result thereof to the transmission apparatus 20 via the communication line 40-1.

In the data processing apparatuses 10-2 to 10-N, content such as broadcast programs produced by broadcasting stations B to Z is processed, and data to be transported acquired as a result thereof is sent to the transmission apparatus 20 via the communication lines 40-2 to 40-N as in the data processing apparatus 10-1.

The transmission apparatus 20 receives transported data sent from the data processing apparatuses 10-1 to 10-N on the side of the broadcasting stations via the communication lines 40-1 to 40-N. The transmission apparatus 20 processes transported data from the data processing apparatuses 10-1 to 10-N and transmits a broadcast signal acquired as a result thereof from a transmitting antenna installed at the transmitting station.

This allows the broadcast signal from the transmission apparatus 20 on the side of the transmitting station to be sent to the reception apparatuses 30-1 to 30-M via a broadcast transport channel 50.

The reception apparatuses 30-1 to 30-M are stationary receivers such as television (TV) receivers, set top boxes (STBs), recorders, gaming consoles, and network storages or mobile receivers such as smartphones, mobile phones, and tablet computers. Also, the reception apparatuses 30-1 to 30-M may be vehicle-mounted equipment mounted to vehicles such as vehicle-mounted TV receivers or wearable computers such as head-mounted displays (HMDs).

The reception apparatus 30-1 reproduces content such as broadcast program corresponding to tuning operation performed by a user by receiving a broadcast signal sent from the transmission apparatus 20 and processing the signal via the broadcast transport channel 50.

In the reception apparatuses 30-2 to 30-M, a broadcast signal from the transmission apparatus 20 is processed, and content corresponding to tuning operation performed by a user is reproduced as in the reception apparatus 30-1.

It should be noted that, in the transport system 1, the broadcast transport channel 50 may be not only terrestrial (terrestrial broadcasting) but also, for example, satellite broadcasting using a broadcasting satellite (BS) or a communications satellite or wired broadcasting using cables (CATV: Common Antenna Television).

Also, in the transport system 1, although not illustrated, various servers may be connected to a communication line such as the Internet so that the reception apparatuses 30-1 to 30-M having a communication function can receive various pieces of data such as content and applications by accessing the various servers for bidirectional communication.

It should be noted that in the case where there is no particular need to distinguish between the data processing apparatuses 10-1 to 10-N on the side of the broadcasting stations, the data processing apparatuses 10-1 to 10-N will be referred to as the data processing apparatuses 10. Also, in the case where there is no particular need to distinguish between the reception apparatuses 30-1 to 30-M, the reception apparatuses 30-1 to 30-M will be referred to as the reception apparatuses 30.

(Configurations of the Apparatuses on the Transmitting Side)

Figure 2:
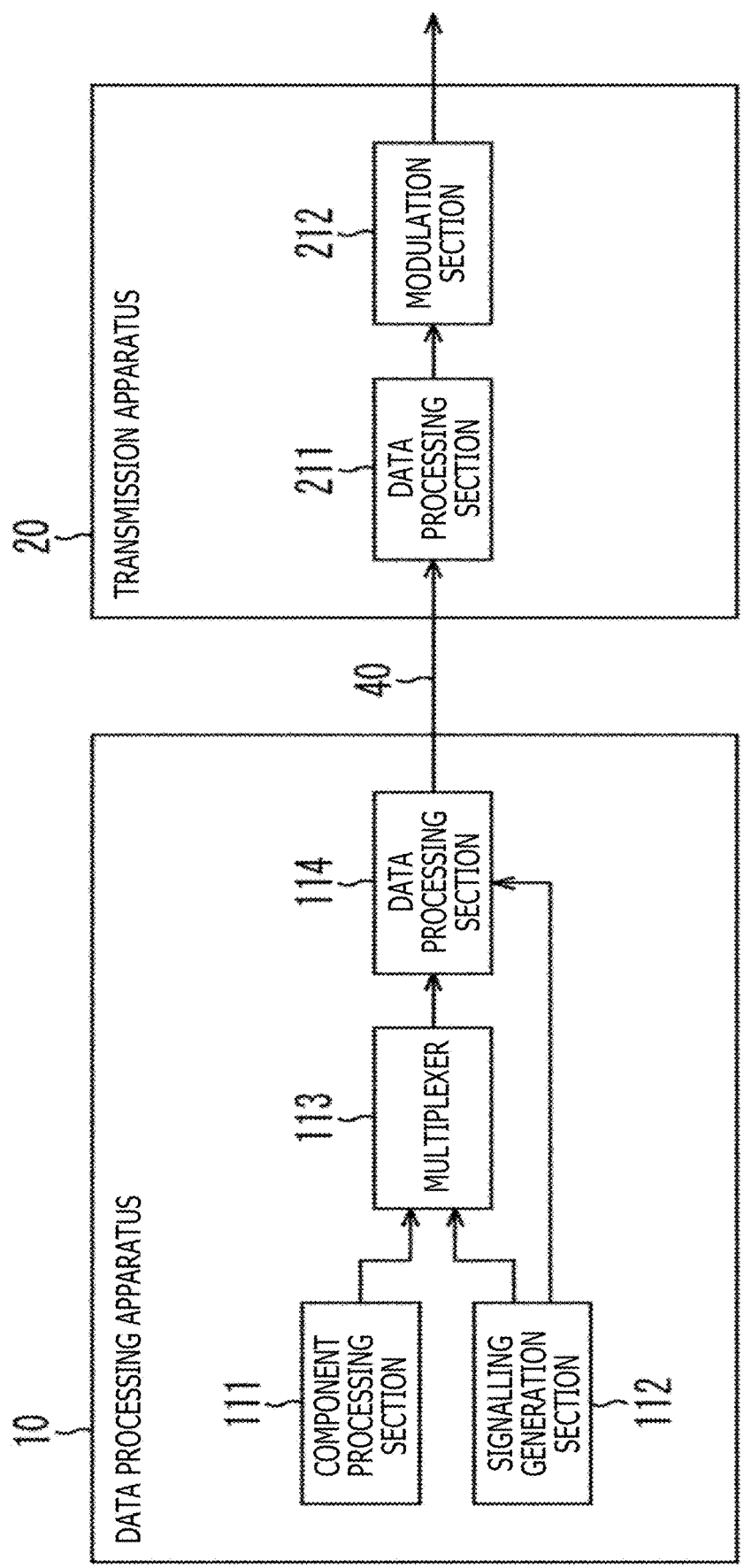
FIG. 2 is a block diagram illustrating configuration examples of a data processing apparatus and a transmission apparatus.

FIG. 2 is a block diagram illustrating a configuration example of the data processing apparatus 10 and the transmission apparatus 20 illustrated in FIG. 1.

In FIG. 2, the data processing apparatus 10 includes a component processing section 111, a signalling generation section 112, a multiplexer 113, and a data processing section 114.

The component processing section 111 processes component data included in content such as broadcast programs and supplies a component stream acquired as a result thereof to the multiplexer 113. Here, component data is video, audio, subtitle, and other data, and a coding process compliant with a given coding scheme or other process, for example, is performed on these pieces of data.

The signalling generation section 112 generates signalling used for upper layer processes such as content tuning and reproduction and supplies signalling to the multiplexer 113. Also, the signalling generation section 112 generates signalling used for physical layer processes such as modulation and demodulation of broadcast signal and supplies signalling to the data processing section 114.

It should be noted that signalling is also referred to as control information. Also, in the description given below, of signalling, that used for the processes in the physical layer will be referred to as physical layer signalling (L1 signalling), and that used for processes in upper layers above the physical layer will be referred to as upper layer signalling for distinction.

The multiplexer 113 multiplexes a component stream supplied from the component processing section 111 and an upper layer signalling stream supplied from the signalling generation section 112 and supplies the stream acquired as a result thereof to the data processing section 114. It should be noted here that other streams such as application or time information may be multiplexed.

The data processing section 114 processes the stream supplied from the multiplexer 113 and generates a packet (frame) in a given form. Also, the data processing section 114 generates data to be transported by processing the packet in the given form and physical layer signalling from the signalling generation section 112 and transmits the data to be transported to the transmission apparatus 20 via the communication line 40.

In FIG. 2, the transmission apparatus 20 includes a data processing section 211 and a modulation section 212.

The data processing section 211 receives and processes the transported data sent from the data processing apparatus 10 via the communication line 40 and extracts the packet (frame) in the given form and physical layer signalling information acquired as a result thereof.

The data processing section 211 generates a physical layer frame compliant with a given broadcasting scheme (e.g., next-generation digital terrestrial television broadcasting) (physical layer frame) by processing the packet (frame) in the given form and physical layer signalling information and supplies the physical layer frame to the modulation section 212.

It should be noted that although a description has been given in relation to the configuration illustrated in FIG. 2 assuming that physical layer signalling is generated on the side of the data processing apparatuses 10 and sent to the transmission apparatus 20, physical layer signalling may be generated on the side of the transmission apparatus 20.

The modulation section 212 performs a necessary process (e.g., modulation process) on the physical layer frame supplied from the data processing section 211 and transmits a broadcast signal (RF signal) acquired as a result thereof from the transmitting antenna installed at the transmitting station.

The data processing apparatuses 10 and the transmission apparatus 20 are configured as described above.

(Configuration of the Apparatuses on the Receiving Side)

Figure 3:
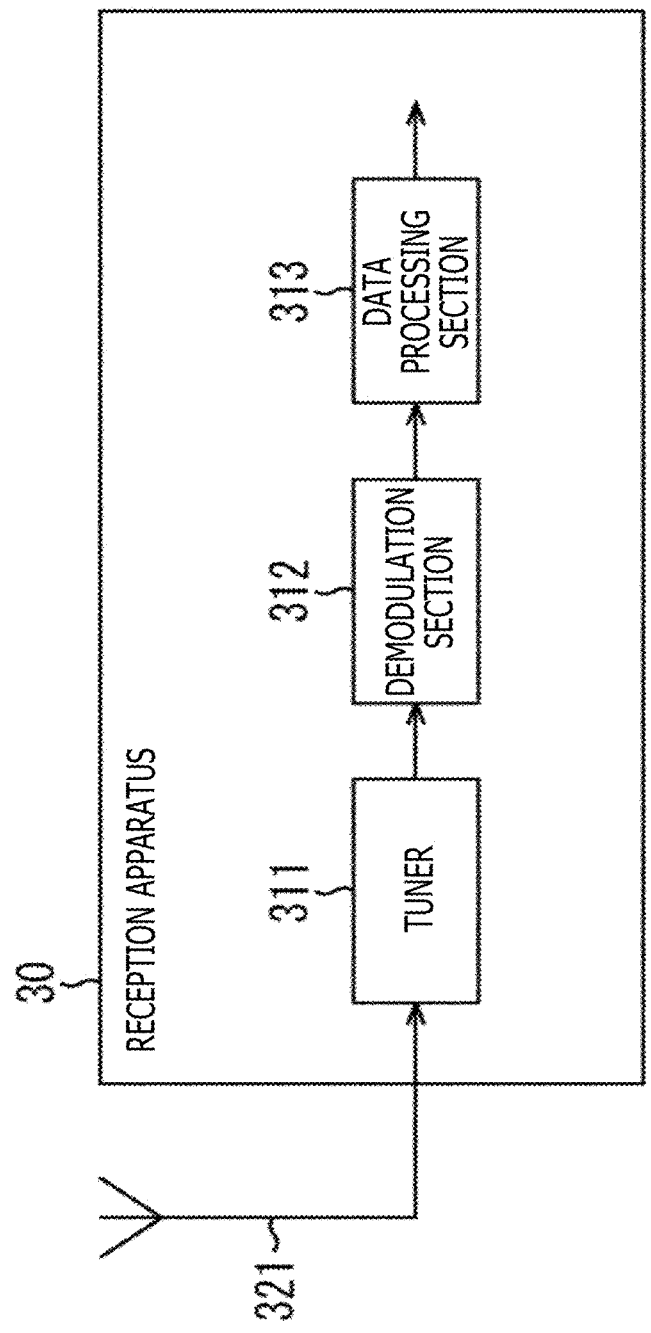
FIG. 3 is a block diagram illustrating a configuration example of a reception apparatus.

FIG. 3 is a block diagram illustrating a configuration example of the reception apparatus 30 illustrated in FIG. 1.

In FIG. 3, the reception apparatus 30 includes a tuner 311, a demodulation section 312, and a data processing section 313.

The tuner 311 performs a necessary process on the broadcast signal (RF signal) received via an antenna 321 and supplies the signal acquired as a result thereof to the demodulation section 312.

The demodulation section 312 is configured, for example, as a demodulator such as demodulating LSI (Large Scale Integration). The demodulation section 312 performs a demodulation process on the signal supplied from the tuner 311. In this demodulation process, for example, a physical layer frame is processed, for example, in accordance with physical layer signalling, and a packet in a given form is acquired. The packet acquired as a result of this demodulation is supplied to the data processing section 313.

The data processing section 313 is configured, for example, as a system-on-chip (SoC). The data processing section 313 performs given processes on the packet supplied from the demodulation section 312. Here, for example, stream decoding and reproduction processes are performed on the basis of upper layer signalling acquired from the packet.

Video, audio, subtitle, and other data acquired by the processes performed by the data processing section 313 is output to circuits at later stages. This allows content such as broadcast programs to be reproduced and video and audio thereof to be output by the reception apparatuses 30.

The reception apparatuses 30 are configured as described above.

2. Overview of the Present Technology

The transmission apparatus 20 and the reception apparatuses 30 have the following functions:

That is, the transmission apparatus 20 includes a first generation section, a second generation section, and a transmission section. The first generation section generates an FEC (Forward Error Correction) block on the basis of an input packet or an input stream. The second generation section generates an FEC frame on the basis of the FEC block. The transmission section transmits the FEC frame.

A header of the FEC block includes type identification information for identifying a type of the input packet or the input stream and a minimum fixed length header having start position information of the input packet or the input stream stored in a payload of the FEC frame.

In the case where the type identification information is a TLV (Type Length Value) packet, the minimum fixed length header includes minimum fixed length identification information and a minimum input packet length. The minimum fixed length identification information is used to identify whether or not an input packet length of an input packet is a minimum fixed length. The minimum input packet length is information regarding the input packet length.

In the case where the minimum fixed length identification information indicates that the input packet length is not the minimum fixed length, the header includes not only the minimum fixed length header but also a variable length header. When lower bits of the input packet length are minimum input packet length information indicating the minimum input packet length, the variable length header includes variable length packet length information that includes higher bits of the input packet length.

In the transmission apparatus 20 having the above functions, an FEC block is generated on the basis of an input packet or an input stream, an FEC frame is generated from the FEC block, and the FEC frame is sent.

It should be noted that the transmission apparatus 20 can send an OFDM (Orthogonal Frequency Division Multiplexing) frame having an FEC frame arranged therein and can further include a third generation section that generates a dummy cell for arranging time information at the beginning of the OFDM frame. In this case, the transmission apparatus 20 can arrange, as necessary, a dummy cell in the OFDM frame, thus allowing time information to be arranged at the beginning of the OFDM frame.

The reception apparatus 30 includes a reception section, a first generation section, and a second generation section.

The reception section receives an incoming signal including an FEC frame. The first generation section generates an FEC block on the basis of the received FEC frame. The second generation section generates an input packet or an input stream on the basis of the FEC block.

In the reception apparatus 30 having the above functions, an incoming signal including an FEC frame is received, and an FEC block is generated on the basis of the received FEC frame. Further, an input packet or an input stream is generated on the basis of the FEC block.

FIG. 4 is a diagram describing a backdrop relating to the present technology.

FIG. 5 is a diagram describing a problem solved by the present technology.

FIG. 6 is a diagram describing an overview of a method for solving the problem.

Figure 7:
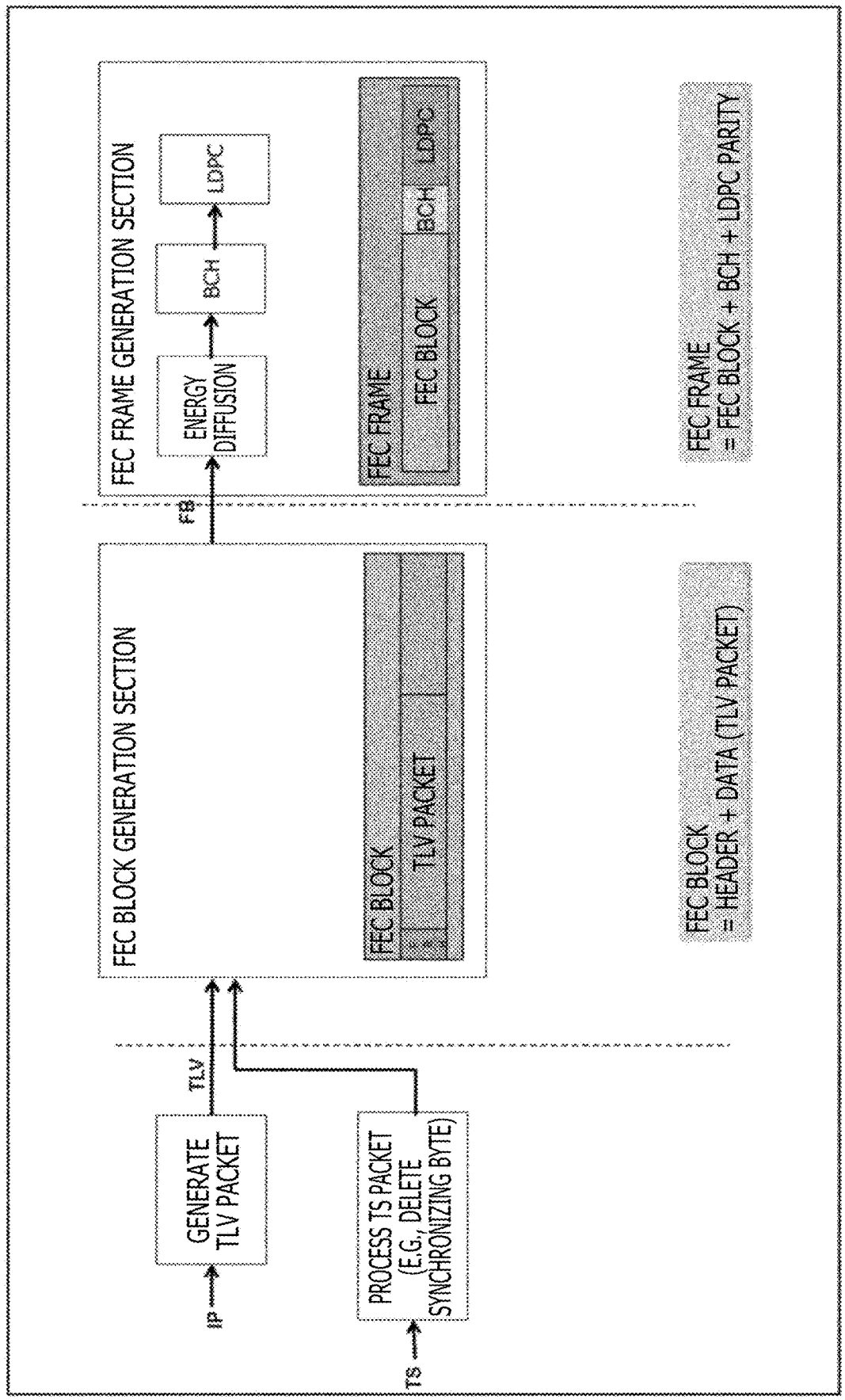
FIG. 7 is a diagram describing an overview of generation of an FEC block.

FIG. 7 is a diagram describing an overview of generation of an FEC block.

Figure 8:
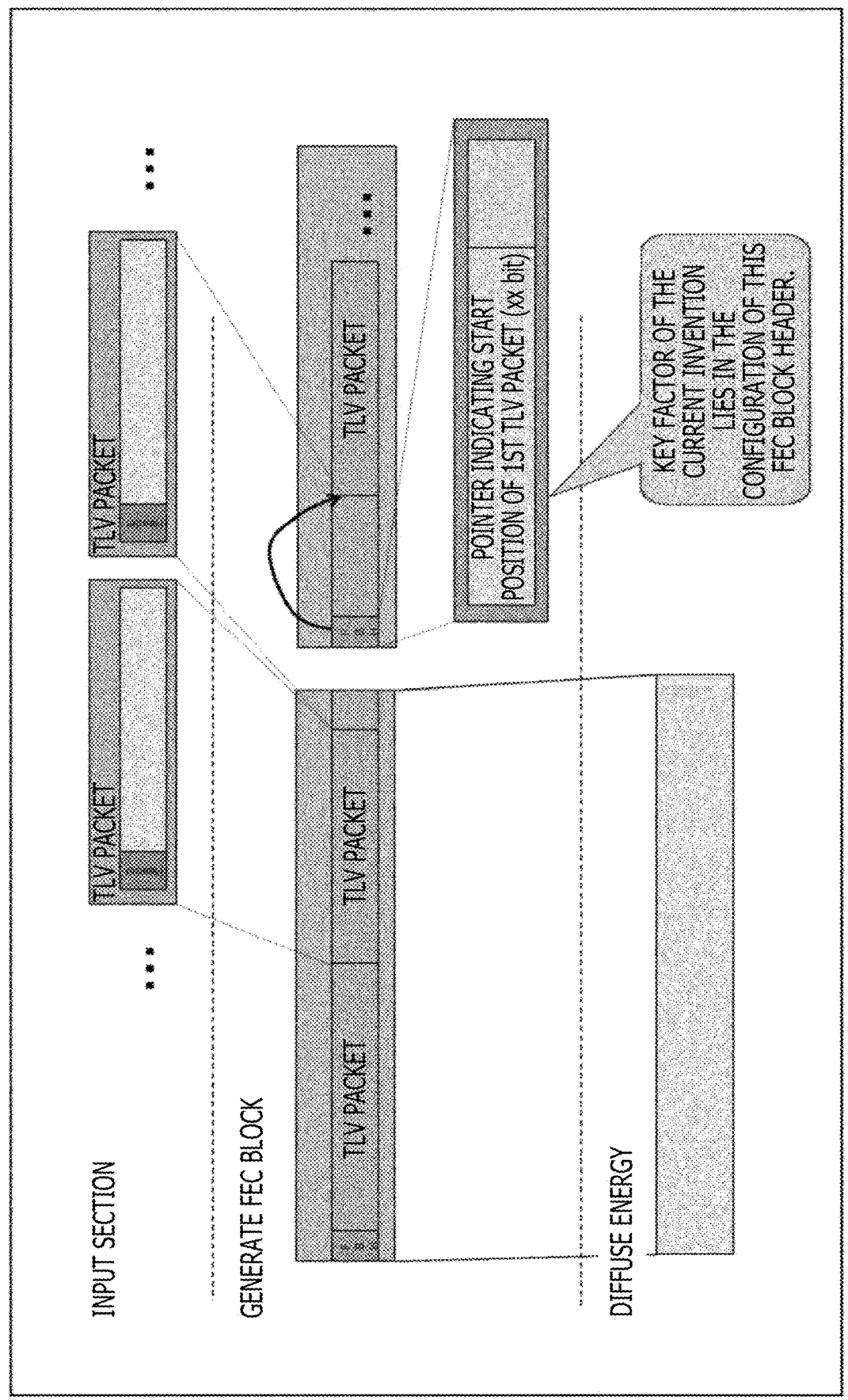
FIG. 8 is a diagram illustrating an example of an FEC block.

FIG. 8 is a diagram illustrating an example of an FEC block.

Figure 9:
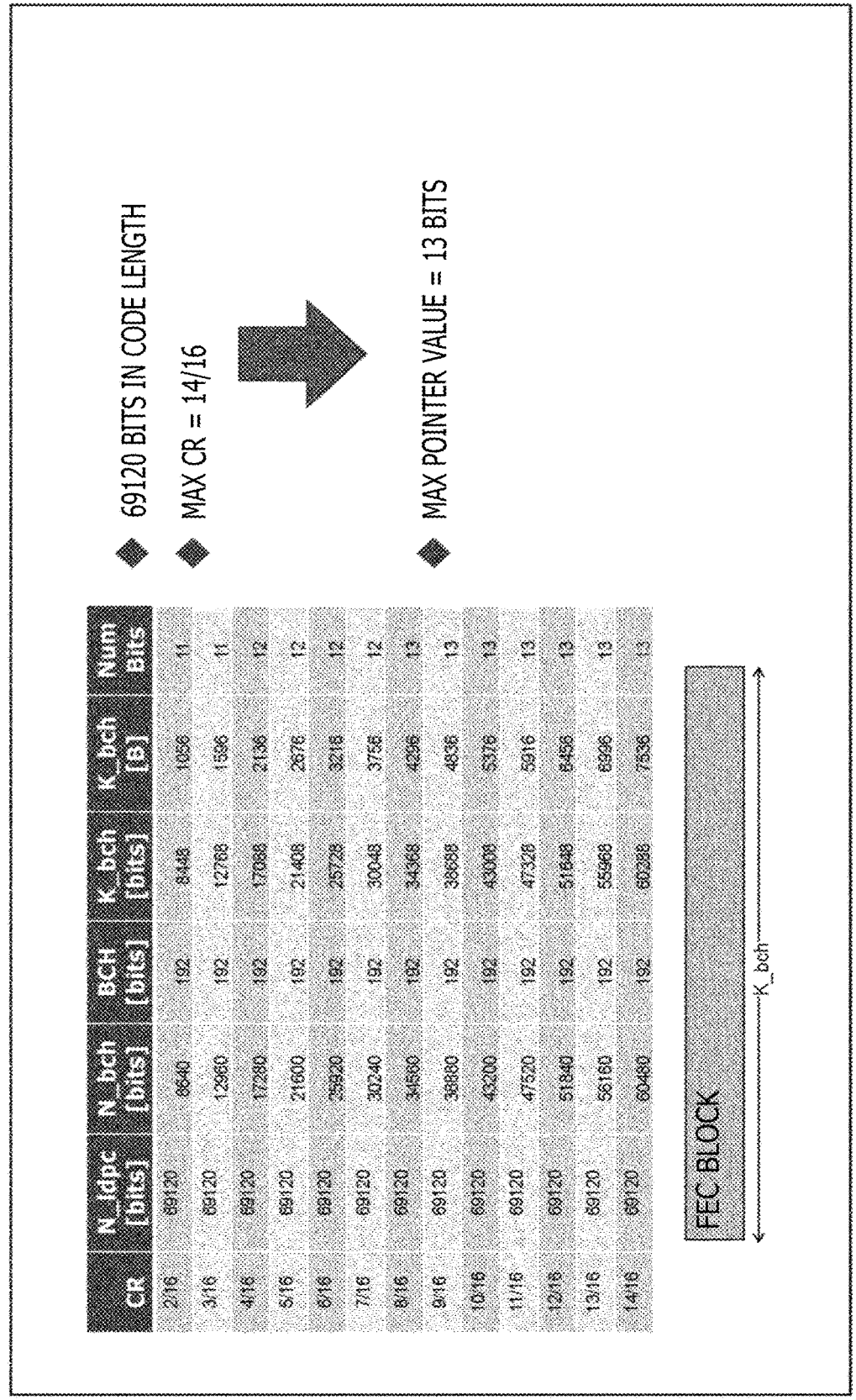
FIG. 9 is a diagram illustrating a first example of a baseband frame size.

FIG. 9 is a diagram illustrating a first example of a baseband frame size.

FIG. 10 is a diagram illustrating a second example of a baseband frame size.

Figure 11:
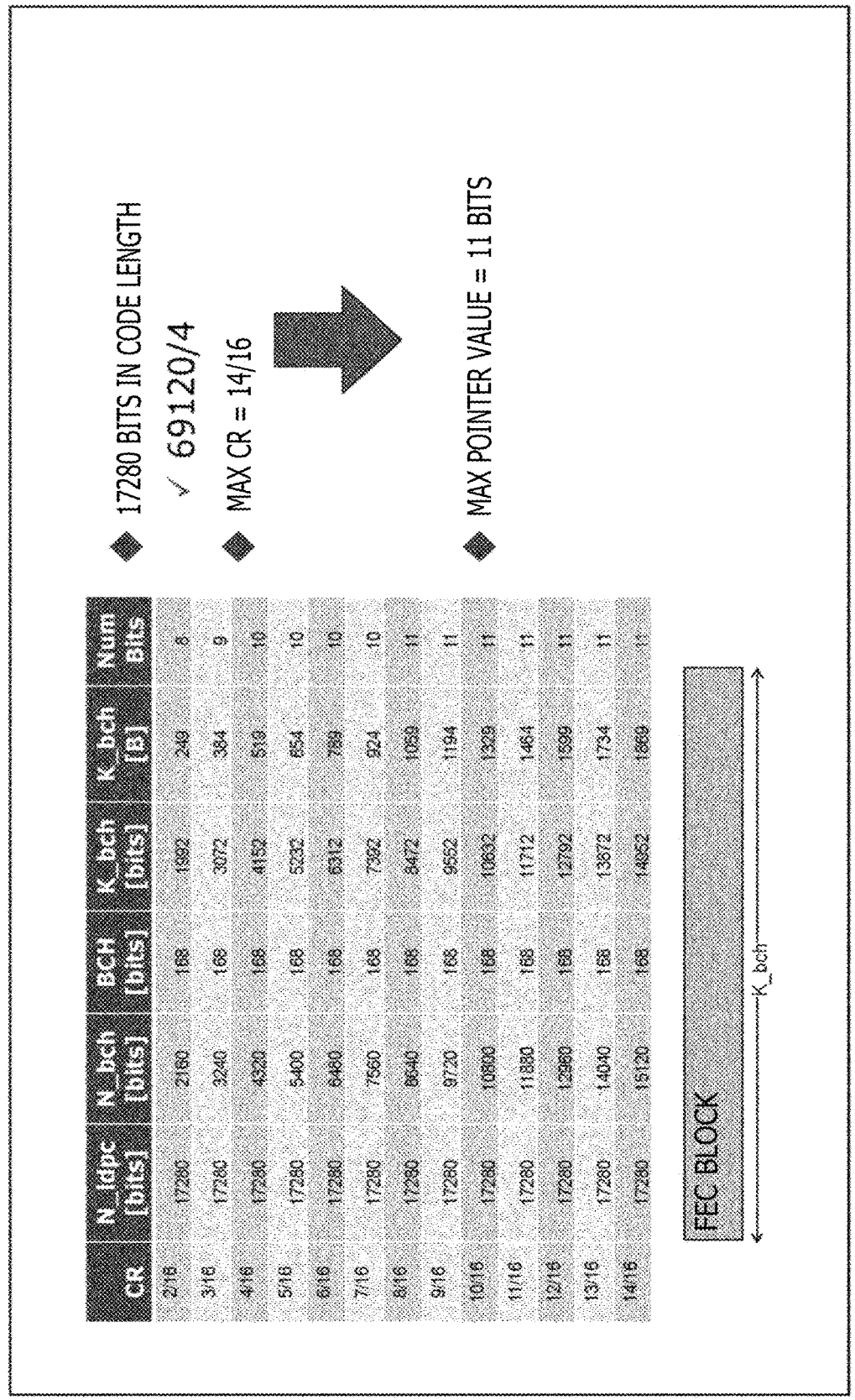
FIG. 11 is a diagram illustrating a third example of a baseband frame size.
Figure 14:
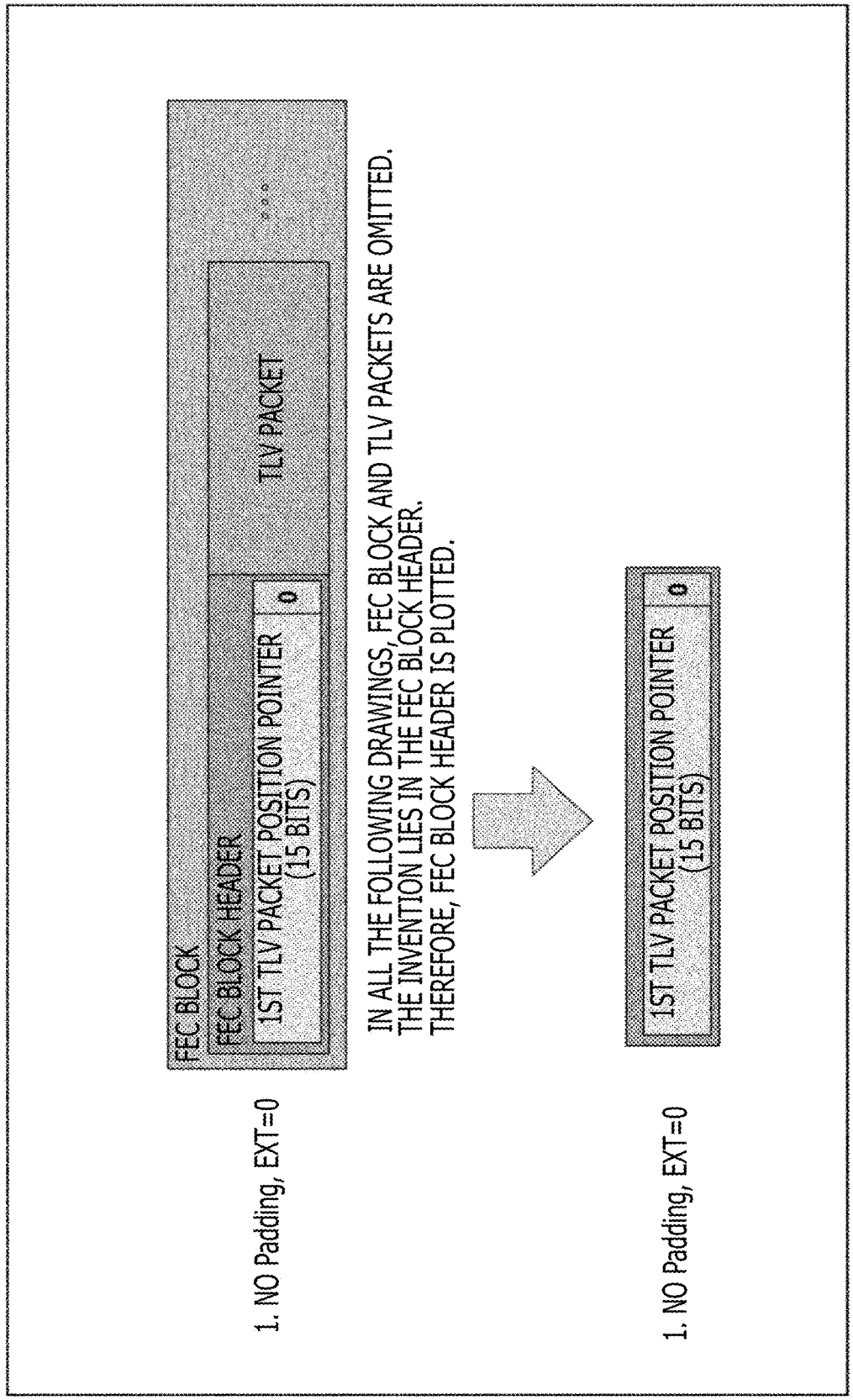
FIG. 14 is a diagram describing an example of a first data form adopted in the present technology.
Figure 15:
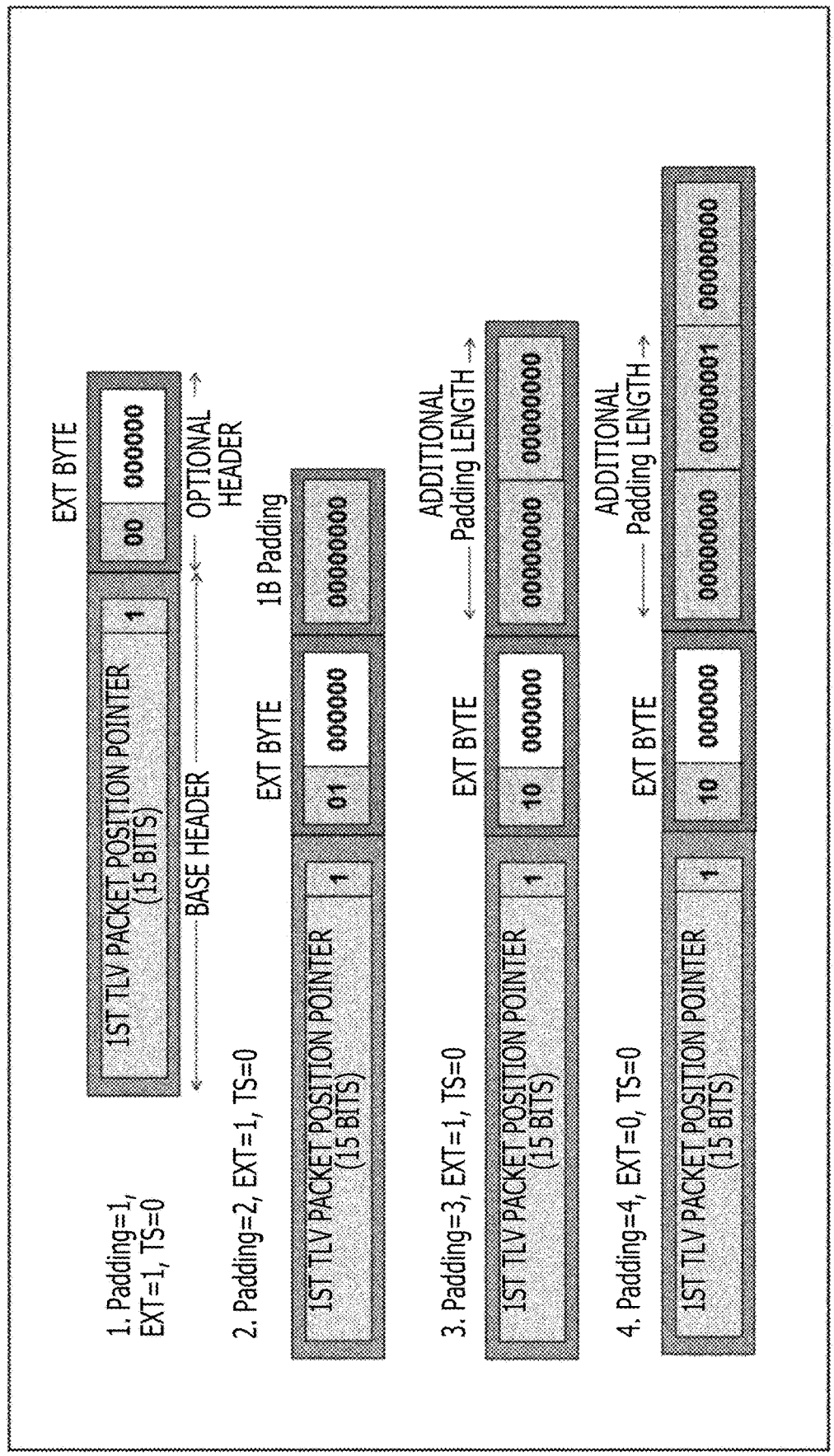
FIG. 15 is a diagram describing an example of a first data form adopted in the present technology.
Figure 16:
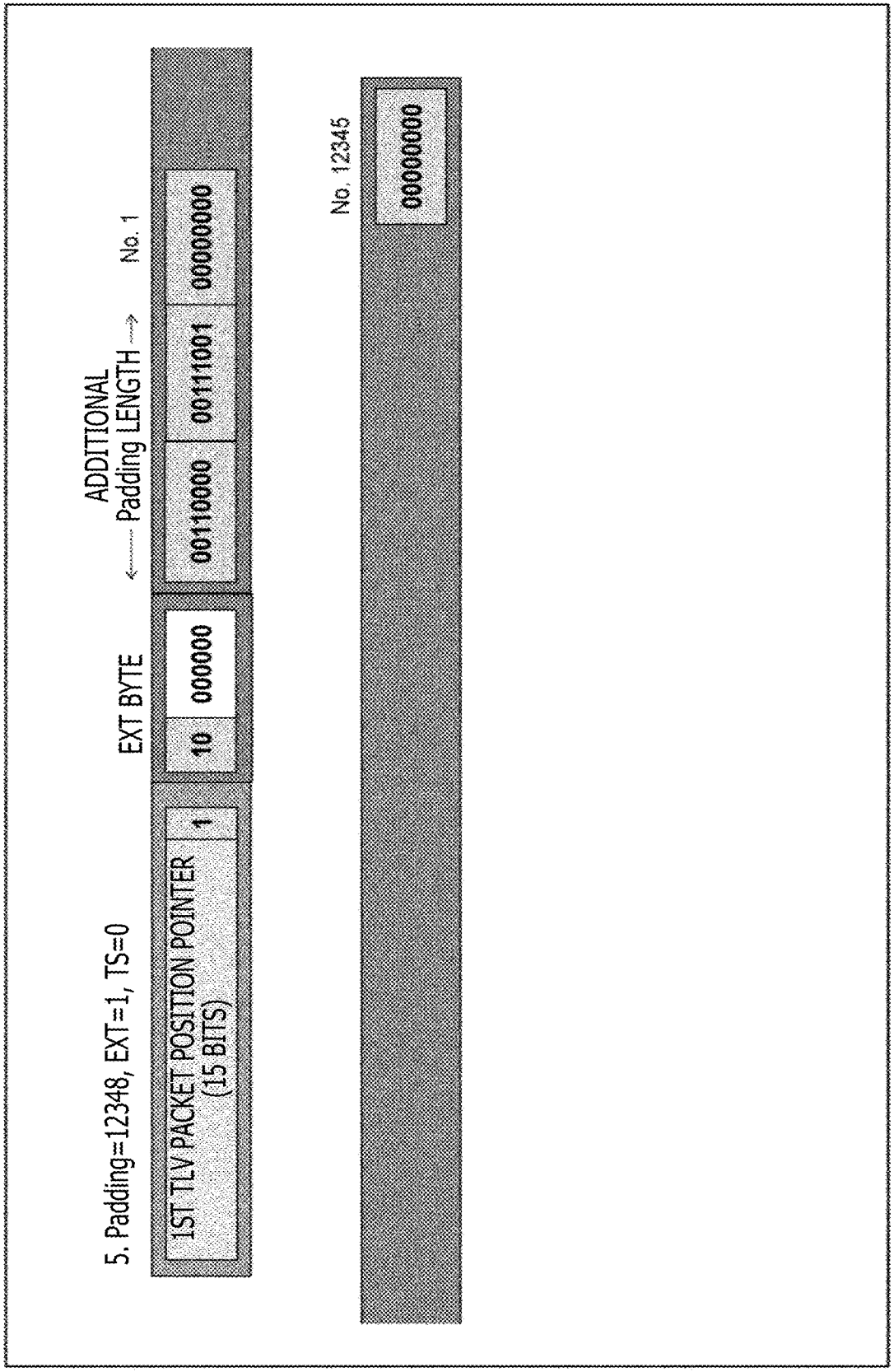
FIG. 16 is a diagram describing an example of a first data form adopted in the present technology.
Figure 17:
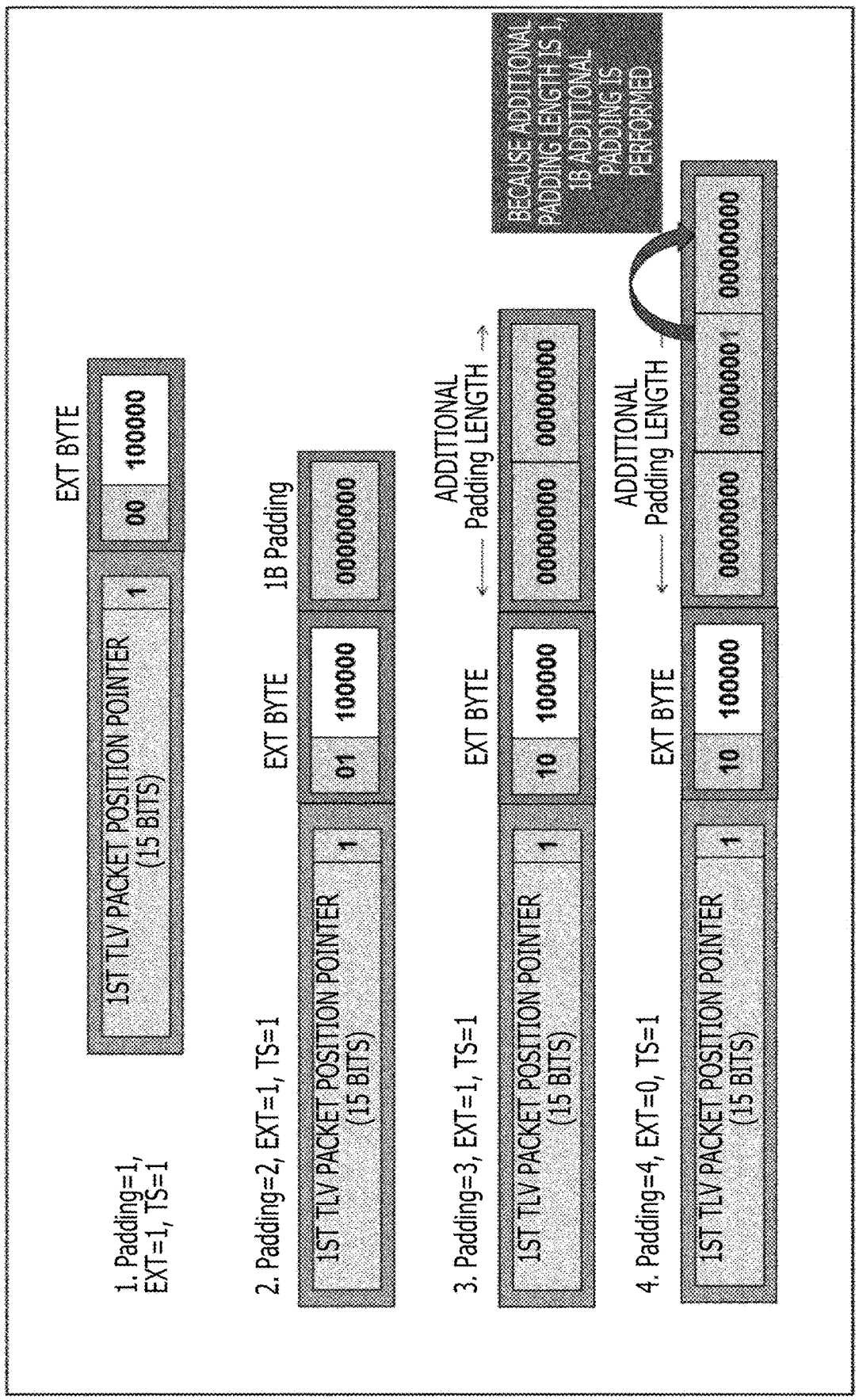
FIG. 17 is a diagram describing an example of a first data form adopted in the present technology.
Figure 18:
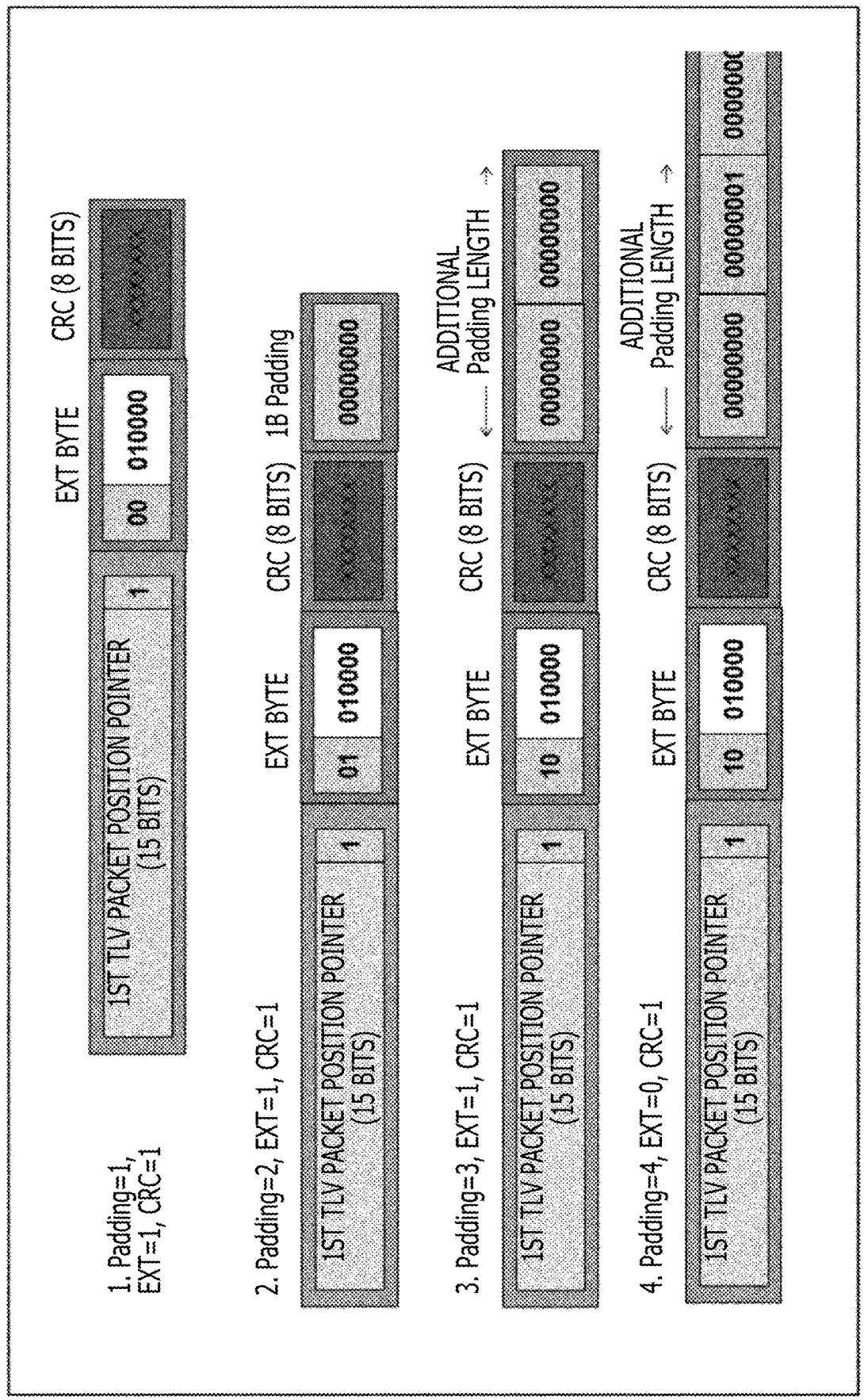
FIG. 18 is a diagram describing an example of a first data form adopted in the present technology.

FIG. 11 is a diagram illustrating a third example of a baseband frame size.

FIG. 12 is a diagram describing an overview of a data form adopted in the present technology.

FIGS. 13, 14, 15, 16, 17, and 18 are diagrams describing examples of a first data form adopted in the present technology.

Figure 19:
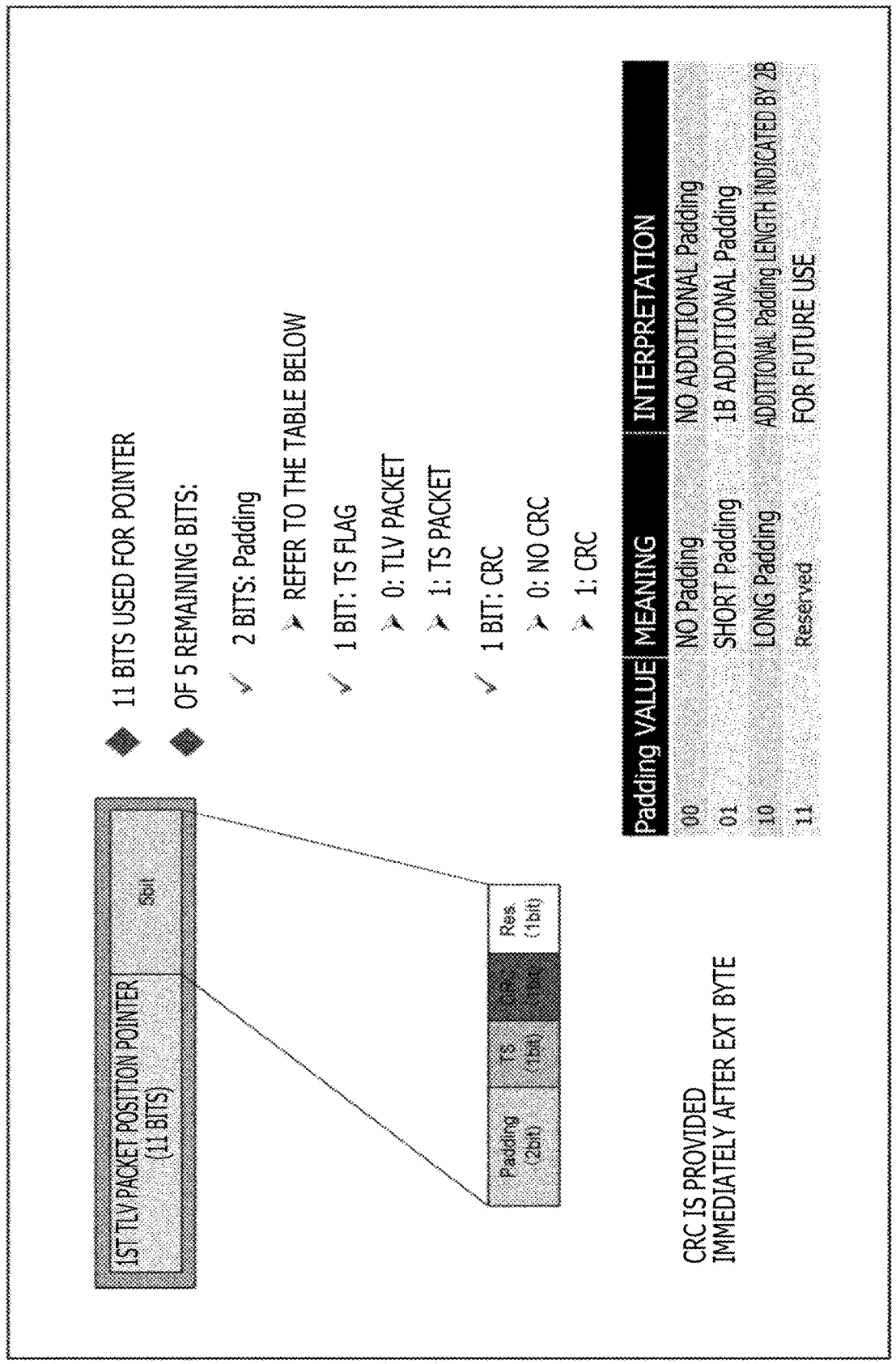
FIG. 19 is a diagram describing an example of a second data form adopted in the present technology.
Figure 20:
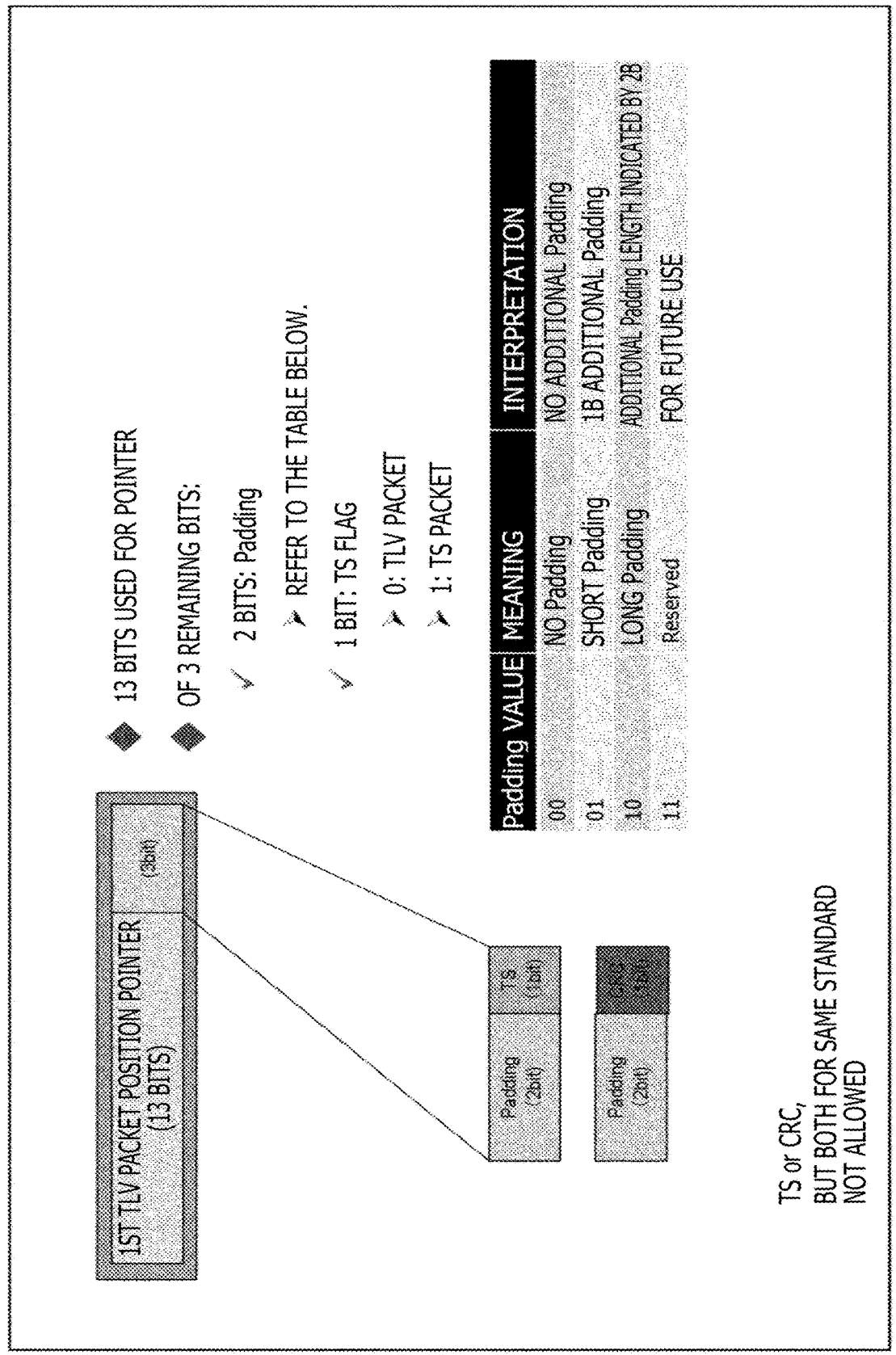
FIG. 20 is a diagram describing an example of a second data form adopted in the present technology.
Figure 21:
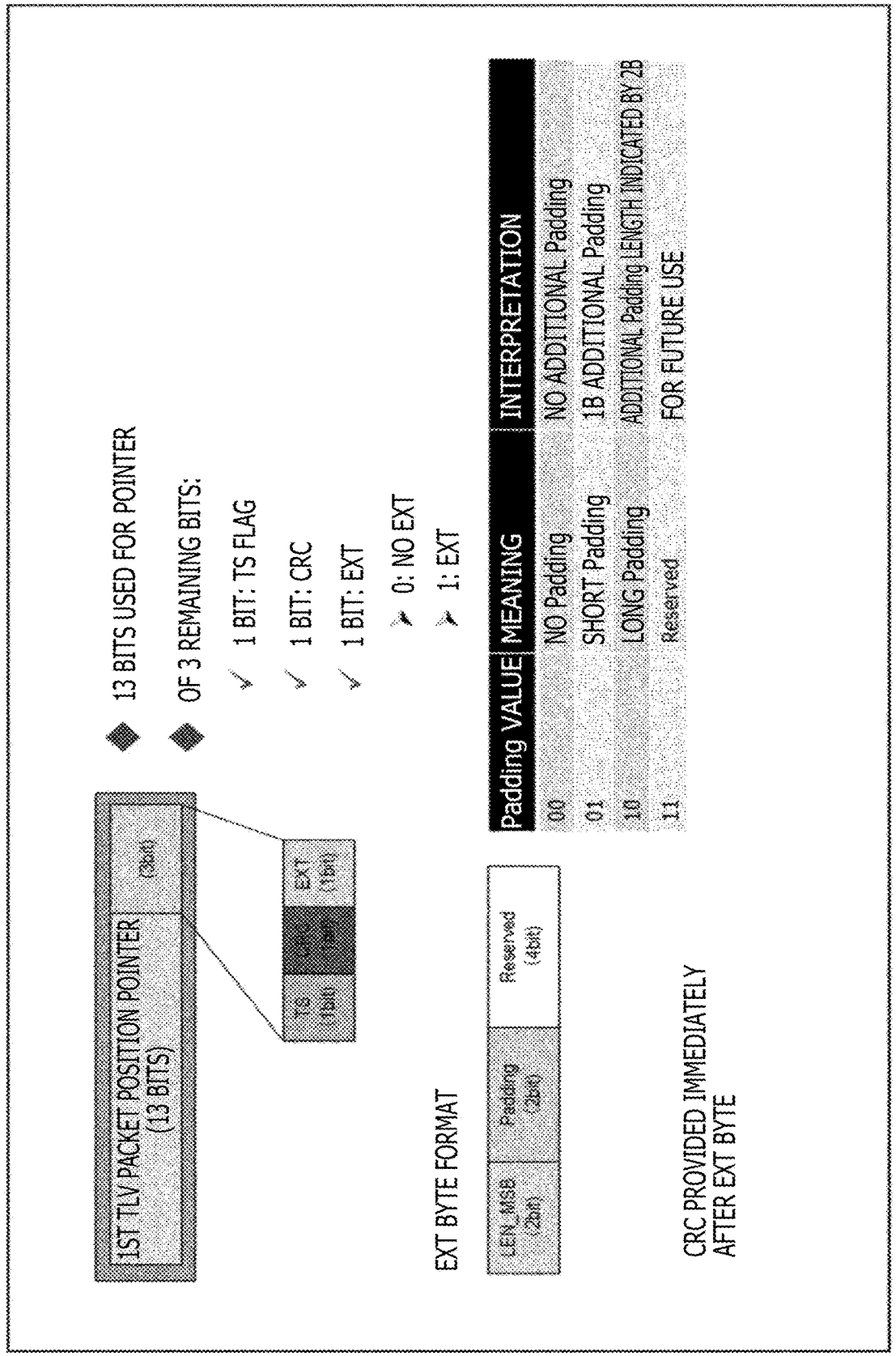
FIG. 21 is a diagram describing an example of a third data form adopted in the present technology.
Figure 22:
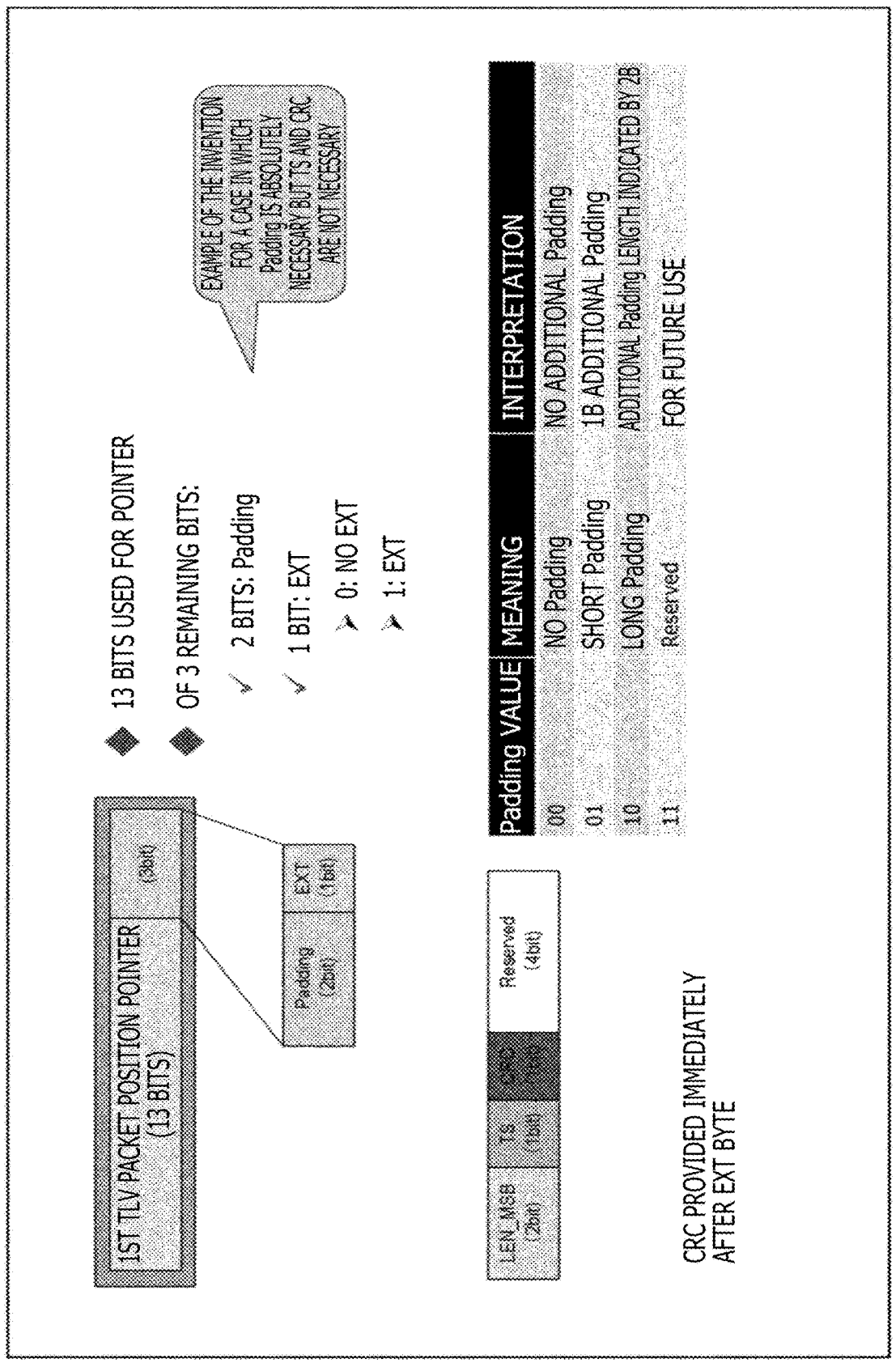
FIG. 22 is a diagram describing an example of a third data form adopted in the present technology.
Figure 23:
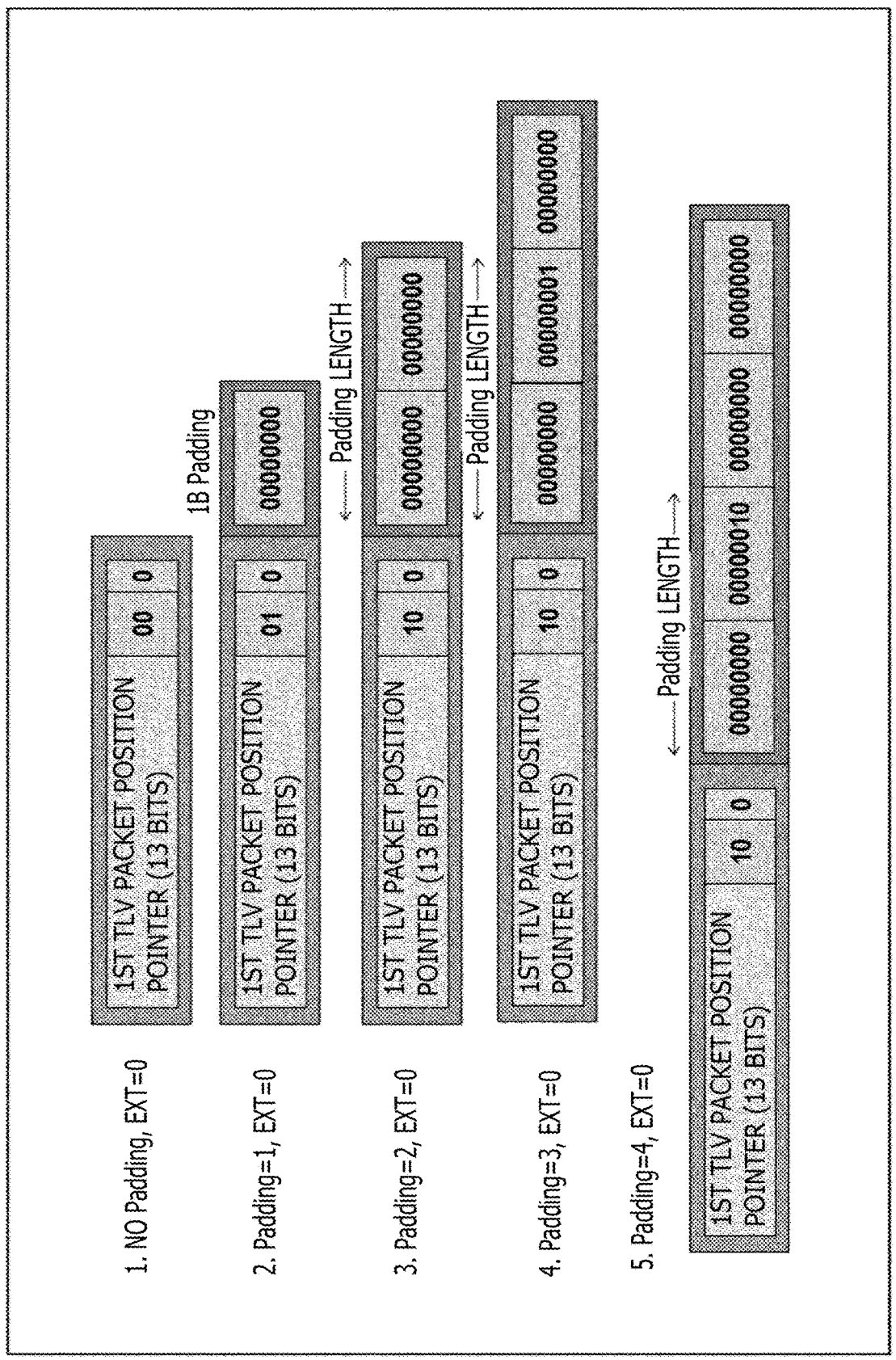
FIG. 23 is a diagram describing an example of a third data form adopted in the present technology.
Figure 24:
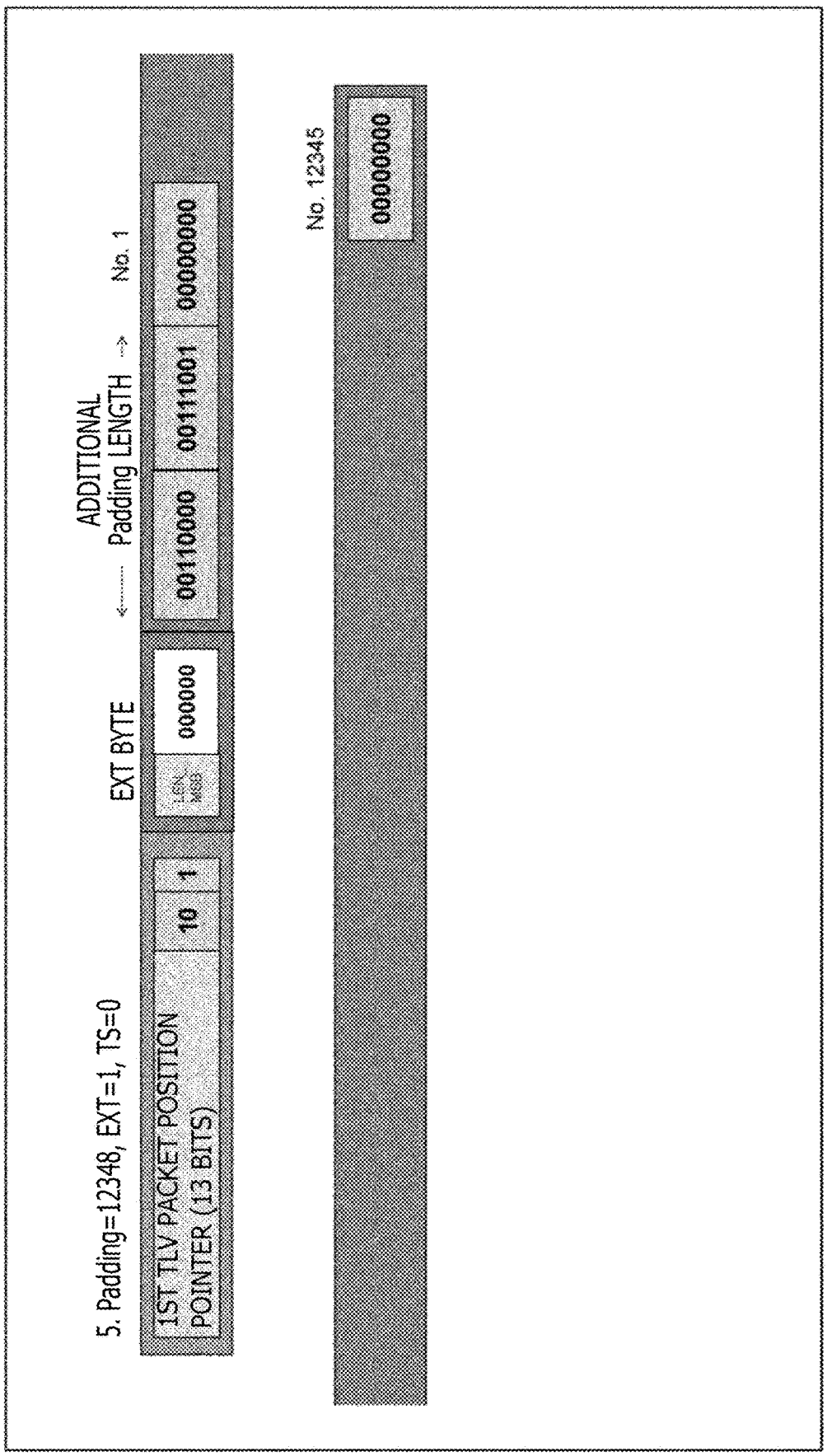
FIG. 24 is a diagram describing an example of a third data form adopted in the present technology.
Figure 26:
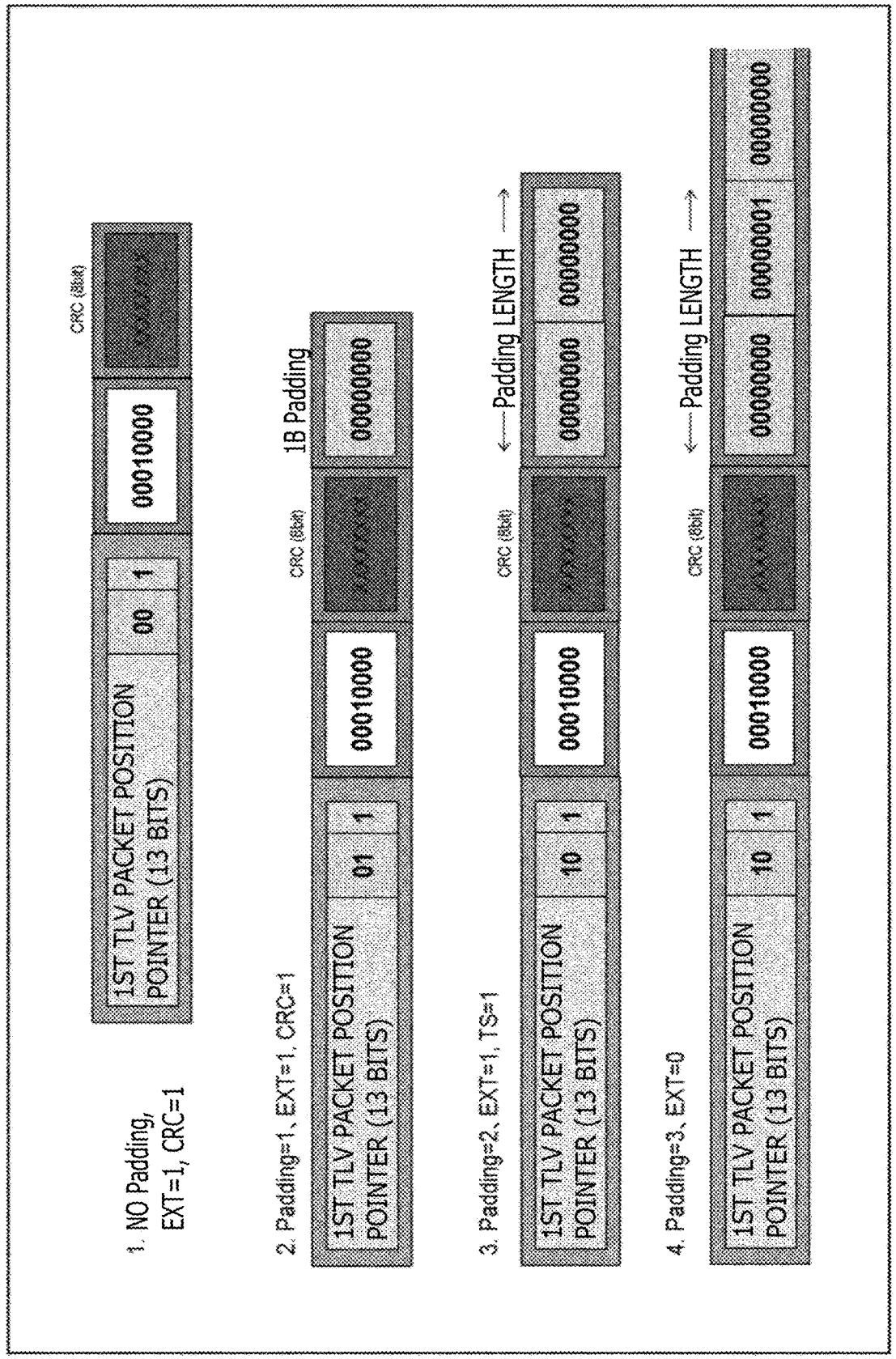
FIG. 26 is a diagram describing an example of a third data form adopted in the present technology.

FIGS. 19 and 20 are diagrams describing examples of a second data form adopted in the present technology.

FIGS. 21, 22, 23, 24, 25, and 26 are diagrams describing examples of a third data form adopted in the present technology.

Figure 27:
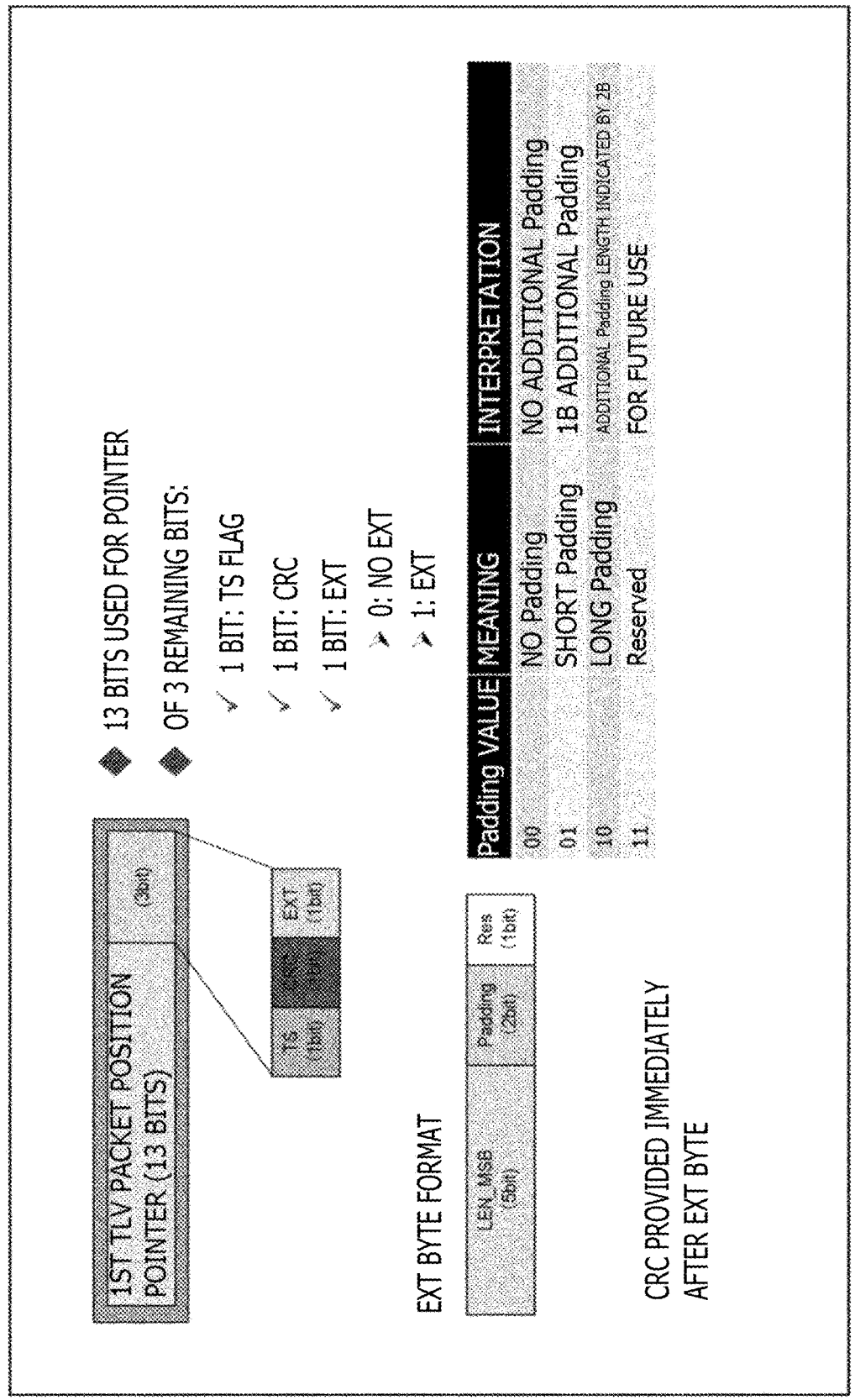
FIG. 27 is a diagram describing an example of a fourth data form adopted in the present technology.

FIG. 27 is a diagram describing an example of a fourth data form adopted in the present technology.

Figure 28:
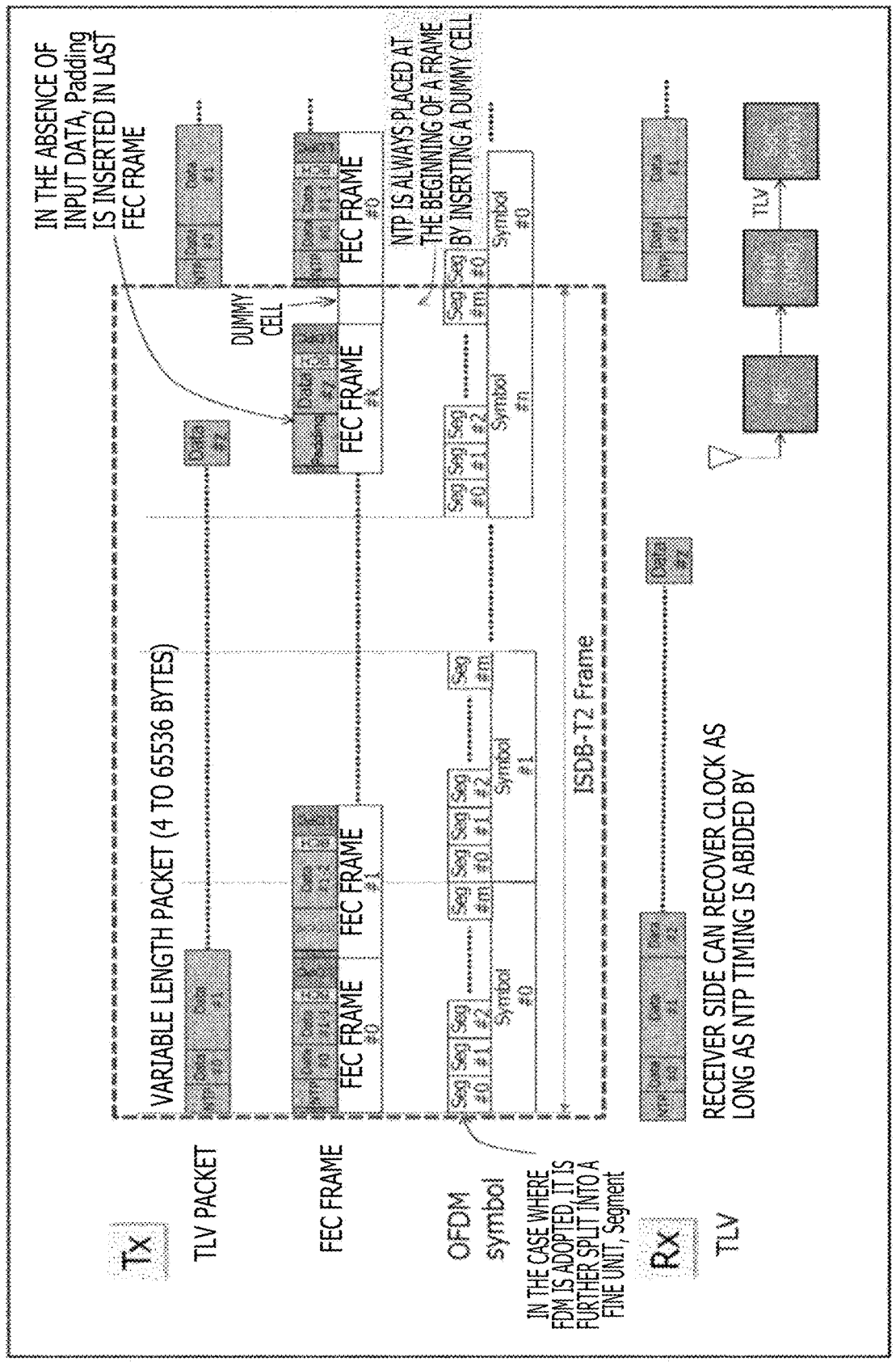
FIG. 28 is a diagram illustrating an example of an NTP transmission timing.

FIG. 28 is a diagram illustrating an example of an NTP transmission timing.

Although an overview of the present technology is illustrated in FIGS. 4 to 28, a detailed description thereof will be given below with reference to FIGS. 29 to 64.

3. Detailed Contents of the Present Technology (Configuration of the FEC block)

Figure 29:
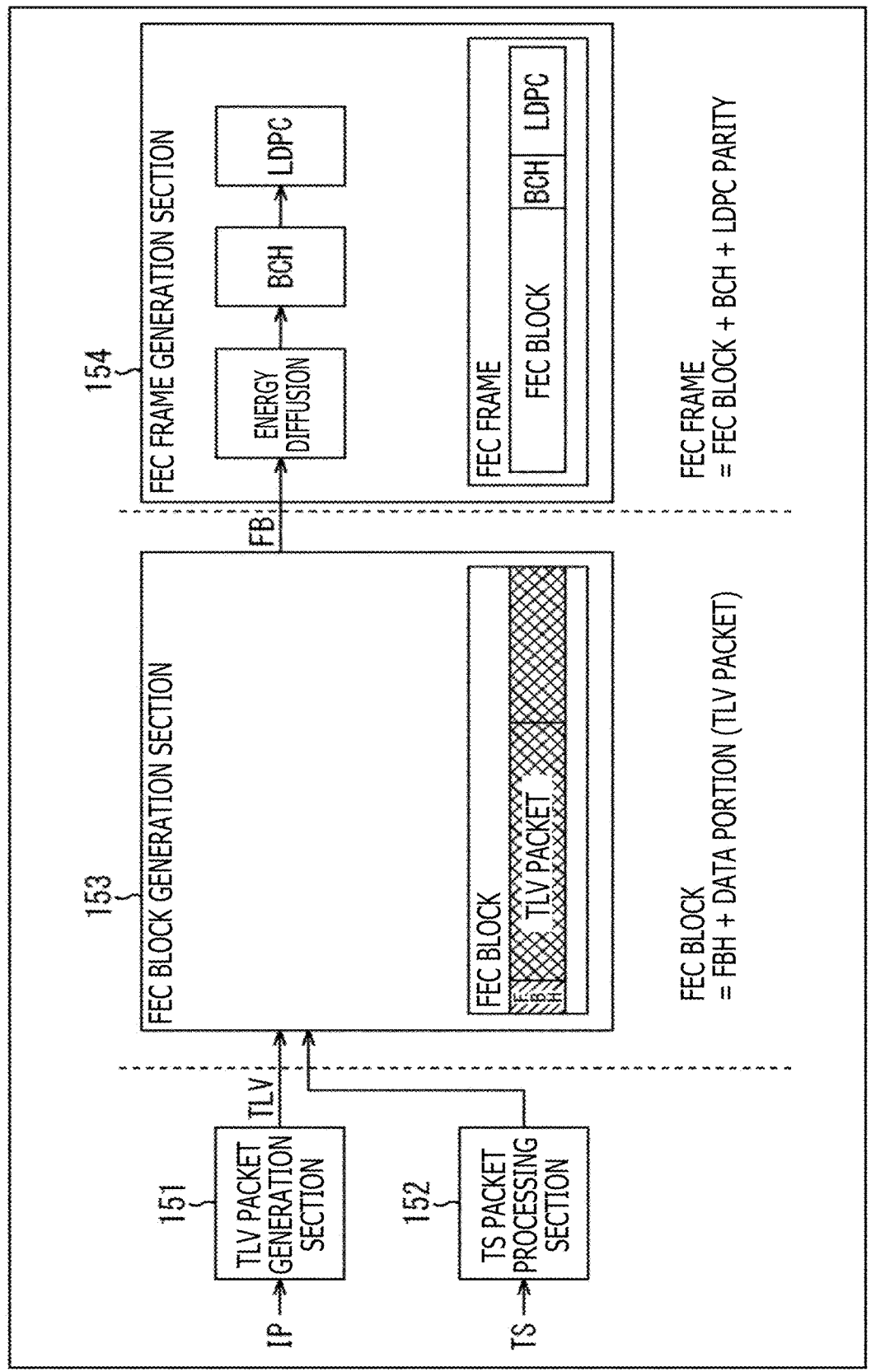
FIG. 29 is a block diagram illustrating a configuration example of a block relating to generation of an FEC block.

FIG. 29 is a block diagram illustrating a configuration example of a block relating to generation of an FEC block.

As illustrated in FIG. 29, blocks relating to the generation of an FEC block on the transmitting side are a TLV packet generation section 151, a TS packet processing section 152, an FEC block generation section 153, an FEC frame generation section 154. It should be noted, however, that each of the TLV packet generation section 151 to the FEC frame generation section 154 is included in either the data processing apparatus 10 (the data processing section 114 (FIG. 2) thereof) or the transmission apparatus 20 (the data processing section 211 (FIG. 2) thereof).

The TLV packet generation section 151 generates a TLV packet by processing an IP (Internet Protocol) stream input thereto and supplies the TLV packet to the FEC block generation section 153. Here, the TLV packet includes, for example, an IP packet, control information (upper layer signalling), and so on. Also, the IP packet includes a UDP (User Datagram Protocol) packet.

The TS packet processing section 152 generates a TS packet by processing a TS stream (MPEG2-TS stream) input thereto and supplies the TS packet to the FEC block generation section 153. Deletion of a synchronizing byte and other processes are performed, for example, on this TS stream.

A TLV packet from the TLV packet generation section 151 or a TS packet from the TS packet processing section 152 is supplied to the FEC block generation section 153. The FEC block generation section 153 generates an FEC block by processing the TLV packet or the TS packet and supplies the FEC block to the FEC frame generation section 154.

Here, the FEC block includes an FEC block header (FBH) and a data portion. Although a TLV packet or a TS packet is provided in the data portion, a description will be given here of a case in which one or a plurality of TLV packets (some or all thereof) are provided therein. Also, a TLV packet has a variable length, and there is a case in which a TLV packet provided in a certain FEC block spreads into the next FEC block.

It should be noted that data provided in the data portion is not limited to input packets (transport packets) such as TLV packet and TS packet, and input streams (transport steams) such as IP stream and TS stream may also be provided therein.

The FEC frame generation section 154 generates an FEC frame by performing, on the FEC block supplied from the FEC block generation section 153, processes such as energy diffusion, BCH (Bose-Chaudhuri-Hocquenghem) coding, and LDPC (Low Density Parity Check) coding, and supplies the FEC frame to the subsequent stage.

Here, the FEC frame includes not only an FEC block but also BCH code and LDPC code parities added to the FEC block. That is, a TLV packet having a variable length is encapsulated in an FEC block having a fixed length first, and further, BCH code and LDPC code parities are added to the FEC block, and then the FEC block is stored in an FEC frame having a fixed length.

(Flow of Generation of the FEC Block)

Figure 30:
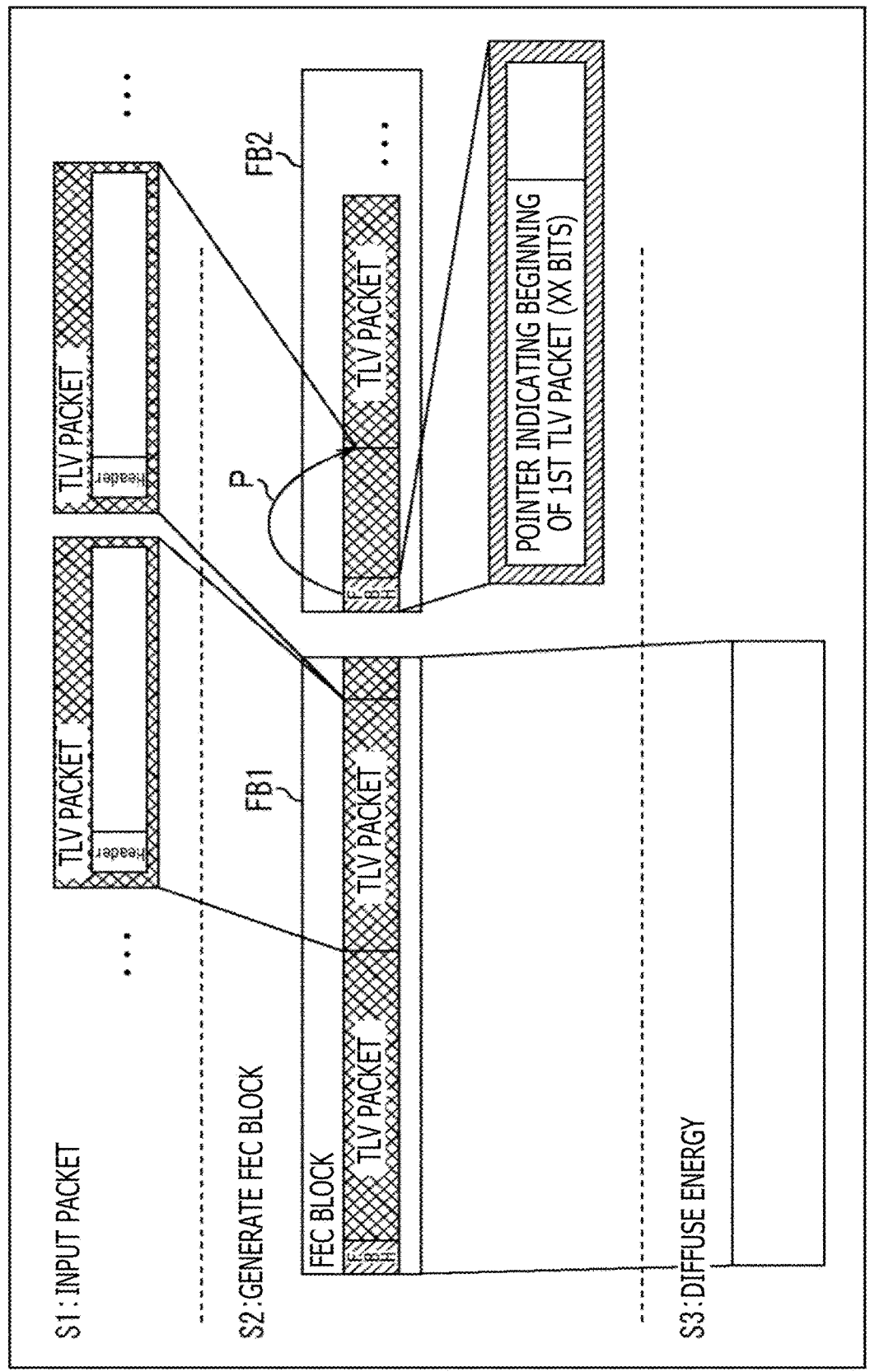
FIG. 30 is a diagram describing a flow of FEC block generation.

FIG. 30 is a diagram describing a flow of FEC block generation. It should be noted that a time direction in FIG. 30 is from left to right.

When a TLV packet generated by the TLV packet generation section 151 (FIG. 29) is input to the FEC block generation section 153 (FIG. 29) (S1), an FEC block is generated by adding an FEC block header (FBH) to the TLV packet (S2). Then, energy diffusion is performed on the FEC block acquired as described above (S3).

Here, focusing, of FEC blocks generated by the FEC block generation process in step S2, an FEC block FB1, a first block, data which is part of a TLV packet, is provided in the FEC block FB1 following two TLV packets (all data thereof). Also, focusing on an FEC block FB2, a next block, data of one or a plurality of TLV packets is provided in the FEC block FB2 following remaining data of the TLV packet part of whose data is provided in the FEC block FB1.

That is, in the first FEC block FB1 and the following FEC block FB2, a certain TLV packet is provided to spread across the two blocks. At this time, in the FEC block FB2, it is preferable to reliably notify the position (start position) of the first TLV packet provided following the remaining data of the certain TLV packet (TLV packet provided to spread across the FEC block FB1 and the FEC block FB2) for reliable extraction of the TLV packet in the FEC block.

For this reason, the present technology places, in an FEC block header (FBH) of an FEC block, a pointer indicating the position of a first TLV packet in the FEC block (hereinafter referred to as a first TLV packet position pointer), thus allowing for identification of the position of the first TLV packet (start position P in the figure) with this first TLV packet position pointer.

For example, in the case where the present technology is not applied, and therefore, a first TLV packet position pointer is not provided in an FEC block header (FBH) of an FEC block, there is a possibility that when synchronizing information cannot be acquired for some cause such as reception error on the receiver side, data may be interrupted because a TLV packet cannot be extracted and processed properly.

On the other hand, in the case where the present technology is applied, and therefore, a first TLV packet position pointer is provided in an FEC block header (FBH) of an FEC block, the receiver side can reliably identify the position of the first TLV packet in each FEC block and properly extract and process the TLV packet thanks to the first TLV packet position pointer, thus suppressing possible interruption of data.

It should be noted that the number of bits assigned to a first TLV packet position pointer can be set to an arbitrary value according, for example, to data configuration. For example, a maximum value of a first TLV packet position pointer is determined according to a base band frame size. Therefore, it is sufficient if the number of bits assigned to a first TLV packet position pointer is determined according to the maximum value.

A description will be given below of the number of bits that should be assigned to a first TLV packet position pointer as a baseband frame size in a middle code whose code length is 69120 bits, in a long code whose code length is 276480 bits, and a short code whose code length is 17280 bits.
(Maximum Value of Each Code Length)

FIG. 31 is a diagram describing a maximum value of a first TLV packet position pointer in the case where a baseband frame size is a middle code (code length: 69120 bits).

In FIG. 31, CR (Coding Rate) represents a coding rate of an LDPC code. N_ldpc represents an LDPC code block (in bits), and N_bch represents a BCH code block (in bits). Also, in FIG. 31, BCH represents N_bch-K_bch (in bits), K_bch represents BCH information block (in bits or bytes), and Num Bits represents the number of bits required to correspond to K_bch (B: Byte).

As illustrated in FIG. 31, in the case of a middle code whose N_ldpc=69120 bits, and when the LDPC code coding rate (CR) is 2/16 or 3/16, the number of bits (Num Bits) is 11, and when the LDPC code coding rate (CR) is 4/16, 5/16, 6/16, or 7/16, the number of bits (Num Bits) is 12, and when the LDPC code coding rate (CR) is 8/16, 9/16, 10/16, 11/16, 12/16, 13/16, or 14/16, the number of bits (Num Bits) is 13.

As described above, in the case of a middle code whose code length is 69120 bits, when the coding rate is maximum at CR=14/16, the number of bits (Num Bits) is 13. Therefore, the maximum value of the first TLV packet position pointer is 13 bits.

FIG. 32 is a diagram describing a maximum value of a first TLV packet position pointer in the case where a baseband frame size is a long code (code length: 276480 bits). It should be noted that, in FIG. 32, meanings of CR, N_ldpc, N_bch, BCH, K_bch, and Num Bits are similar to those in FIG. 31. That is, Num Bits also represents here the number of bits required to correspond to K_bch (B: Byte).

In the case of a long code with N_ldpc=276480 bits as illustrated in FIG. 32, and when the LDPC code coding rate (CR) is 2/16 or 3/16, the number of bits (Num Bits) is 13, and when the LDPC code coding rate (CR) is 4/16, 5/16, 6/16, or 7/16, the number of bits (Num Bits) is 14, and when the LDPC code coding rate (CR) is 8/16, 9/16, 10/16, 11/16, 12/16, 13/16, or 14/16, the number of bits (Num Bits) is 15.

As described above, in the case of a long code whose code length is 276480 bits, when the coding rate is maximum at CR=14/16, the number of bits (Num Bits) is 15. Therefore, the maximum value of the first TLV packet position pointer is 15 bits.

FIG. 33 is a diagram describing a maximum value of a first TLV packet position pointer in the case where a baseband frame size is a short code (code length: 17280 bits). It should be noted that, in FIG. 33, meanings of CR, N_ldpc, N_bch, BCH, K_bch, and Num Bits are similar to those in FIG. 31. That is, Num Bits also represents here the number of bits required to correspond to K_bch (B: Byte).

In the case of a short code with N_ldpc=17280 bits as illustrated in FIG. 33, and when the LDPC code coding rate (CR) is 2/16, the number of bits (Num Bits) is 8, and when the LDPC code coding rate (CR) is 3/16, the number of bits (Num Bits) is 9, and when the LDPC code coding rate (CR) is 4/16, 5/16, 6/16, or 7/16, the number of bits (Num Bits) is 10, and when the LDPC code coding rate (CR) is 8/16, 9/16, 10/16, 11/16, 12/16, 13/16, or 14/16, the number of bits (Num Bits) is 11.

As described above, in the case of a short code whose code length is 17280 bits, when the coding rate is maximum at CR=14/16, the number of bits (Num Bits) is 11. Therefore, the maximum value of the first TLV packet position pointer is 11 bits.

As described above, the maximum value of the first TLV packet position pointer varies depending on the code length and the coding rate (CR) of middle, long, short, and other codes. As a result, the length of the first TLV packet position pointer provided in the FEC block header (FBH) varies. For this reason, the present technology proposes first to fourth forms as forms of the FEC block header (FBH) tailored to the length of the first TLV packet position pointer.
(3-1) First Form A description will be given first of configurations of an FEC block header (FBH) of a first form (hereinafter also denoted as form 1) with reference to FIGS. 34 to 43.
(FEC Block Header Format)

Figure 34:
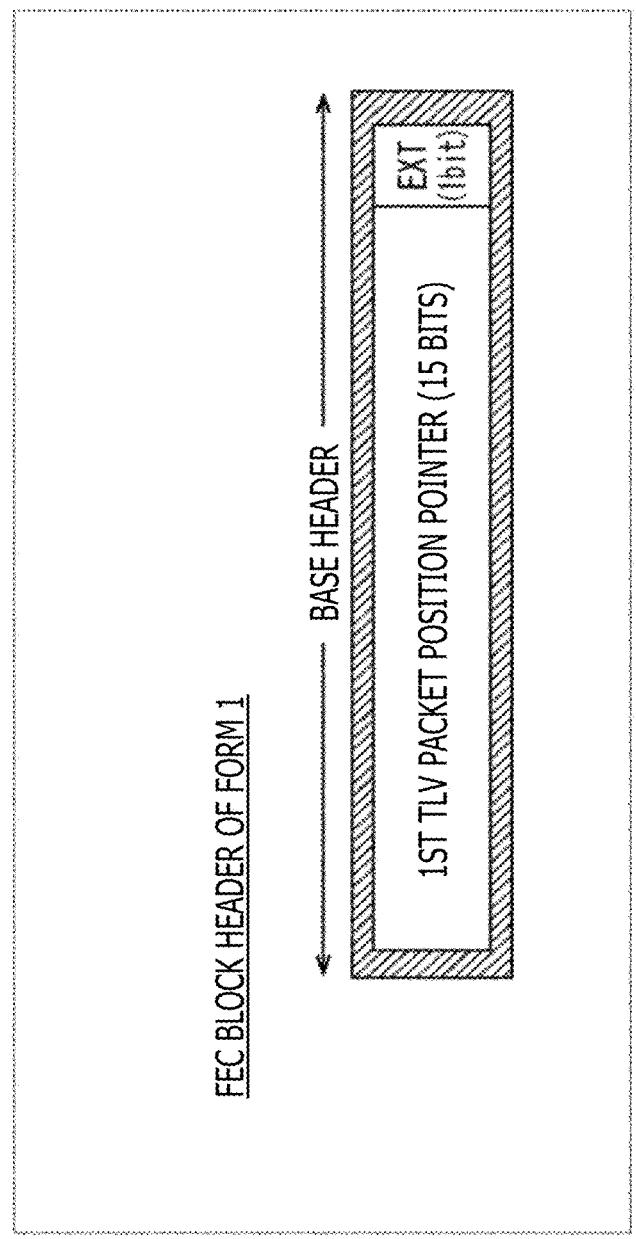
FIG. 34 is a diagram illustrating an example of an FEC block header format in form 1.

FIG. 34 is a diagram illustrating an example of an FEC block header format of form 1.

In FIG. 34, a two-byte base header includes a 15-bit first TLV packet position pointer and a one-bit EXT flag.

The first TLV packet position pointer is a pointer that indicates the position of the first TLV packet in the FEC block including the FEC block header in which the first TLV packet position pointer is provided. In a base header in form 1, 15 bits are reserved for this first TLV packet position pointer. Therefore, the first TLV packet position pointer can be used as a pointer for all code lengths, namely, long, middle, and short codes.

The EXT flag is a flag that indicates whether an extension field (Extension) exists. For example, in the case where '0' is specified as an EXT flag, this indicates that there is no extension. In this case, only a two-byte base header is provided as an FEC block header. On the other hand, in the case where '1' is specified as an EXT flag, this indicates that there is extension. In this case, the byte following the base header is an EXT byte.

It should be noted that in the case where there is no first TLV packet (first TLV byte), '0x7FFF' (111 1111 1111 1111) is assigned to the 15 bits of the first TLV packet position pointer.

(EXT Byte Format)

Figure 35:
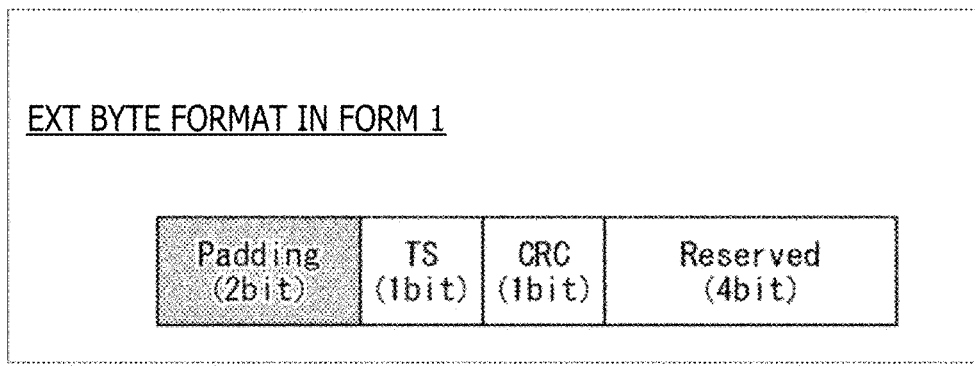
FIG. 35 is a diagram illustrating an example of an EXT byte format in form 1.

FIG. 35 is a diagram illustrating an example of an EXT byte format in form 1.

This EXT byte is provided as the next byte following the base header illustrated in FIG. 34 in the case where '1' is specified as the EXT flag illustrated in FIG. 34.

In FIG. 35, the one-byte EXT byte includes a two-bit padding value, a one-bit TS flag, a one-bit CRC flag, and a four-bit reserved field.

As a padding value in form 1, for example, a value corresponding to the content illustrated in FIG. 36 is specified.

That is, in the case where '00' is specified as a padding value, this means that there is no padding. In this case, there is no additional padding. In the case where '01' is specified as a padding value, this means short padding. In this case, one-byte additional padding is performed.

Also, in the case where '10' is specified as a padding value, this means long padding. In this case, the length of additional padding is indicated by two bytes. Further, in the case where '11' is specified, this means a reserved field for future use. It should be noted that "all paddings" meaning that all are padded, for example, may also be specified as a meaning of this reserved field.

Referring back to the description in FIG. 35, the TS flag is a flag that indicates whether the packet provided in the FEC block is a TS packet. For example, in the case where '0' is specified as a TS flag, this indicates that the packet is not a TS packet. In this case, a TLV packet is provided in the FEC block. On the other hand, in the case where '1' is specified as a TS flag, this indicates that the packet is a TS packet.

The CRC flag indicates whether there is a CRC (Cyclic Redundancy Check), an error detection code. For example, in the case where '0' is specified as a CRC flag, this indicates that there is no CRC. On the other hand, in the case where '1' is specified as a CRC flag, this indicates that there is a CRC. In this case, a CRC is provided immediately after the EXT byte. It should be noted that in the case where a CRC is added, it is always added. Therefore, the size of the first FEC block header at this time is three bytes.

The reserved field is a field for future use

A description will be given next of a more specific detailed example of form 1. In the description given below, as for an FEC block header and a TLV packet provided in an FEC block, the FEC block and the TLV packet are not illustrated, and only the FEC block header is illustrated for simplification of the description.

Figure 37:
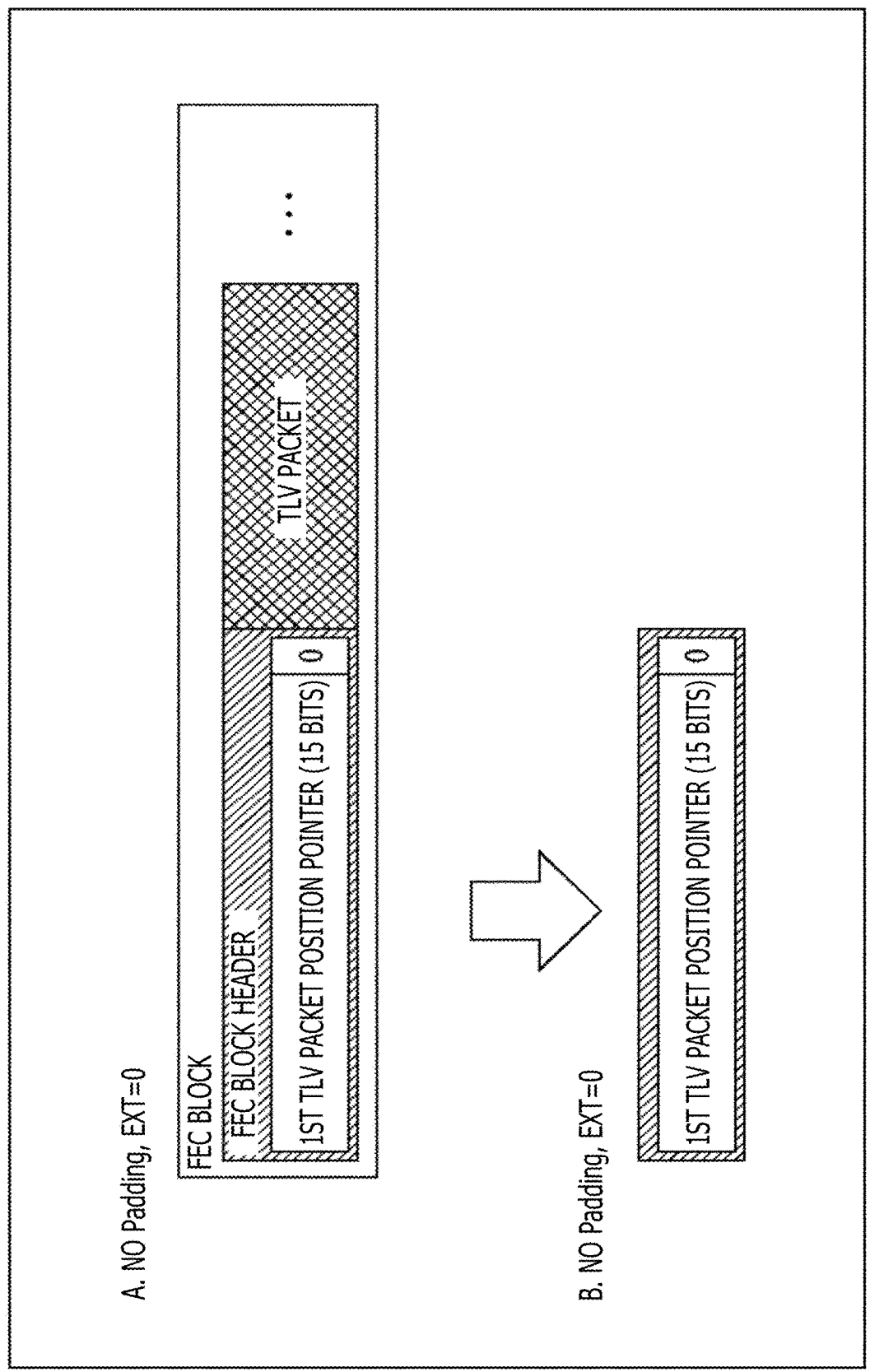
FIG. 37 depicts diagrams describing simplified illustration of an FEC block header.

That is, in the case where there is no padding as illustrated in FIG. 37, and when '0' is specified as an EXT flag, the FEC block is actually configured as illustrated in A of FIG. 37. In the description given below, however, the configuration of the FEC block is illustrated as depicted in B of FIG. 37 for simplification.

Detailed Examples 1 of Form 1

Figure 39:
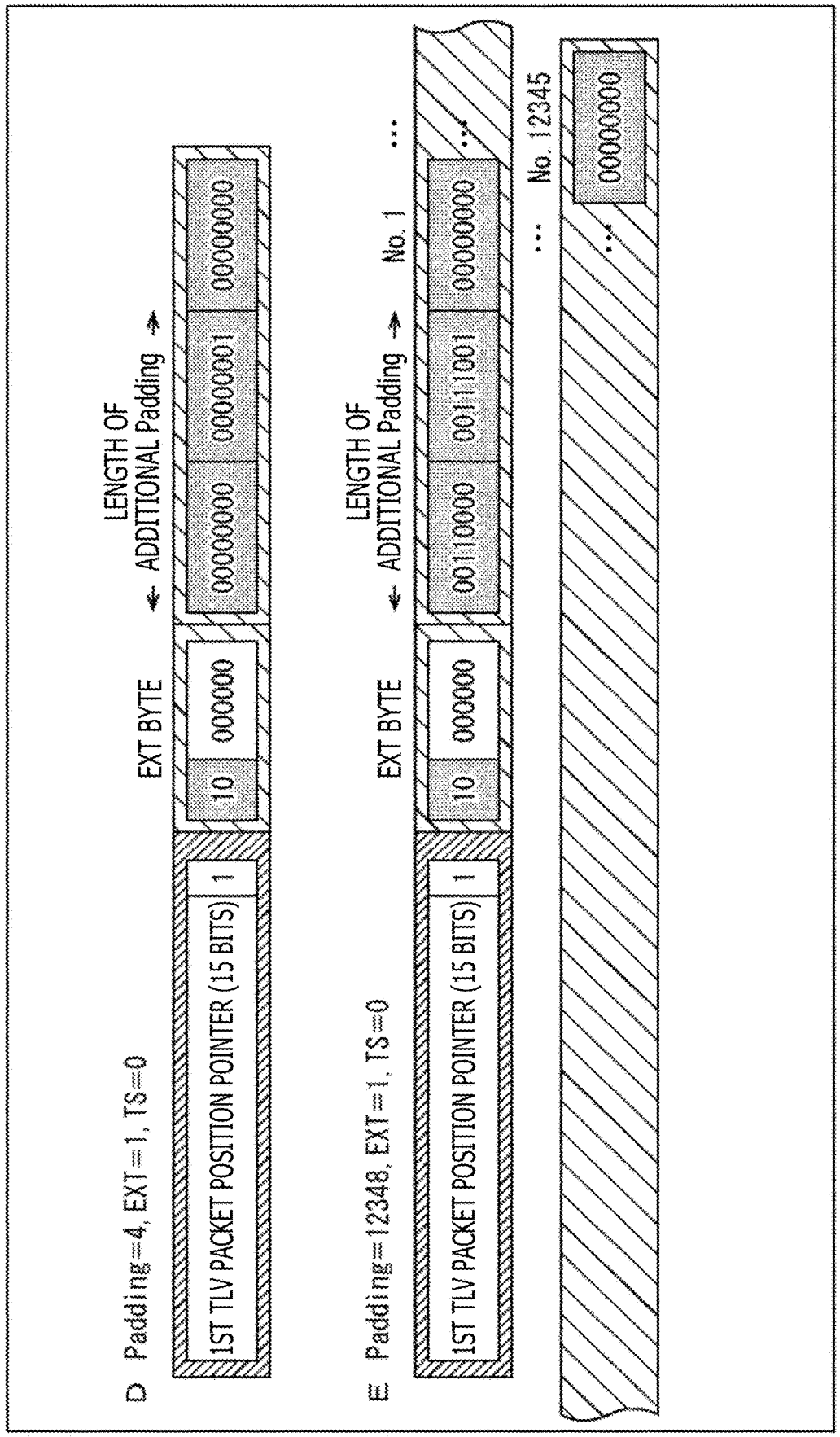
FIG. 39 depicts diagrams illustrating detailed example 1 in form 1.

FIGS. 38 and 39 illustrate detailed examples 1 of form 1. In these detailed examples 1, configurations are illustrated in which padding is added to an FEC block header that includes a base header and an EXT byte. It should be noted that a padding length is denoted as "Padding" in this detailed example.

(3-1-1A): Padding=1, EXT=1, TS=0

A of FIG. 38 illustrates an FEC block header configuration in the case where the padding length is one byte (1B) and in the case where '1' is specified as an EXT flag and '0' is specified as a TS flag.

Although, in A of FIG. 38, not only a 15-bit first TLV packet position pointer but also a one-bit EXT flag are provided in the base header, '1' is specified as an EXT flag. Therefore, the next byte following the base header is an EXT byte as an optional header.

In this EXT byte, '00' is specified as a padding value in the first two bits, and '0' is specified as a TS flag in the one bit that follows. Also, a CRC flag, a '0,' and bits reserved for future use, are provided in the remaining five bits of the EXT byte.

As described above, one-byte (1B) padding is realized by a one-byte (1B) EXT byte in the FEC block header illustrated in A of FIG. 38.

(3-1-1B): Padding=2, EXT=1, TS=0

B of FIG. 38 illustrates an FEC block header configuration in the case where the padding length is two bytes (2B) and in the case where '1' is specified as an EXT flag and '0' is specified as a TS flag.

In B of FIG. 38, '1' is specified as an EXT flag. Therefore, the next byte following the base header is an EXT byte. Because '01' is specified as a padding value in the first two bits of this EXT byte, the next byte following the EXT byte is additional 1B padding.

Also, in the EXT byte, '0' is specified as a TS flag in the one bit that follows the first two bits. It should be noted that a CRC flag, a '0,' and bits reserved for future use, are provided in the remaining five bits of the EXT byte.

As described above, padding of a total of two bytes (2B) is realized by a one-byte (1B) EXT byte and one-byte (1B) additional padding in the FEC block header illustrated in B of FIG. 38.

(3-1-C): Padding=3, EXT=1, TS=0

C of FIG. 38 illustrates an FEC block header configuration in the case where the padding length is three bytes (3B) and in the case where '1' is specified as an EXT flag and '0' is specified as a TS flag.

In C of FIG. 38, '1' is specified as an EXT flag. Therefore, the next byte following the base header is an EXT byte. Because '10' is specified as a padding value in the first two bits of this EXT byte, the next two bytes following the EXT byte indicate the length of additional padding.

Because '0' ('00000000 00000000') is specified here as a two-byte additional padding length, this indicates that no more padding is added.

Also, in the EXT byte, '0' is specified as a TS flag in the bit following the first two bits. It should be noted that a CRC flag, a '0,' and bits reserved for future use, are provided in the remaining five bits of the EXT byte.

As described above, padding of a total of three bytes (3B) is realized by a one-byte (1B) EXT byte and a two-byte (2B) additional padding length in the FEC block header illustrated in C of FIG. 38.

(3-1-1D): Padding=4, EXT=1, TS=0

D of FIG. 39 illustrates an FEC block header configuration in the case where the padding length is four bytes (4B) and in the case where '1' is specified as an EXT flag and '0' is specified as a TS flag.

In D of FIG. 39, '1' is specified as an EXT flag. Therefore, the next byte following the base header is an EXT byte. Because '10' is specified as a padding value in the first two bits of this EXT byte, the next two bytes following the EXT byte indicate the length of additional padding.

Because '1' ('00000000 00000001') is specified here as a two-byte additional padding length, one-byte (1B) padding is further added.

Also, in the EXT byte, '0' is specified as a TS flag in the bit following the first two bits. It should be noted that a CRC flag, a '0,' and bits reserved for future use, are provided in the remaining five bits of the EXT byte.

As described above, padding of a total of four bytes (4B) is realized by a one-byte (1B) EXT byte, a two-byte (2B) additional padding length, and one-byte (1B) additional padding in the FEC block header illustrated in D of FIG. 39.

(3-1-1E): Padding=12348, EXT=1, TS=0

E of FIG. 39 illustrates an FEC block header configuration in the case where the padding length is 12348 bytes (12348B) and in the case where '1' is specified as an EXT flag and '0' is specified as a TS flag.

In FIG. 39, '1' is specified as an EXT flag. Therefore, the next byte following the base header is an EXT byte. Because '10' is specified as a padding value in the first two bits of this EXT byte, the next two bytes following the EXT byte indicate the length of additional padding.

Because '1' ('00110000 00111001') is specified here as a two-byte additional padding length, 12345-byte (12345B) padding is further added.

Also, in the EXT byte, '0' is specified as a TS flag in the bit following the first two bits. It should be noted that a CRC flag, a '0,' and bits reserved for future use, are provided in the remaining five bits of the EXT byte.

As described above, padding of a total of 12348 bytes (12348B) is realized by a one-byte (1B) EXT byte, a two-byte (2B) additional padding length, and 12345-byte (12345B) additional padding in the FEC block header illustrated in E of FIG. 39.

Detailed Examples 2 of Form 1

Figure 41:
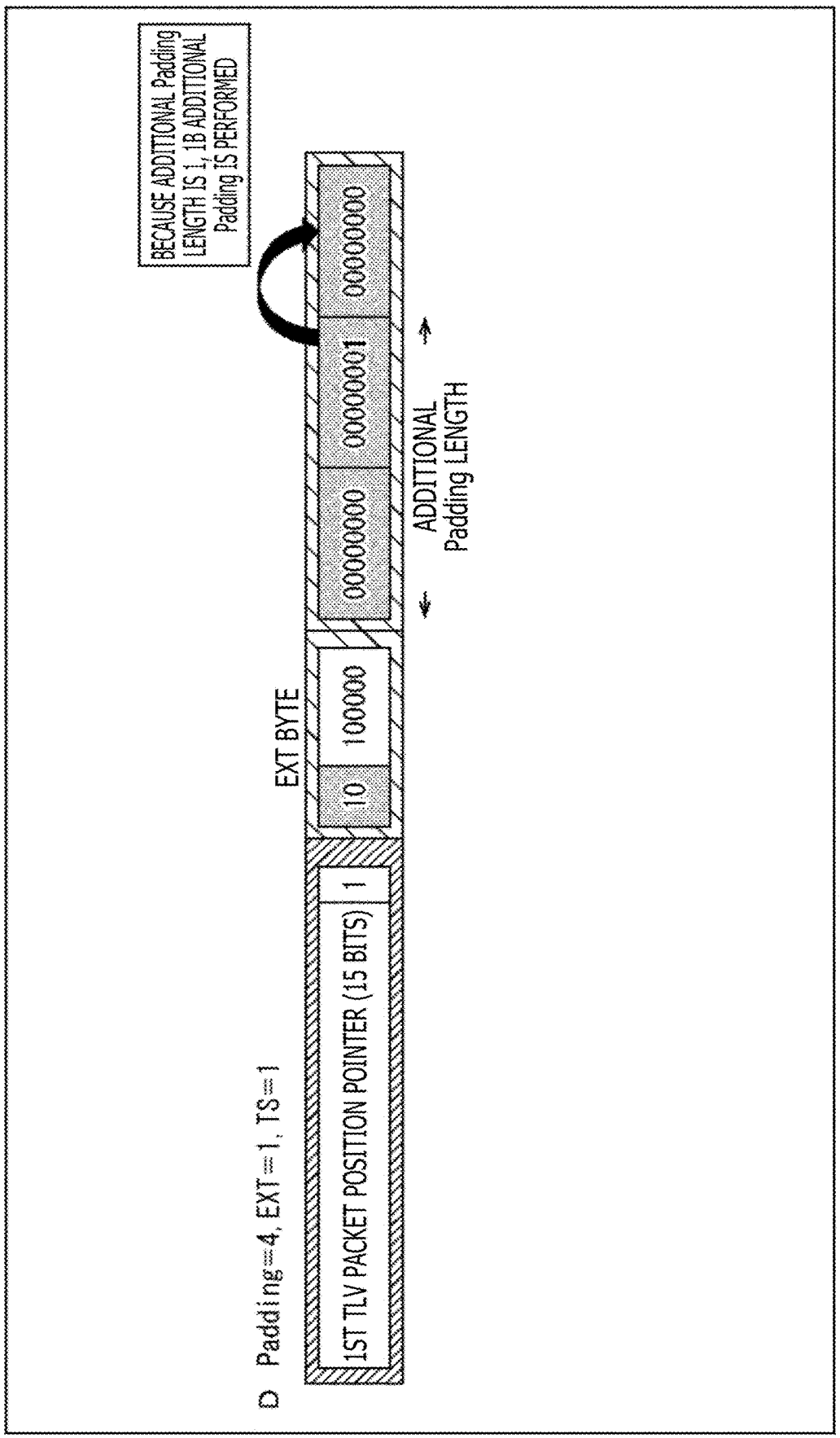
FIG. 41 is a diagram illustrating detailed example 2 in form 1.

FIGS. 40 and 41 illustrate detailed examples 2 of form 1. In these detailed examples 2, configurations are also illustrated in which padding is added to an FEC block header that includes a base header and an EXT byte as in the detailed example 1 described above.

(3-1-2A): Padding=1, EXT=1, TS=1

A of FIG. 40 illustrates an FEC block header configuration in the case where the padding length is one byte (1B) and in the case where '1' is specified as an EXT flag and '1' is specified as a TS flag.

In A of FIG. 40, a first TLV packet position pointer and an EXT flag are provided in the base header, and '1' is specified as an EXT flag. Therefore, the next byte following the base header is an EXT byte as an optional header.

In this EXT byte, '00' is specified as a padding value in the first two bits, and '1' is specified as a TS flag in the one bit that follows. In this case, the packet provided in the FEC block is a TS packet. Therefore, the first TLV packet position pointer indicates the TS packet position (start position) in the FEC block. Also, a CRC flag, a '0,' and bits reserved for future use, are provided in the remaining five bits of the EXT byte.

As described above, one-byte (1B) padding is realized by a one-byte (1B) EXT byte in the FEC block header illustrated in A of FIG. 40.

(3-1-2B): Padding=2, EXT=1, TS=1

B of FIG. 40 illustrates an FEC block header configuration in the case where the padding length is two bytes (2B) and in the case where '1' is specified as an EXT flag and '1' is specified as a TS flag.

In B of FIG. 40, '1' is specified as an EXT flag. Therefore, the next byte following the base header is an EXT byte. Because '01' is specified as a padding value in the first two bits of this EXT byte, the next byte following the EXT byte is additional 1B padding.

Also, in the EXT byte, '1' is specified as a TS flag in the one bit that follows the first two bits. It should be noted that a CRC flag, a '0,' and bits reserved for future use, are provided in the remaining five bits of the EXT byte.

As described above, padding of a total of two bytes (2B) is realized by a one-byte (1B) EXT byte and one-byte (1B) additional padding in the FEC block header illustrated in B of FIG. 40.

(3-1-2C): Padding=3, EXT=1, TS=1

C of FIG. 40 illustrates an FEC block header configuration in the case where the padding length is three bytes (3B) and in the case where '1' is specified as an EXT flag and '1' is specified as a TS flag.

In C of FIG. 40, '1' is specified as an EXT flag. Therefore, the next byte following the base header is an EXT byte. Because '10' is specified as a padding value in the first two bits of this EXT byte, the next two bytes following the EXT byte indicate the length of additional padding.

Because '0' ('00000000 00000000') is specified here as a two-byte additional padding length, this indicates that no more padding is added.

Also, in the EXT byte, '1' is specified as a TS flag in the bit following the first two bits. It should be noted that a CRC flag, a '0,' and bits reserved for future use, are provided in the remaining five bits of the EXT byte.

As described above, padding of a total of three bytes (3B) is realized by a one-byte (1B) EXT byte and a two-byte (2B) additional padding length in the FEC block header illustrated in C of FIG. 40.

(3-1-2D): Padding=4, EXT=1, TS=1

D of FIG. 41 illustrates an FEC block header configuration in the case where the padding length is four bytes (4B) and in the case where '1' is specified as an EXT flag and '1' is specified as a TS flag.

In D of FIG. 41, '1' is specified as an EXT flag. Therefore, the next byte following the base header is an EXT byte. Because '10' is specified as a padding value in the first two bits of this EXT byte, the next two bytes following the EXT byte indicate the length of additional padding.

Because '1' ('00000000 00000001') is specified here as a two-byte additional padding length, one-byte (1B) padding is further added after the additional padding length.

Also, in the EXT byte, '1' is specified as a TS flag in the bit following the first two bits. It should be noted that a CRC flag, a '0,' and bits reserved for future use, are provided in the remaining five bits of the EXT byte.

As described above, padding of a total of four bytes (4B) is realized by a one-byte (1B) EXT byte, a two-byte (2B) additional padding length, and one-byte (1B) additional padding in the FEC block header illustrated in D of FIG. 41.

Detailed Examples 3 of Form 1

Figure 43:
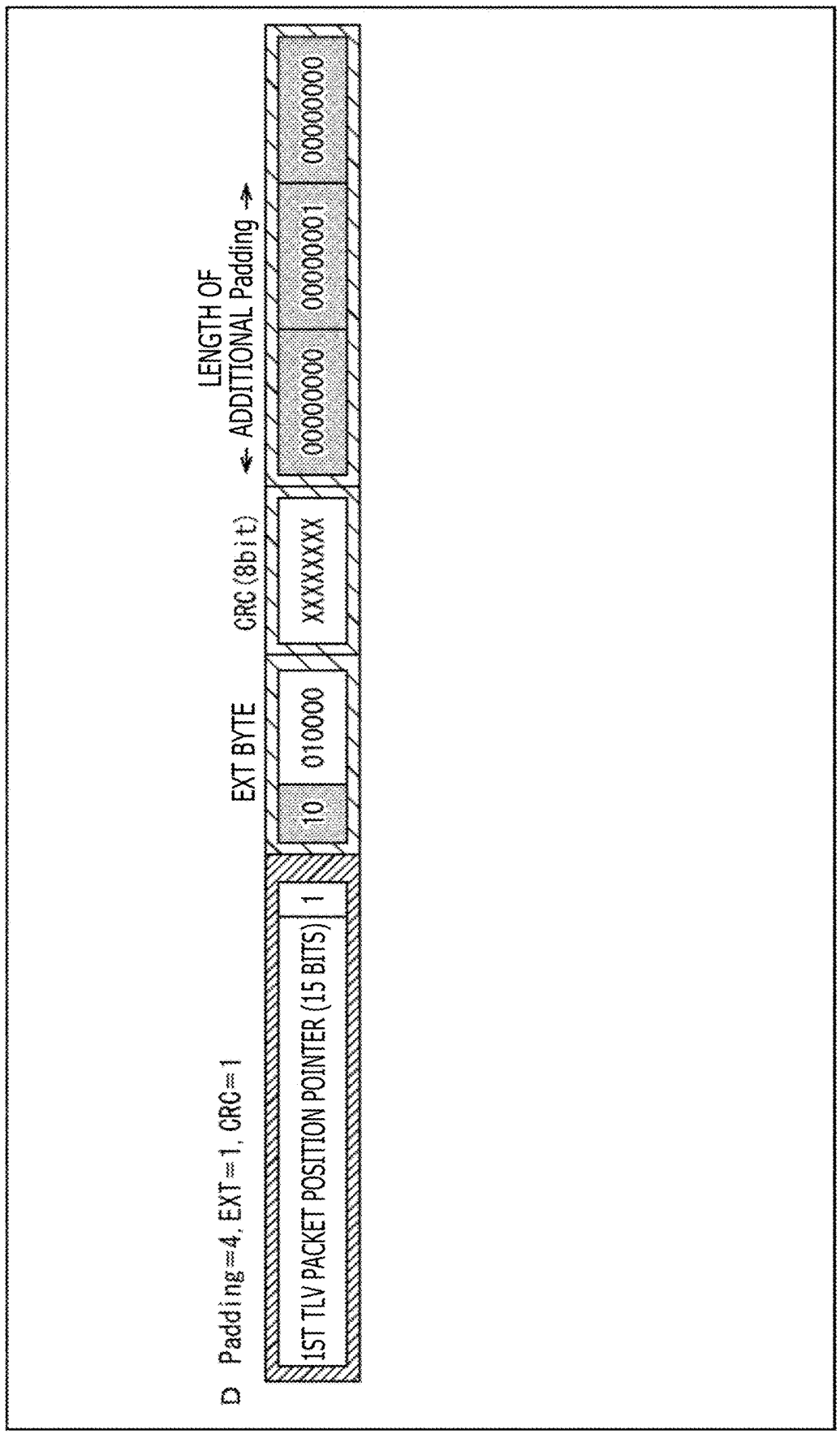
FIG. 43 is a diagram illustrating detailed example 3 in form 1.

FIGS. 42 and 43 illustrate detailed examples 3 of form 1. In these detailed examples 3, configurations are illustrated in which padding is added to an FEC block header that includes a base header, an EXT byte, and a CRC.

(3-1-3A): Padding=1, EXT=1, CRC=1

A of FIG. 42 illustrates an FEC block header configuration in the case where the padding length is one byte (1B) and in the case where '1' is specified as an EXT flag and '1' is specified as a CRC flag.

In A of FIG. 42, a first TLV packet position pointer and an EXT flag are provided in the base header, and '1' is specified as an EXT flag. Therefore, the next byte following the base header is an EXT byte as an optional header.

In this EXT byte, '00' is specified as a padding value in the first two bits, and '0' is specified as a TS flag in the one bit that follows. Then, "1" is specified as a CRC flag in the one bit that further follows the TS flag bit. Therefore, a one-byte (eight-bit) CRC is added after the EXT byte.

As described above, one-byte (1B) padding is realized by a one-byte (1B) EXT byte in the FEC block header illustrated in A of FIG. 42.

(3-1-3B): Padding=2, EXT=1, CRC=1

B of FIG. 42 illustrates an FEC block header configuration in the case where the padding length is two bytes (2B) and in the case where '1' is specified as an EXT flag and '1' is specified as a CRC flag.

In B of FIG. 42, '1' is specified as an EXT flag. Therefore, the next byte following the base header is an EXT byte. '01' is specified as a padding value in the first two bits of this EXT byte, and '1' is specified as a CRC flag in the bit that follows.

Therefore, one-byte CRC is added after the EXT byte, and further, the next byte following this CRC is additional 1B padding.

As described above, padding of a total of two bytes (2B) is realized by a one-byte (1B) EXT byte and one-byte (1B) additional padding in the FEC block header illustrated in B of FIG. 42.

(3-1-3C): Padding=3, EXT=1, CRC=1

C of FIG. 42 illustrates an FEC block header configuration in the case where the padding length is three bytes (3B) and in the case where '1' is specified as an EXT flag and '1' is specified as a CRC flag.

In C of FIG. 42, '1' is specified as an EXT flag. Therefore, the next byte following the base header is an EXT byte. '10' is specified as a padding value in the first two bits of this EXT byte, and '1' is specified as a CRC flag in the bit that follows. Therefore, one-byte CRC is added after the EXT byte, and further, the next two bytes following this CRC indicate the length of additional padding.

Because '0' ('00000000 00000000') is specified here as a two-byte additional padding length, this indicates that no more padding is added.

As described above, padding of a total of three bytes (3B) is realized by a one-byte (1B) EXT byte and a two-byte (2B) additional padding length in the FEC block header illustrated in C of FIG. 42.

(3-1-3D): Padding=4, EXT=1, CRC=1

D of FIG. 43 illustrates an FEC block header configuration in the case where the padding length is four bytes (4B) and in the case where '1' is specified as an EXT flag and '1' is specified as a CRC flag.

In D of FIG. 43, '1' is specified as an EXT flag. Therefore, the next byte following the base header is an EXT byte. '10' is specified as a padding value in the first two bits of this EXT byte, and '1' is specified as a CRC flag in the bit that follows. Therefore, one-byte CRC is added after the EXT byte, and further, the next two bytes following this CRC indicate the length of additional padding.

Because '1' ('00000000 00000001') is specified here as a two-byte additional padding length, one-byte (1B) padding is further added.

As described above, padding of a total of four bytes (4B) is realized by a one-byte (1B) EXT byte, a two-byte (2B) additional padding length, and one-byte (1B) additional padding in the FEC block header illustrated in FIG. 43.

A description has been described above of the FEC block header configurations of the first form. In this first form, 15 bits are reserved for the base header of the FEC block header in consideration of the maximum value of the first TLV packet position pointer. As a result, all code lengths can be supported, namely, a long code whose maximum number of bits (Num Bits) is 15, a middle code whose maximum number of bits is 13, and a short code whose maximum number of bits is 11. This makes it possible to provide an extremely simplified FEC block header configuration.

(3-2) Second Form

A description will be given next of configurations of an FEC block header (FBH) of a second form (hereinafter also denoted as form 2) with reference to FIGS. 44 to 47.

It should be noted that, in the second form, a case will be described in which, on the premise that a long code does not exist in the target standard, 11 bits corresponding to a short code and 13 bits corresponding to a middle code are reserved as first TLV packet position pointer bits in the base header of the FEC block header.

(FEC Block Header Format)

Figure 44:
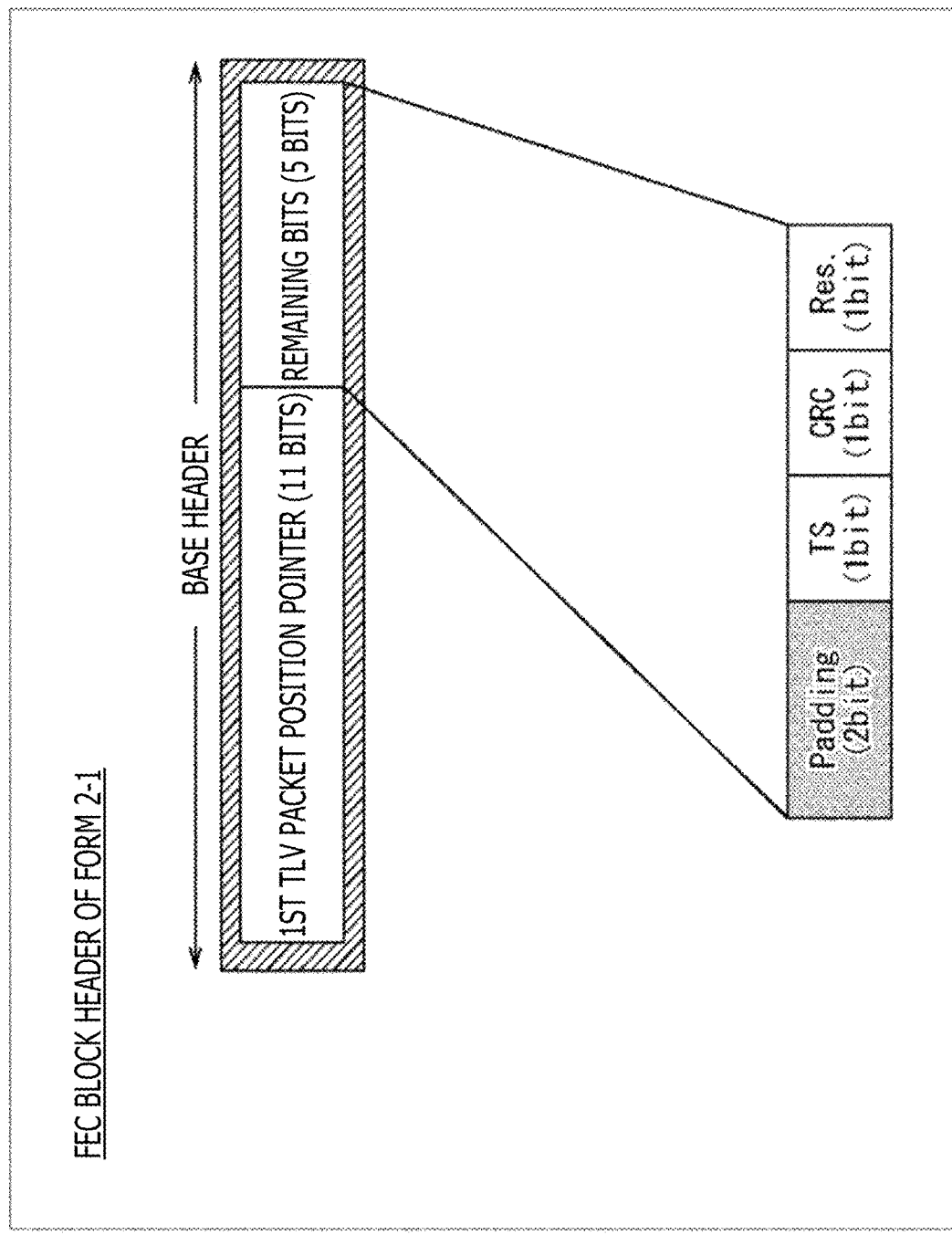
FIG. 44 is a diagram illustrating an example of an FEC block header format in form 2-1.

FIG. 44 is a diagram illustrating an example of an FEC block header format in form 2-1.

In FIG. 44, a two-byte base header includes an 11-bit first TLV packet position pointer and remaining bits (5 bits).

The first TLV packet position pointer is a pointer that indicates the position of the first TLV packet in the FEC block including the FEC block header in which the first TLV packet position pointer is provided. In a base header in form 2-1, 11 bits are reserved for this first TLV packet position pointer. Therefore, the first TLV packet position pointer can be used as a pointer for a short code.

The remaining five bits are assigned to a two-bit padding value, a one-bit TS flag, a one-bit CRC flag, and a one-bit reserved field.

As a padding value, for example, a value corresponding to the content illustrated in FIG. 45 is specified. The padding values in this form 2-1 are similar to the contents of the padding values in the form (FIG. 36) described above. Therefore, the description thereof is omitted here.

The TS flag is a flag that identifies a TS packet. The CRC flag is a flag that indicates whether there is a CRC, an error detection code. The reserved field is a field for future use.

(FEC Block Header Format)

Figure 46:
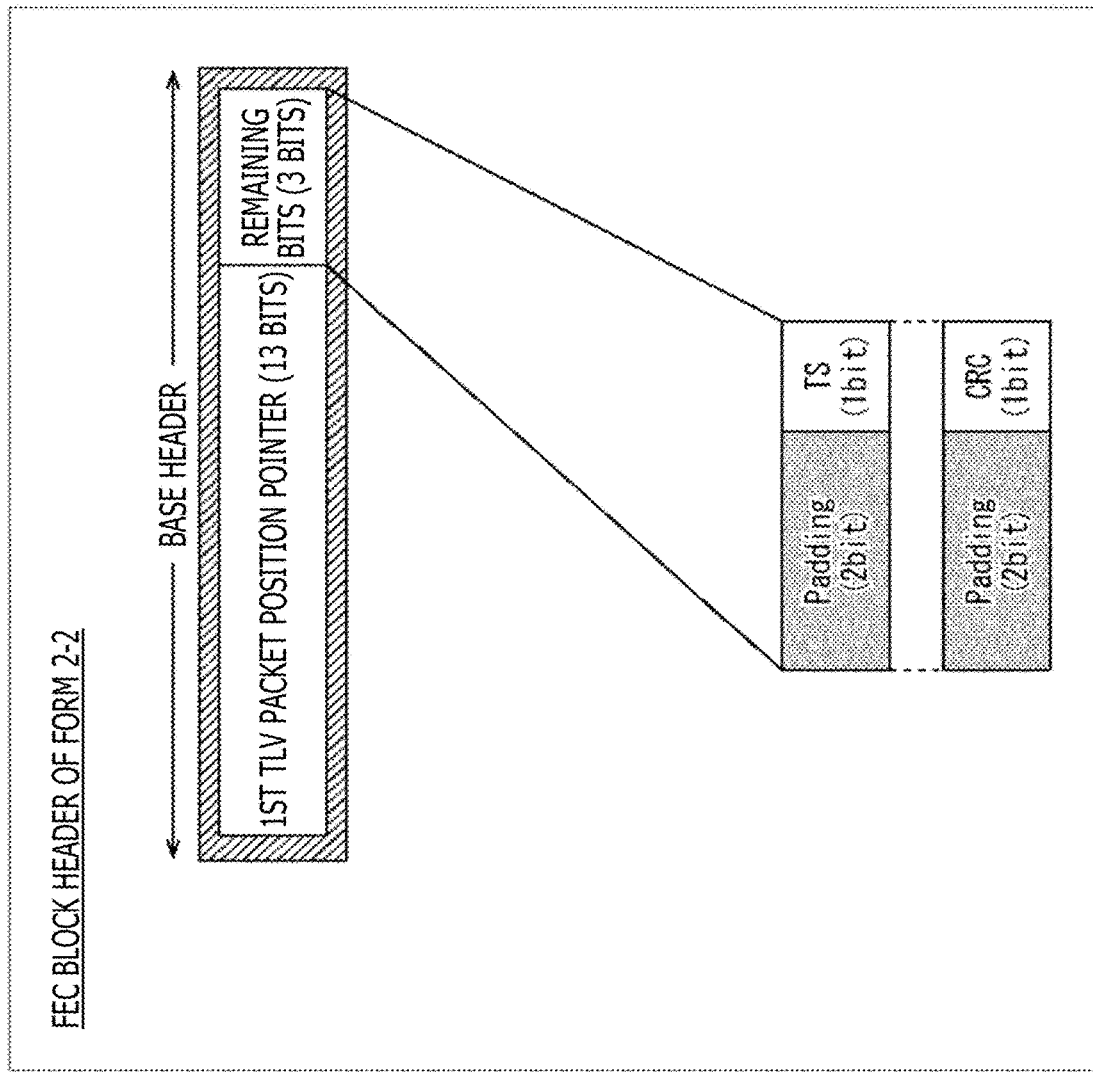
FIG. 46 is a diagram illustrating an example of an FEC block header format in form 2-2.

FIG. 46 is a diagram illustrating an example of an FEC block header format in form 2-2.

In FIG. 46, a two-byte base header includes a 13-bit first TLV packet position pointer and remaining bits (3 bits).

The first TLV packet position pointer is a pointer that indicates the position of the first TLV packet in the FEC block including the FEC block header in which the first TLV packet position pointer is provided. In a base header in form 2-2, 13 bits are reserved for this first TLV packet position pointer. Therefore, the first TLV packet position pointer can be used as a pointer for middle and short codes.

The remaining three bits are assigned to a two-bit padding value, a one-bit TS flag, or a one-bit CRC flag. That is, in the base header, a padding value is required. However, whether to place a TS flag or a CRC flag is optional.

As a padding value, for example, a value corresponding to the content illustrated in FIG. 47 is specified. The padding values in this form 2-2 are similar to the contents of the padding values in the form (FIG. 36) described above. Therefore, the description thereof is omitted here.

The TS flag is a flag that identifies a TS packet. The CRC flag is a flag that indicates whether there is a CRC, an error detection code.

A description has been described above of the FEC block header configurations of the second form. In this second form, 11 or 13 bits are reserved for the base header of the FEC block header on the premise that a long code does not exist in the target standard. As a result, a short code whose maximum number of bits (Num Bits) is 11 or a middle code whose maximum number of bits is 13 can be supported. Therefore, in the case where a long code does not exist in the target standard, it is possible to provide an extremely simplified FEC block header configuration.

(3-3) Third Form

A description will be given next of configurations of an FEC block header (FBH) of a third form (hereinafter also denoted as form 3) with reference to FIGS. 48 to 60.

(FEC Block Header Format)

Figure 48:
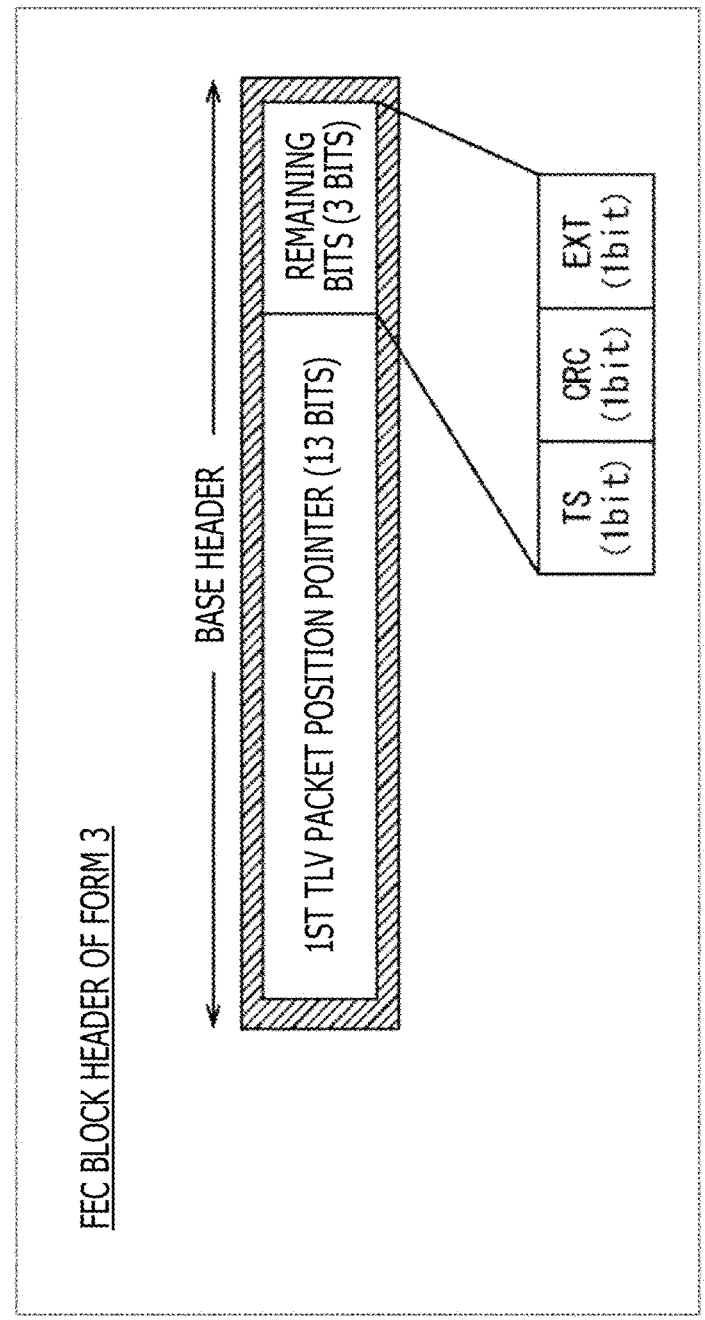
FIG. 48 is a diagram illustrating an example of an FEC block header format in form 3.

FIG. 48 is a diagram illustrating an example of an FEC block header format of form 3.

In FIG. 48, a two-byte base header includes a 13-bit first TLV packet position pointer and remaining bits (3 bits).

The first TLV packet position pointer is a pointer that indicates the position of the first TLV packet in the FEC block including the FEC block header in which the first TLV packet position pointer is provided. In a base header in form 3, 13 bits are reserved for this first TLV packet position pointer.

The remaining three bits are assigned to a one-bit TS flag, a one-bit CRC flag, and a one-bit EXT flag. The details of the TS flag and the CRC flag are as described earlier.

The EXT flag is a flag that indicates whether an extension field (Extension) exists. For example, in the case where '1' is specified as an EXT flag, the next byte following the base header is an EXT byte.

Figure 49:
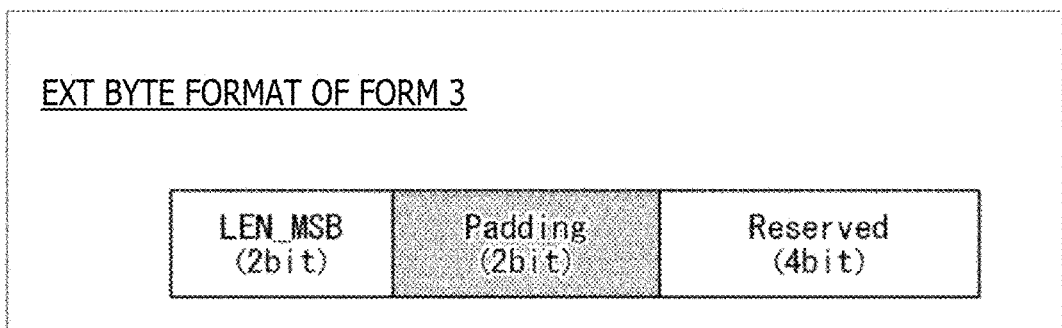
FIG. 49 is a diagram illustrating an example of an EXT byte format in form 3.

FIG. 49 illustrates an example of an EXT byte format. In FIG. 49, the one-byte EXT byte includes two-bit LEN_MSB, a two-bit padding value, and a four-bit reserved field.

In the case of a long code, the maximum value of the first TLV packet position pointer is 15 bits. As a result, 13 bits assigned to the base header are not enough. The two bits of LEN_MSB are used to compensate for the lacking two bits. It should be noted that, in the case of a short or middle code, 13 bits assigned to the base header are enough. Therefore, the two bits of LEN_MSB are not used.

That is, in the case of a short or middle code, it is possible to support the maximum value of the first TLV packet position pointer (11 bits or 13 bits) by using the 13 bits assigned to the base header. In the case of a long code, on the other hand, 13 bits assigned to the base header are not enough. Therefore, the two bits of LEN_MSB are further used, thus providing a total of 15 bits and supporting the maximum value of the first TLV packet position pointer (15 bits).

As a padding value, for example, a value corresponding to the content illustrated in FIG. 50 is specified. The padding values in this form 3 are similar to the contents of the padding values in the form 1 (FIG. 36) described above. Therefore, the description thereof is omitted here. The reserved field is a field for future use.

(FEC Block Header Format)

Figure 51:
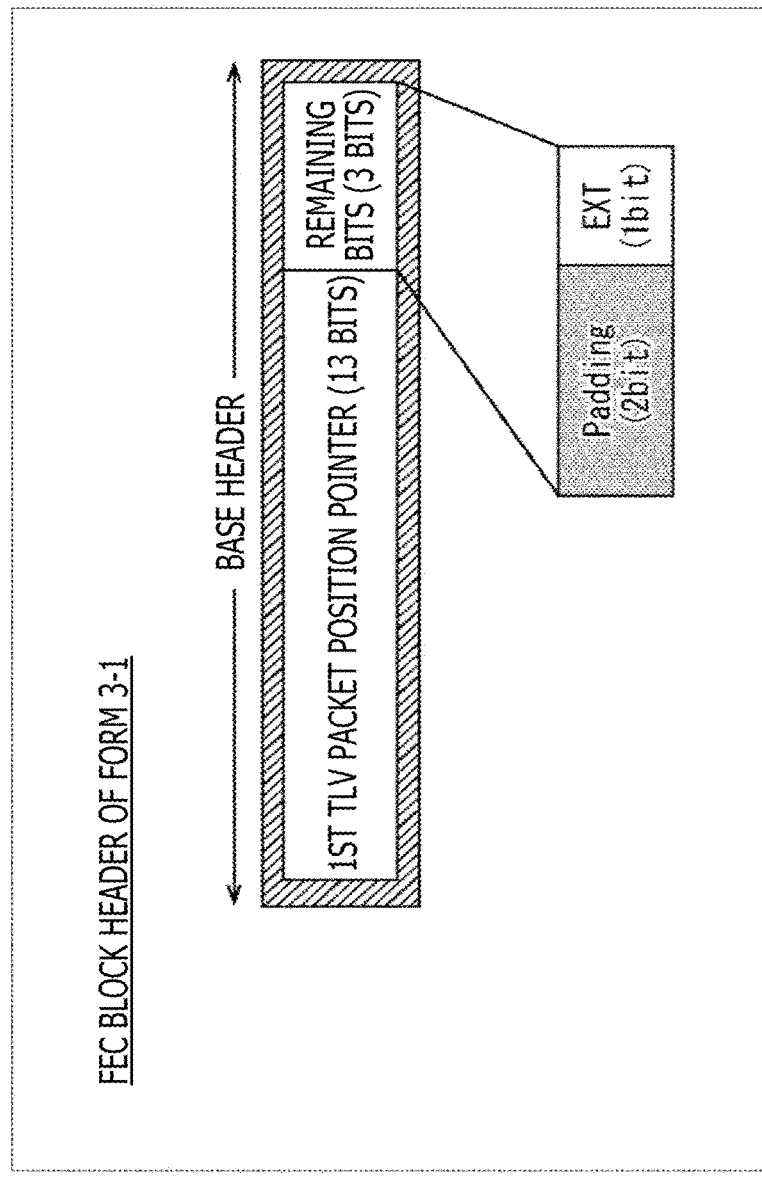
FIG. 51 is a diagram illustrating an example of an FEC block header format in form 3-1.

FIG. 51 is a diagram illustrating an example of an FEC block header format in form 3-1.

In FIG. 51, a two-byte base header includes a 13-bit first TLV packet position pointer and remaining bits (3 bits).

Form 3-1 has a commonality with the form 3 described above in that the number of bits of the first TLV packet position pointer is 13 but differs therefrom in that the remaining three bits are assigned to a two-bit padding value and a one-bit EXT flag.

As a padding value, for example, a value corresponding to the content illustrated in FIG. 52 is specified. The padding values in this form 3-1 are similar to the contents of the padding values in the form 1 (FIG. 36) described above. Therefore, the description thereof is omitted here.

Also, the EXT flag is a flag that indicates whether an extension field (Extension) exists. For example, in the case where '1' is specified as an EXT flag, the byte following the base header is an EXT byte.

FIG. 53 illustrates an example of an EXT byte format. In FIG. 53, the one-byte EXT byte includes two-bit LEN_MSB, a one-bit TS flag, a one-bit CRC flag, and a four-bit reserved field.

In the case of a long code, the maximum value of the first TLV packet position pointer is 15 bits. As a result, 13 bits assigned to the base header are not enough. The two bits of LEN_MSB are used to compensate for the lacking two bits. It should be noted that, in the case of a short or middle code, the two bits of LEN_MSB are not used.

That is, in the case of a short or middle code, it is possible to support the maximum value of the first TLV packet position pointer (11 bits or 13 bits) by using the 13 bits assigned to the base header. In the case of a long code, on the other hand, 13 bits assigned to the base header are not enough. Therefore, the two bits of LEN_MSB are further used, thus providing a total of 15 bits and supporting the maximum value of the first TLV packet position pointer (15 bits).

The details of the TS flag and the CRC flag are as described earlier. Also, the reserved field is a field for future use.

A description will be given next of more specific detailed examples of form 3-1. In the description given below, the FEC block header and the TLV packet are not illustrated, and only the FEC block header is illustrated as in the detailed example of the form 1 described above.

Detailed Examples 1 of Form 3-1

Figure 55:
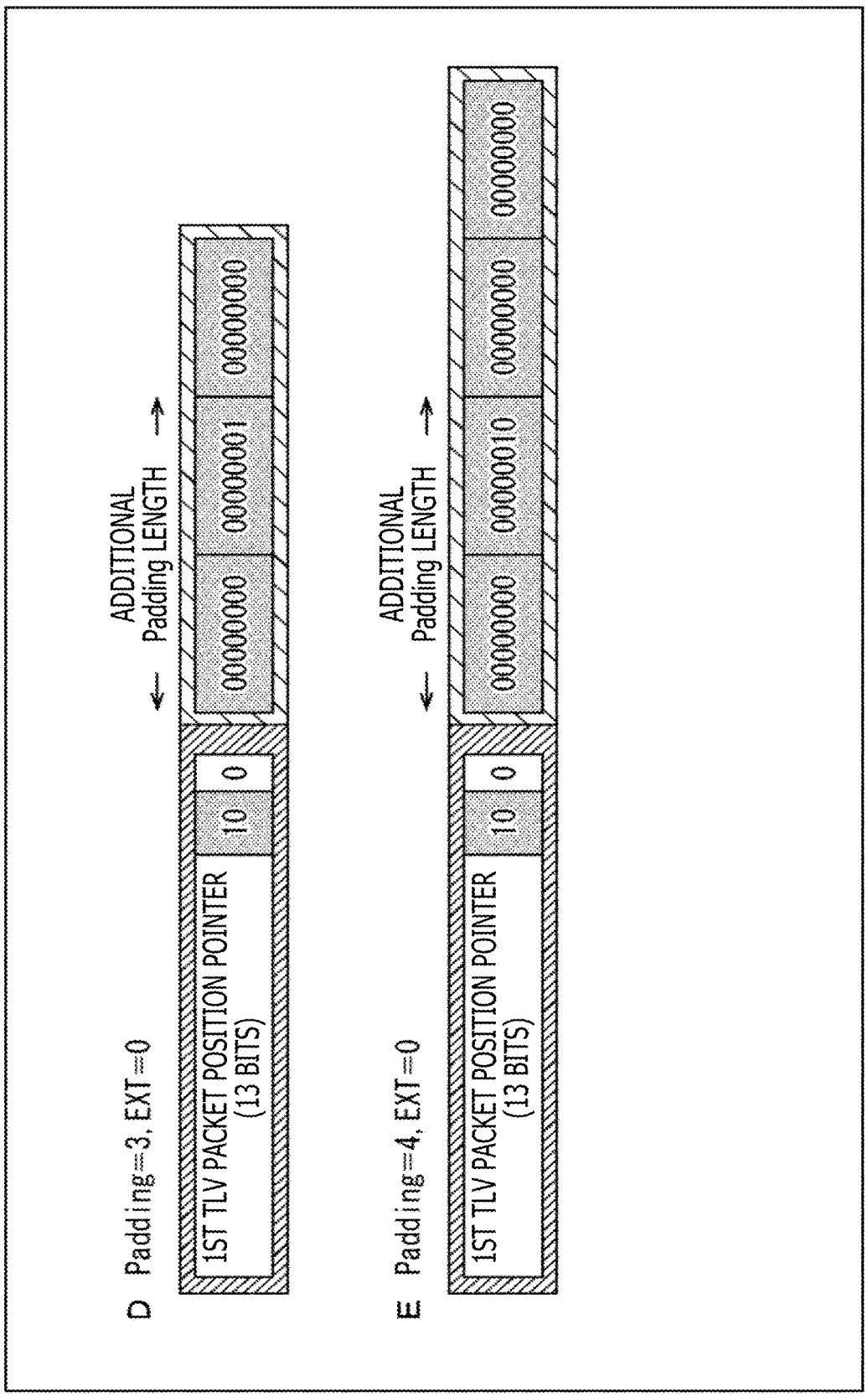
FIG. 55 depicts diagrams illustrating detailed example 1 in form 3-1.
Figure 56:
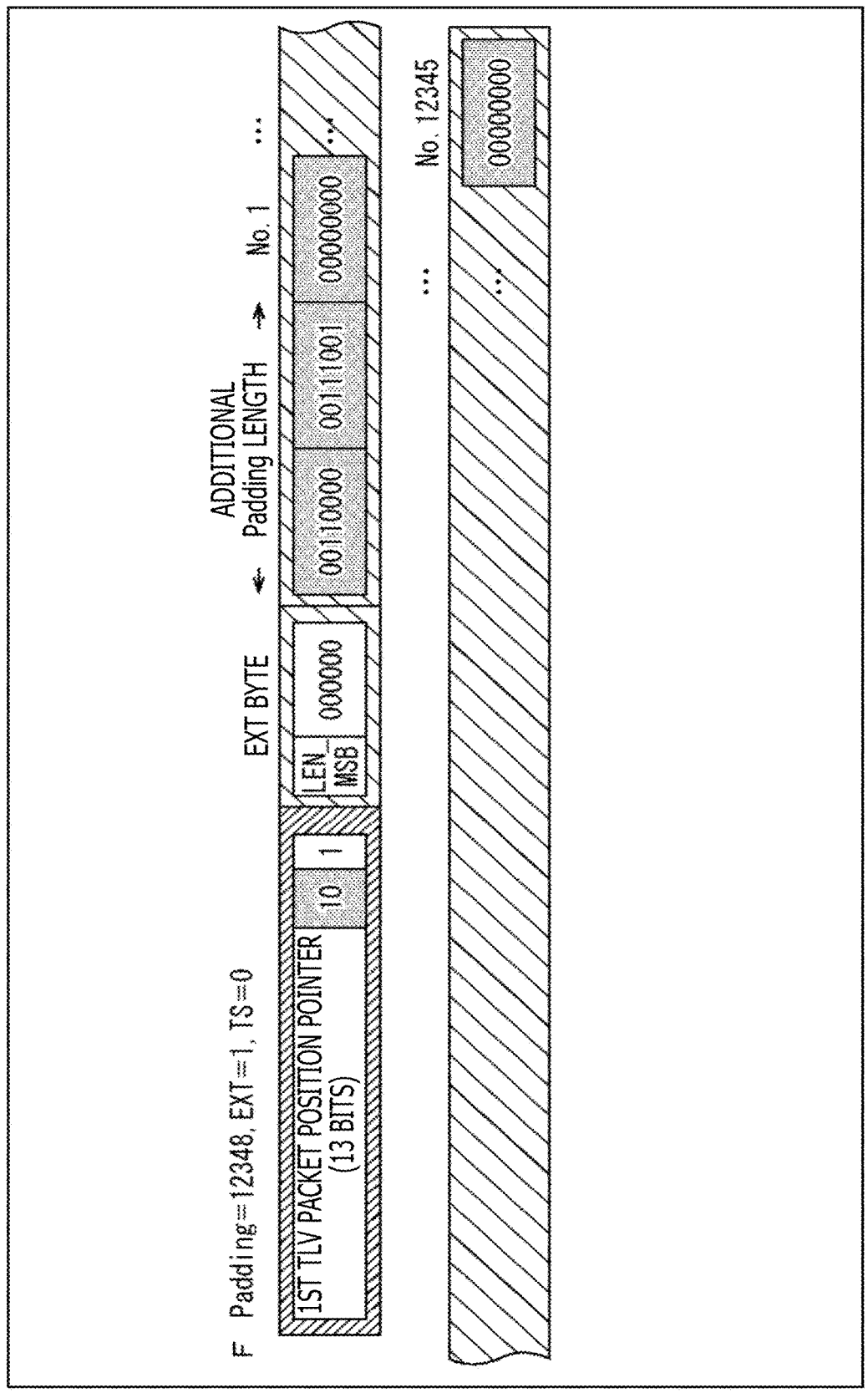
FIG. 56 is a diagram illustrating detailed example 1 in form 3-1.

FIGS. 54 to 56 illustrate detailed examples 1 of form 3-1. In these detailed examples 1, configurations are illustrated in which padding is added to an FEC block header that includes a base header.

(3-3-1A): No padding, EXT=0

A of FIG. 54 illustrates an FEC block header configuration in the case where there is no padding and in the case where '0' is specified as an EXT flag.

Although, in A of FIG. 54, not only a 13-bit first TLV packet position pointer but also a two-bit padding value and a one-bit EXT flag are provided in the base header, '00' is specified as a padding value. Therefore, there is no additional padding. Further, '0' is specified as an EXT flag. Therefore, there is no extension with an EXT byte as an optional header.

As described above, the FEC block header illustrated in A of FIG. 54 has a configuration for the case in which no padding takes place.

(3-3-1B): Padding=1, EXT=0

B of FIG. 54 illustrates an FEC block header configuration in the case where the padding length is one byte (1B) and in the case where '0' is specified as an EXT flag.

In B of FIG. 54, '01' is specified as a padding value. Therefore, the next byte following the base header is 1B additional padding. It should be noted that because '0' is specified as an EXT flag, there is no extension with an EXT byte.

As described above, one-byte (1B) padding is realized by one-byte (1B) additional padding in the FEC block header illustrated in B of FIG. 54.

(3-3-1C): Padding=2, EXT=0

C of FIG. 54 illustrates an FEC block header configuration in the case where the padding length is two bytes (2B) and in the case where '0' is specified as an EXT flag.

In C of FIG. 54, '10' is specified as a padding value. Therefore, the next two bytes following the base header indicate the length of additional padding. Because '0' ('00000000 00000000') is specified here as a two-byte additional padding length, this indicates that no more padding is added.

It should be noted that because '0' is specified as an EXT flag, there is no extension with an EXT byte.

As described above, two-byte (2B) padding is realized by two-byte (2B) additional padding in the FEC block header illustrated in C of FIG. 54.

(3-3-1D): Padding=3, EXT=0

D of FIG. 55 illustrates an FEC block header configuration in the case where the padding length is three bytes (3B) and in the case where '0' is specified as an EXT flag.

In D of FIG. 55, '10' is specified as a padding value. Therefore, the next two bytes following the base header indicate the length of additional padding. Because '1' ('00000000 00000001') is specified here as a two-byte additional padding length, one-byte (1B) padding is further added after the additional padding length.

It should be noted that because '0' is specified as an EXT flag, there is no extension with an EXT byte.

As described above, padding of a total of three bytes (3B) is realized by a two-byte (2B) padding length and one-byte (1B) additional padding in the FEC block header illustrated in D of FIG. 55.

(3-3-1E): Padding=4, EXT=0

E of FIG. 55 illustrates an FEC block header configuration in the case where the padding length is four bytes (4B) and in the case where '0' is specified as an EXT flag.

In E of FIG. 55, '10' is specified as a padding value. Therefore, the next two bytes following the base header indicate the length of additional padding. Because '2' ('00000000 00000010') is specified here as a two-byte additional padding length, two-byte (2B) padding is added after the additional padding length.

It should be noted that because '0' is specified as an EXT flag, there is no extension with an EXT byte.

As described above, padding of a total of four bytes (4B) is realized by a two-byte (2B) additional padding length and two-byte (2B) additional padding in the FEC block header illustrated in E of FIG. 55.

(3-3-1F): Padding=12348, EXT=0

F of FIG. 56 illustrates an FEC block header configuration in the case where the padding length is 12348 bytes (12348B) and in the case where '1' is specified as an EXT flag.

In F of FIG. 56, '1' is specified as an EXT flag. Therefore, the next byte following the base header is an EXT byte.

Because '10' is specified as a padding value, the next two bytes following the EXT byte indicate the length of additional padding.

Because '12345' ('00110000 00111001') is specified here as a two-byte additional padding length, 12345-byte (12345B) padding is further added.

It should be noted that it is possible to support not only short and middle codes but also a long code as a first TLV packet position pointer by using two-bit LEN_MSB in the EXT byte.

As described above, padding of a total of 12348 bytes (12348B) is realized by a one-byte (1B) EXT byte, a two-byte (2B) additional padding length, and 12345-byte (12345B) additional padding in the FEC block header illustrated in F of FIG. 56.

Detailed Examples 2 of Form 3-1

Figure 58:
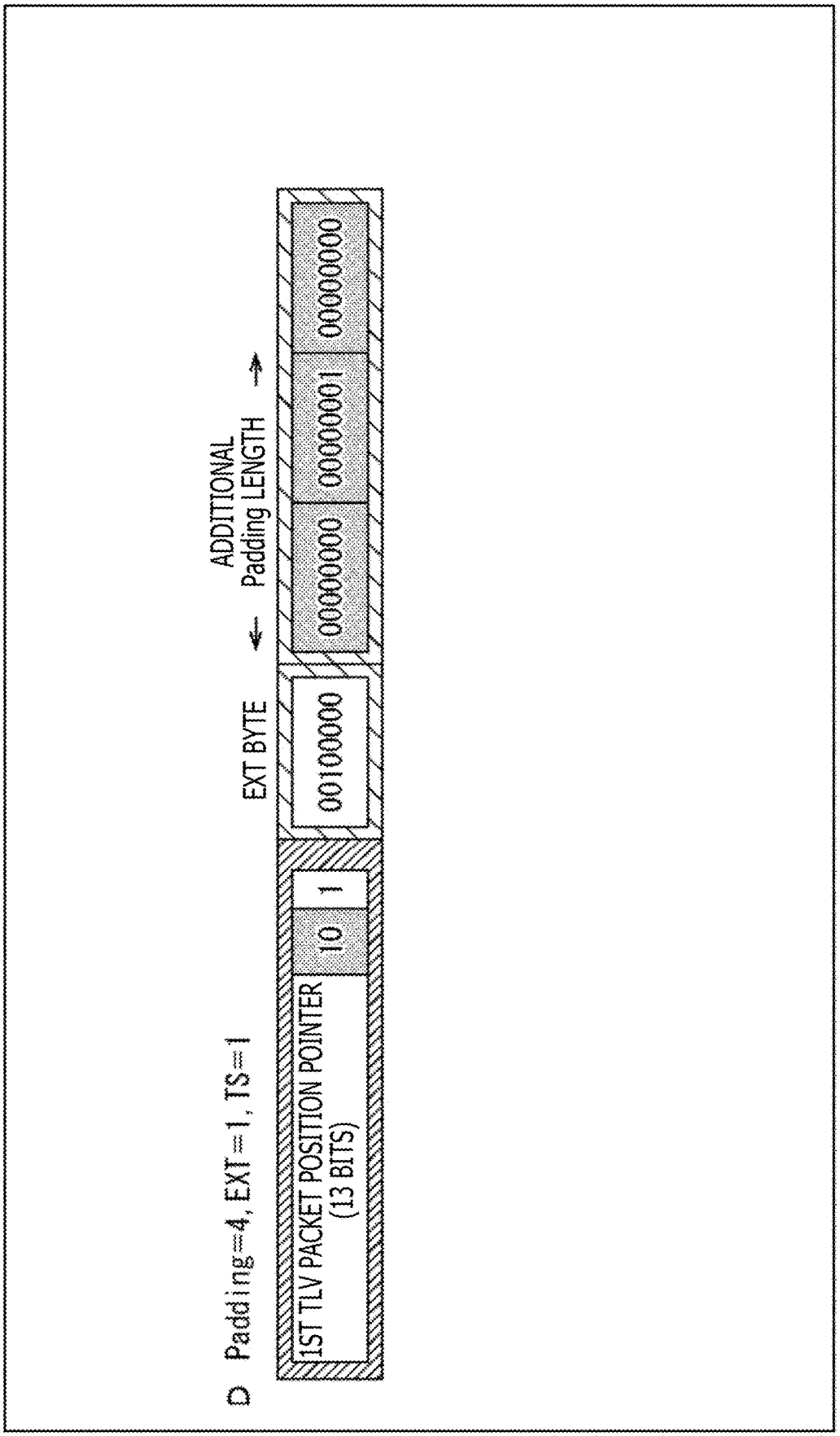
FIG. 58 is a diagram illustrating detailed example 2 in form 3-1.

FIGS. 57 and 58 illustrate detailed examples 2 of form 3-1. In these detailed examples 2, configurations are illustrated in which padding is added to an FEC block header that includes a base header and an EXT byte.

(3-3-2A): Padding=1, EXT=1, TS=1

A of FIG. 57 illustrates an FEC block header configuration in the case where the padding length is one byte (1B) and in the case where '1' is specified as an EXT flag.

Although, in A of FIG. 57, not only a 13-bit first TLV packet position pointer but also a two-bit padding value and a one-bit EXT flag are provided in the base header, '00' is specified as a padding value. Therefore, there is no additional padding. On the other hand, '1' is specified as an EXT flag. Therefore, the next byte following the base header is an EXT byte as an optional header.

It should be noted that '1' is specified as a TS flag in the EXT byte, and that, as a result, the packet provided in the FEC block is a TS packet. Therefore, the first TLV packet position pointer indicates the TS packet position (start position) in the FEC block.

As described above, one-byte (1B) padding is realized by a one-byte (1B) EXT byte in the FEC block header illustrated in A of FIG. 57.

(3-3-2B): Padding=2, EXT=1, TS=1

B of FIG. 57 illustrates an FEC block header configuration in the case where the padding length is two bytes (2B) and in the case where '1' is specified as an EXT flag and '1' is specified as a TS flag.

In B of FIG. 57, '1' is specified as an EXT flag. Therefore, the next byte following the base header is an EXT byte. Because '01' is specified as a padding value, the next byte following the EXT byte is additional 1B padding.

As described above, padding of a total of two bytes (2B) is realized by a one-byte (1B) EXT byte and one-byte (1B) additional padding in the FEC block header illustrated in B of FIG. 57.

(3-3-2C): Padding=3, EXT=1, TS=1

C of FIG. 57 illustrates an FEC block header configuration in the case where the padding length is three bytes (3B) and in the case where '1' is specified as an EXT flag.

In C of FIG. 57, '1' is specified as an EXT flag. Therefore, the next byte following the base header is an EXT byte. Also, because '10' is specified as a padding value, the next byte following the EXT byte indicates the length of additional padding.

Because '0' ('00000000 00000000') is specified here as a two-byte additional padding length, this indicates that no more padding is added.

As described above, padding of a total of three bytes (3B) is realized by a one-byte (1B) EXT byte and a two-byte (2B) additional padding length in the FEC block header illustrated in C of FIG. 57.

(3-3-2D): Padding=4, EXT=1, TS=1

D of FIG. 58 illustrates an FEC block header configuration in the case where the padding length is four bytes (4B) and in the case where '1' is specified as an EXT flag.

In D of FIG. 58, '1' is specified as an EXT flag. Therefore, the next byte following the base header is an EXT byte. Also, because '10' is specified as a padding value, the next byte following the EXT byte indicates the length of additional padding.

Because '1' ('00000000 00000001') is specified here as a two-byte additional padding length, one-byte (1B) padding is further added after the additional padding length.

As described above, padding of a total of four bytes (4B) is realized by a one-byte (1B) EXT byte, a two-byte (2B) additional padding length, and one-byte (1B) additional padding in the FEC block header illustrated in D of FIG. 58.

Detailed Examples 3 of Form 3-1

Figure 60:
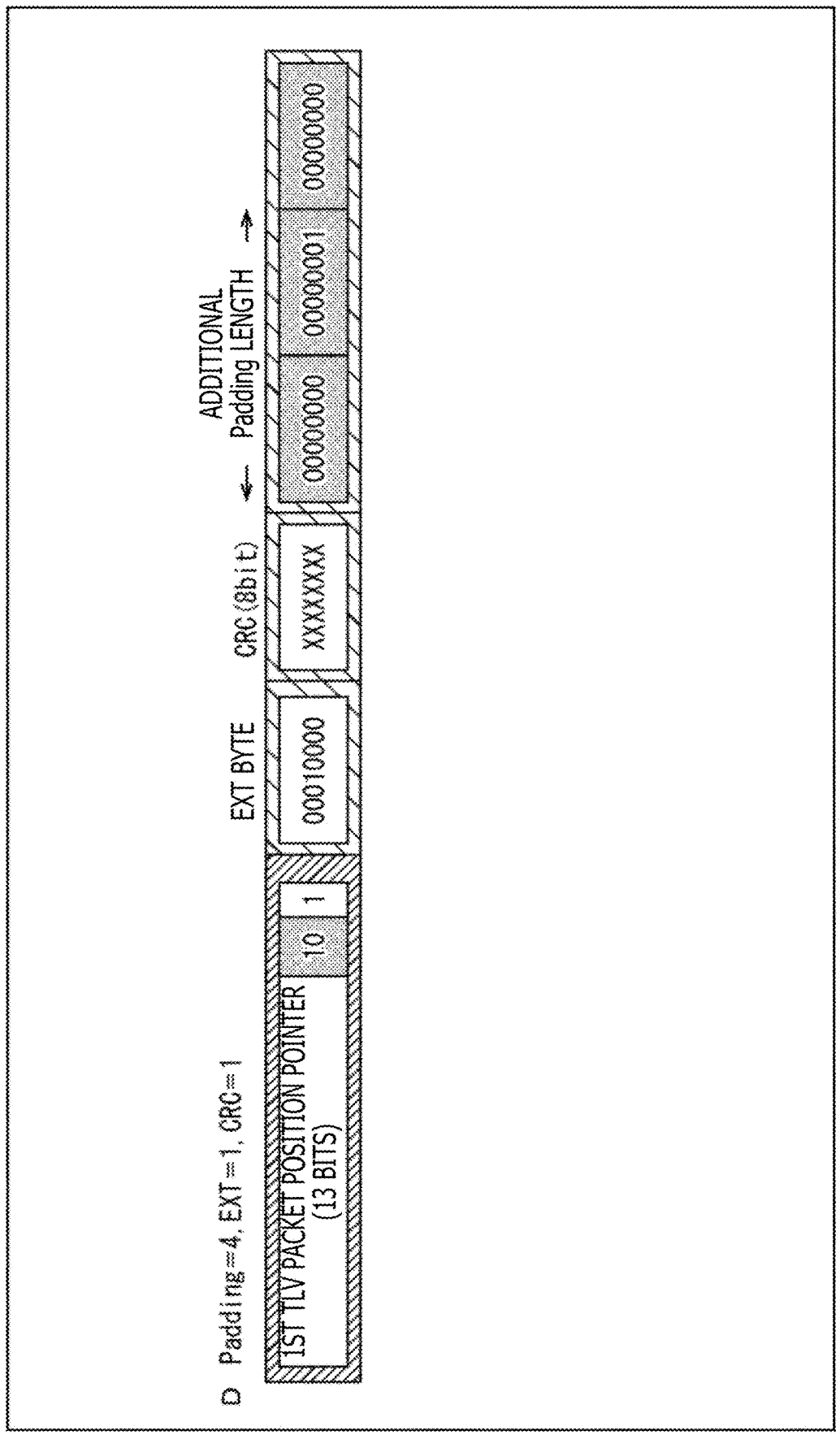
FIG. 60 is a diagram illustrating detailed example 3 in form 3-1.

FIGS. 59 and 60 illustrate detailed examples 3 of form 3-1. In these detailed examples 3, configurations are illustrated in which padding is added to an FEC block header that includes a base header, an EXT byte, and a CRC.

(3-3-3A): Padding=1, EXT=1, CRC=1

A of FIG. 59 illustrates an FEC block header configuration in the case where the padding length is one byte (1B) and in the case where '1' is specified as an EXT flag and '1' is specified as a CRC flag.

In A of FIG. 59, not only a 13-bit first TLV packet position pointer but also a two-bit padding value and a one-bit EXT flag are provided in the base header. Because '00' is specified as a padding value, there is no additional padding. On the other hand, '1' is specified as an EXT flag. Therefore, the next byte following the base header is an EXT byte as an optional header.

In this EXT byte, '1' is specified as a CRC flag in the fourth bit. Therefore, a one-byte (8 bits) CRC is added after the EXT byte.

As described above, one-byte (1B) padding is realized by a one-byte (1B) EXT byte in the FEC block header illustrated in A of FIG. 59.

(3-3-3B): Padding=2, EXT=1, CRC=1

B of FIG. 59 illustrates an FEC block header configuration in the case where the padding length is two bytes (2B) and in the case where '1' is specified as an EXT flag and '1' is specified as a CRC flag.

In B of FIG. 59, '1' is specified as an EXT flag. Therefore, the next byte following the base header is an EXT byte. Because '1' is specified as a CRC flag in the fourth bit of this EXT byte, a one-byte (8-bit) CRC is added after the EXT byte.

Also, '01' is specified as a padding value in the base header. Therefore, the next byte following the CRC is 1B additional padding.

As described above, padding of a total of two bytes (2B) is realized by a one-byte (1B) EXT byte and one-byte (1B) additional padding in the FEC block header illustrated in B of FIG. 59.

(3-3-3C): Padding=3, EXT=1, CRC=1

C of FIG. 59 illustrates an FEC block header configuration in the case where the padding length is three bytes (3B) and in the case where '1' is specified as an EXT flag and '1' is specified as a CRC flag.

In C of FIG. 59, '1' is specified as an EXT flag. Therefore, the next byte following the base header is an EXT byte. Because '1' is specified as a CRC flag in the fourth bit of this EXT byte, a one-byte (8-bit) CRC is added after the EXT byte.

Also, '10' is specified as a padding value in the base header. Therefore, the next two bytes following the CRC indicate the length of additional padding. Because '0' ('00000000 00000000') is specified here as a two-byte additional padding length, this indicates that no more padding is added.

As described above, padding of a total of three bytes (3B) is realized by a one-byte (1B) EXT byte and a two-byte (2B) additional padding length in the FEC block header illustrated in C of FIG. 59.

(3-3-3D): Padding=4, EXT=1, CRC=1

D of FIG. 60 illustrates an FEC block header configuration in the case where the padding length is four bytes (4B) and in the case where '1' is specified as an EXT flag and '1' is specified as a CRC flag.

In D of FIG. 60, '1' is specified as an EXT flag. Therefore, the next byte following the base header is an EXT byte. Because '1' is specified as a CRC flag in the fourth bit of this EXT byte, a one-byte (8-bit) CRC is added after the EXT byte.

Also, '10' is specified as a padding value in the base header. Therefore, the next two bytes following the CRC indicate the length of additional padding. Because '1' ('00000000 00000001') is specified here as a two-byte additional padding length, one-byte (1B) padding is added.

As described above, padding of a total of four bytes (4B) is realized by a one-byte (1B) EXT byte, a two-byte (2B) additional padding length, and one-byte (1B) additional padding in the FEC block header illustrated in D of FIG. 60.

A description has been described above of the FEC block header configurations of the third form. In this third form, in the case where a long code exists in the target standard, 13 bits are reserved for the base header of the FEC block header to support a short code whose maximum number of bits (Num Bits) is 11 or a middle code whose maximum number of bits is 13. In addition, it is possible to support a long code whose maximum number of bits (Num Bits) is 15 by using two bits of LEN_MSB in the EXT byte. In the case where a long code exists in the standard, and when the baseband frame size is a short or middle code, there is no need to use LEN_MSB of the EXT byte, thus creating an FEC block header with high efficiency.

(3-4) Fourth Form

Finally, a description will be given of configurations of an FEC block header (FBH) of a fourth form (hereinafter also denoted as form 4) with reference to FIGS. 61 to 63.

(FEC Block Header Format)

Figure 61:
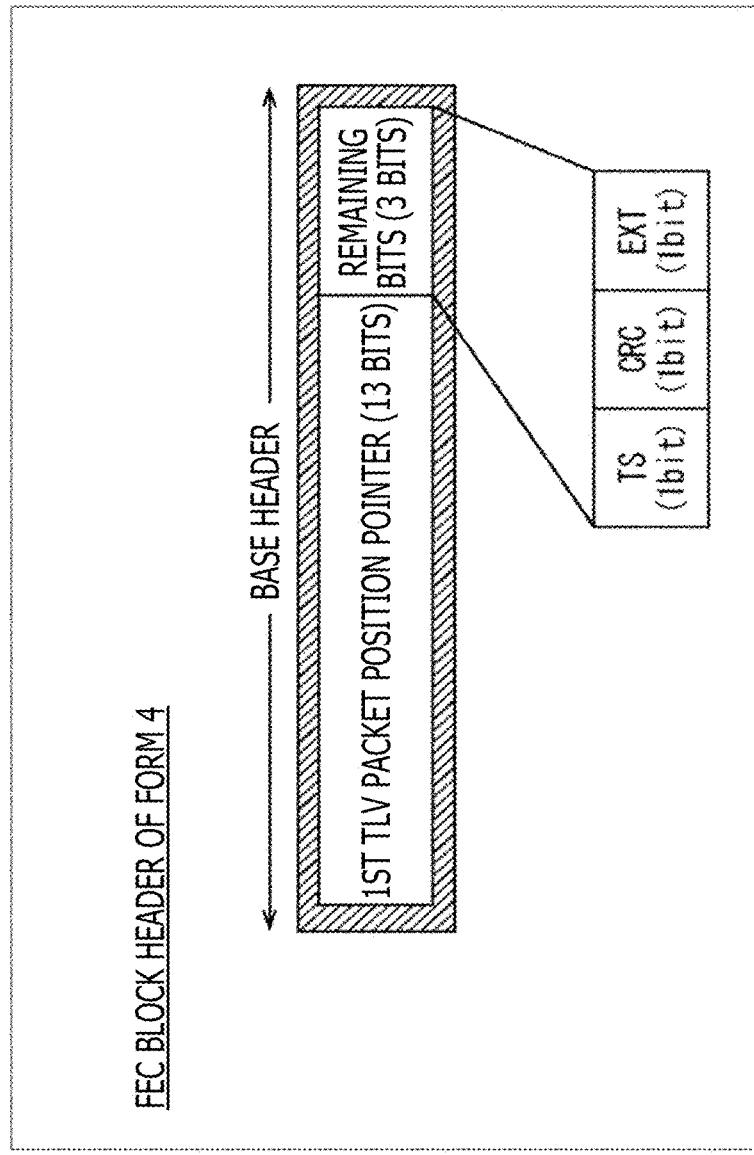
FIG. 61 is a diagram illustrating an example of an FEC block header format in form 4.

FIG. 61 is a diagram illustrating an example of an FEC block header format of form 4.

In FIG. 61, a two-byte base header includes a 13-bit first TLV packet position pointer, a one-bit TS flag, a one-bit CRC flag, and a one-bit EXT flag.

The first TLV packet position pointer is a pointer that indicates the position of the first TLV packet in the FEC block including the FEC block header in which the first TLV packet position pointer is provided.

The remaining three bits are assigned to the one-bit TS flag, the one-bit CRC flag, and the one-bit EXT flag. The details of the TS flag and the CRC flag are as described earlier.

Also, the EXT flag is a flag that indicates whether an extension field (Extension) exists. In the case where '1' is specified as an EXT flag, the byte following the base header is an EXT byte.

Figure 62:
FIG. 62 is a diagram illustrating an example of an EXT byte format in form 4.

FIG. 62 illustrates an example of an EXT byte format. In FIG. 62, the one-byte EXT byte includes a five-bit LEN_MSB, a two-bit padding value, and a one-bit reserved field.

Here, although, in FIGS. 31 to 33 described above, the number of bits (Num Bits) was the number of bits required to correspond to K_bch (B: byte), the number of bits (Num Bits) in the case of K_bch (bits) is as follows:

That is, in the case of a middle code whose code length is 69120 bits, when the coding rate is maximum at CR=14/16, the number of bits (Num Bits) is 16. Therefore, the maximum value of the first TLV packet position pointer is 16 bits.

Also, in the case of a long code whose code length is 276480 bits, when the coding rate is maximum at CR=14/16, the number of bits (Num Bits) is 18. Therefore, the maximum value of the first TLV packet position pointer is 18 bits.

Also, in the case of a short code whose code length is 17280 bits, when the coding rate is maximum at CR=14/16, the number of bits (Num Bits) is 14. Therefore, the maximum value of the first TLV packet position pointer is 14 bits.

As described above, in the case where bit notation (K_bch (bits)) is used rather than byte notation (K_bch (B: bytes)) as the number of bits (Num Bits), the maximum values of the first TLV packet position pointers are 18, 16, and 14 bits, respectively, in long, middle, and short codes. As a result, 13 bits assigned to the first TLV packet position pointers are not enough. The five bits of LEN_MSB are used to compensate for the lacking bits.

That is, a total of 18 bits being the sum of 13 bits assigned to the base header and five bits of LEN_MSB are used as a first TLV packet position pointer. It is possible to represent the first TLV packet position pointer in bit notation by assigning bits in this manner.

Specifically, in the case of a long code, all five bits of LEN_MSB are used, thus making a total of 18 bits available for the first TLV packet position pointer bits. Also, in the case of a middle code, of the five bits of LEN_MSB, three bits are used, thus making a total of 16 bits available. Also, in the case of a short code, of the five bits of LEN_MSB, one bit is used, thus making a total of 14 bits available.

That is, in the case of byte notation, 13 bits assigned to the base header are not enough for all of long, middle, and short codes. Therefore, the five bits of LEN_MSB are used to support the maximum value of the first TLV packet position pointer (18, 16, or 14 bits).

As a padding value, for example, a value corresponding to the content illustrated in FIG. 63 is specified. The padding values in this form 4 are similar to the contents of the padding values in the form 1 (FIG. 36) described above. Therefore, the description thereof is omitted here. The reserved field is a field for future use.

A description has been described above of the FEC block header configurations of the fourth form. In this fourth form, 18 bits are reserved for the base header of the FEC block header thanks to the base header of the FEC block header (13 bits) and LEN_MSB of the EXT byte (5 bits), thus making it possible to support a short code whose maximum number of bits (Num Bits) is 14, a middle code whose maximum number of bits is 16, and a long code whose maximum number of bits is 18. Therefore, in the case where a long code exists in the standard, it is possible to represent the first TLV packet position pointer in bit notation.

4. Time Information Transmission Timing of the Present Technology

Incidentally, frequency division multiplexing (FDM) is adopted as a scheme for broadcast signal multiplexing in current ISDB-T. Frequency division multiplexing (FDM) is also likely to be adopted in the next-generation digital terrestrial television broadcasting.

In the case where frequency division multiplexing (FDM) is adopted, a given frequency band (e.g., 6 MHz) is split into a plurality of segments for hierarchical transport that takes advantage of the band of one of the segments or those of the plurality of segments. In this case, for example, data of a different service can be transported for each layer that includes the one or the plurality of segments acquired by frequency division multiplexing.

That is, each layer is a unit that includes one or a plurality of segments grouped together. It should be noted that, in ISDB-T, OFDM segments are used. Here, in OFDM (Orthogonal Frequency Division Multiplexing), a number of orthogonal subcarriers are provided in a transport band for digital modulation. It should be noted that a layer (FDM layer) can be conceptually interpreted as a PLP (Physical Layer Pipe). In this case, a plurality of layers can also be said to be M-PLP (Multiple-PLP).

Also, in digital terrestrial television broadcasting, time information is transported for synchronization between the transmitting and receiving sides, thus allowing the transmission apparatus 20 and the reception apparatuses 30 to achieve synchronization.

Figure 64:
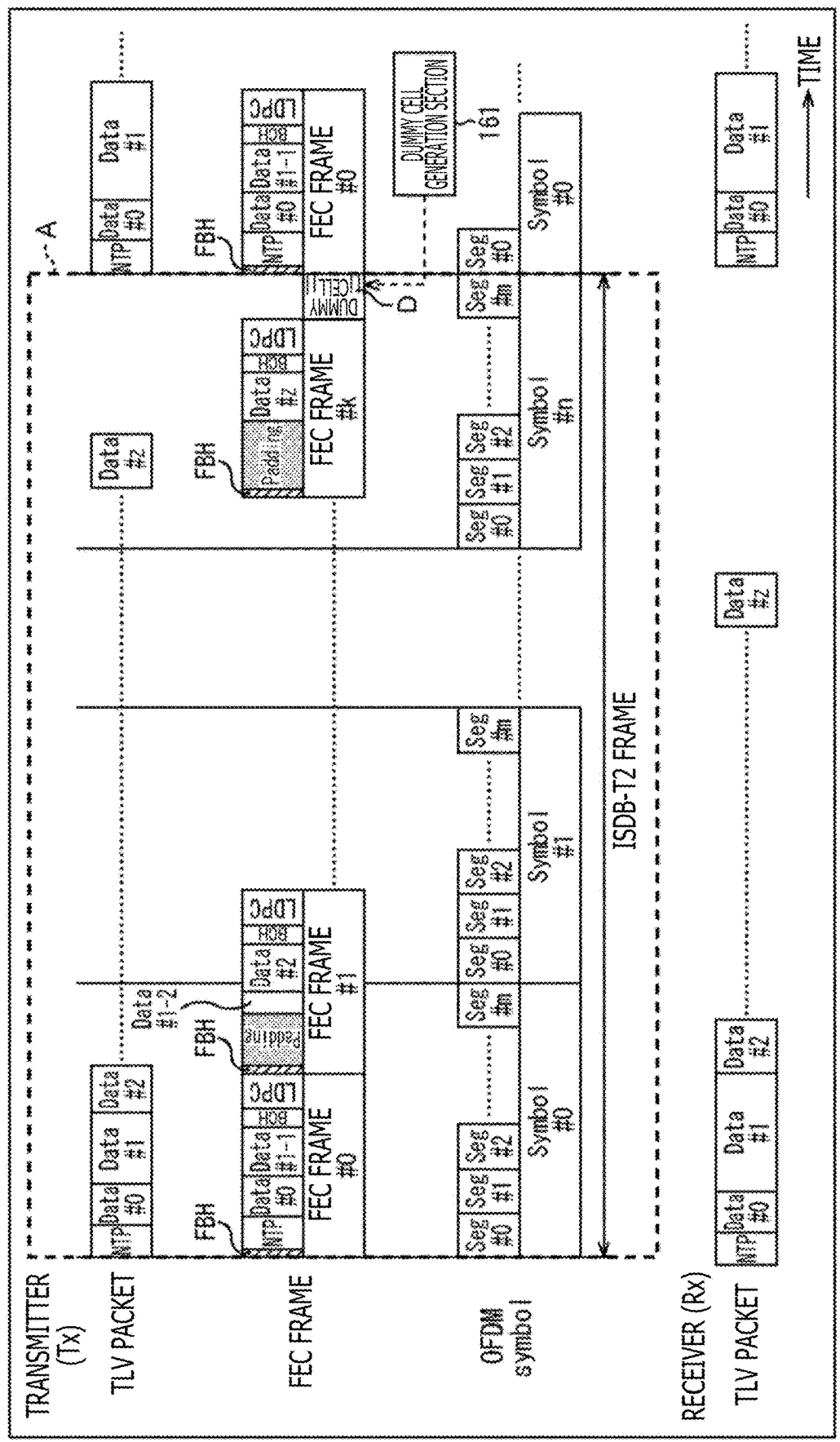
FIG. 64 is a diagram illustrating an example of a time information transmission timing.

FIG. 64 is a diagram illustrating an example of a time information transmission timing.

In FIG. 64, data processed by the transmission apparatus 20 is schematically depicted on the top, and data processed by the reception apparatus 30 is schematically depicted on the bottom. In FIG. 64, the horizontal direction represents time, and the direction of time is from left to right in the figure.

A description will be given first of data processed by the transmission apparatus 20.

The transmission apparatus 20 performs a necessary process on the TLV packet, thus acquiring an FEC frame that includes an FEC block with a BCH code and an LDPC code added thereto. Also, the transmission apparatus 20 performs a necessary process on the FEC frame, thus acquiring a physical layer frame (hereinafter referred to as an ISDB-T2 frame).

A TLV packet has a variable length and is, for example, 4 to 65536 bytes in size. TLV packets are depicted as "Data" in the figure. Also, NTP time information, time information in NTP (Network Time Protocol) format, is depicted as "NTP" in the figure.

The FEC frame includes an FEC block with a BCH code and an LDPC code added thereto. One ISDB-T2 frame includes k+1 FEC frames from FEC frame #0 to FEC frame #k. An FEC block header (FBH) is added at the beginning of each FEC frame. In the case where padding is inserted, padding having a given number of bytes is added after the FEC block header (FBH).

As described above, the FEC block header (FBH) includes a first TLV packet position pointer. Focusing here, for example, on Data #1 as a TLV packet, Data #1-1 and Data #1-2 are provided to spread across FEC frame #0 and FEC frame #1. Then, the first TLV packet position pointer included in the FEC block header (FBH) that is added at the beginning of the FEC frame #1 indicates the start position of the Data #2 provided after the Data #1-2 in the FEC frame #1.

OFDM symbols are depicted as "Symbol" in the figure. One ISDB-T2 frame includes n+1 OFDM symbols from Symbol #0 to Symbol #n. That is, this ISDB-T2 frame is an OFDM frame in units of which data is transported.

It should be noted, however, that in the case where frequency division multiplexing (FDM) is adopted as a scheme for broadcast signal multiplexing, an OFDM symbol is further split into segments. Segments are depicted as "Seg" in the figure. One OFDM symbol includes m+1 segments from Seg #0 to Seg #m.

Here, in the present technology, NTP time information is inserted in such a manner as to come at the beginning of the ISDB-T2 frame (to be precise, NTP time information is inserted after the FEC block header (FBH) added to the FEC frame #0, the first FEC frame). This NTP time information includes time of the beginning of the ISDB-T2 frame as time information prescribed in NTP.

It should be noted, however, that when one ISDB-T2 frame is formed by k+1 FEC frames, NTP time information is not always provided at the beginning of the ISDB-T2 frame. In such a case, it is possible to cause NTP time information to be inserted at the beginning of the next ISDB-T2 (the beginning of the FEC frame #0) frame by inserting a dummy cell D after the FEC frame #k, the last FEC frame included in a certain ISDB-T2 frame.

That is, in the transmission apparatus 20, in order to place NTP time information at the beginning of an ISDB-T2 frame as an OFDM frame, the dummy cell D is generated by a dummy cell generation section 161 as necessary and placed in the OFDM frame in which an FEC frame is provided. As a result, NTP time information is linked to the length of the ISDB-T2 frame as an OFDM frame.

As described above, focusing on what is inside a box 'A' in FIG. 64, NTP time information indicating the time of the start of an ISDB-T2 frame is inserted at the beginning of the ISDB-T2 frame in the transmission apparatus 20. However, there is a case in which a boundary between the FEC frames matches the boundary between the ISDB-T2 frames, and there is a case in which the two boundaries do not match. Then, in the case where the boundaries do not match, the position where NTP time information is inserted is displaced from the beginning of the ISDB-T2 frame. Therefore, the dummy cell D is inserted, thus allowing NTP time information to be inserted at the beginning of the ISDB-T2 frame.

A description will be given next of data processed by the reception apparatus 30.

The reception apparatus 30 performs a necessary process on the ISDB-T2 frame, thus acquiring TLV packets. Here, not only a plurality of TLV packets but also NTP time information provided at the beginning of the packets are acquired. This NTP time information indicates the time of the start of the ISDB-T2 frame.

Then, because the boundary between the ISDB-T2 frames and that between the FEC frames match, the reception apparatus 30 can recover a clock by referring to the time at the beginning of the ISDB-T2 frame indicated by the NTP time information inserted at the beginning of the ISDB-T2 frame.

As a result, clock synchronization is realized by the NTP time information between the transmission apparatus 20 on the transmitting side and the reception apparatus 30 on the receiving side, thus allowing the reception apparatus 30 to process the plurality of TLV packets (Data #0 to Data #z) for each piece of the NTP time information included at the beginning of the ISDB-T2 frame.

As described above, including, at the beginning of an ISDB-T2 frame, NTP time information indicating the start time of the ISDB-T2 frame ensures highly accurate and efficient transport of time information, thus allowing the reception apparatus 30 to achieve clock synchronization (clock recovery) by using the NTP time information.

5. Operation on the Transmitting and Receiving Sides

A description will be given next of the operation of the transmission apparatus 20 on the transmitting side and the reception apparatuses 30 on the receiving side with reference to the flowchart illustrated in FIG. 65.

Figure 65:
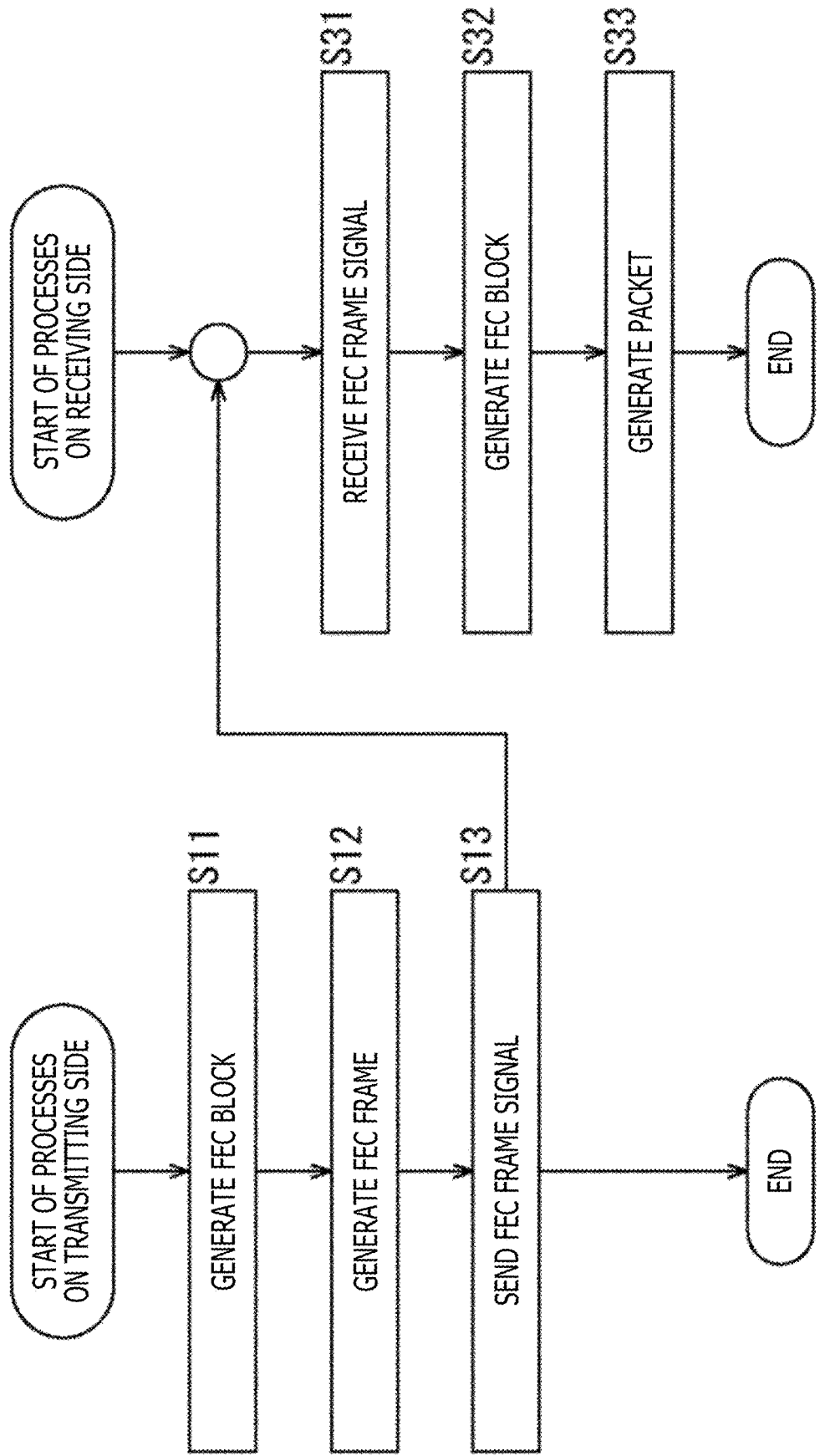
FIG. 65 is a flowchart describing operation on transmitting and receiving sides.

It should be noted that the processes from step S11 to step S13 illustrated in FIG. 65 are performed, for example, by the data processing section 211 and the modulation section 212 of the transmission apparatus 20 (FIG. 2). Also, the processes from step S31 to step S33 illustrated in FIG. 65 are performed, for example, by the demodulation section 312 and the data processing section 313 of the reception apparatus 30 (FIG. 3).

In step S11, the FEC block generation section 153 generates an FEC block by processing TLV packets input thereto. An FEC block header (FBH) including a TLV packet position pointer, a TS flag, and a CRC flag is inserted at the beginning of the FEC block.

In step S12, the FEC frame generation section 154 generates an FEC frame by processing the FEC block generated by the process in step S11.

In step S13, the modulation section 212 processes the FEC frame generated by the process in step S12 and sends the signal acquired from the FEC frame. As described above, the signal sent from the transmission apparatus 20 on the transmitting side is received by the reception apparatus 30 on the receiving side.

In step S31, the tuner 311 receives the signal acquired from the FEC frame.

In step S32, the demodulation section 312 generates an FEC block by processing the signal received by the process in step S31.

In step S33, the data processing section 313 generates TLV packets by processing the FEC block generated by the process in step S32. An FEC block header (FBH) including a TLV packet position pointer, a TS flag, and a CRC flag is inserted at the beginning of this FEC block.

Here, this TLV packet position pointer allows for reliable identification of the position of the first TLV packet in an FEC block and extraction of the TLV packets from the FEC block. The TLV packets acquired as described above are further processed by the reception apparatus 30 on the receiving side (the data processing section 313 thereof and the processing sections at later stages), thus allowing content such as broadcast programs to be reproduced.

A description has been given above of the operation on the transmitting and receiving sides.

6. Modification Example

Although, in the description given above, primary focus has been placed on ISDB (Integrated Services Digital Broadcasting), the scheme adopted in Japan and so on as a digital television broadcasting standard, the present technology may be applied to ATSC (Advanced Television Systems Committee), the scheme adopted in US and so on and DVB (Digital Video Broadcasting), the scheme adopted in European nations and so on.

Also, the present technology is applicable, as a digital television broadcasting standard, not only to terrestrial broadcasting but also to satellite broadcasting using a broadcasting satellite (BS) or communications satellite (CS), wired broadcasting using cable television (CATV), and other standards.

(Other Example of Packet and Signalling)

Also, the packet, frame, signalling (field thereof), and other names described above are merely examples, and there are cases in which other names may be used. It should be noted, however, that these differences in name are differences in formality and that there is no difference in substantial content of target packet, frame, signalling (field thereof), and so on.

For example, the TLV packet is an example of transport packet, and the transport packet includes, for example, an ALP (ATSC Link-Layer Protocol) packet, a GSE (Generic Stream Encapsulation) packet, both having a variable length, and so on. It should be noted that there are cases in which the frame and the packet are used to convey the same meaning.

(Other Example of Time Information)

In the description given above, a case has been described in which time information prescribed in NTP is used, the present technology is not limited thereto. For example, optional time information such as time information prescribed in PTP (Precision Time Protocol) and 3GPP (Third Generation Partnership Project), time information included in GPS (Global Positioning System), and other time information in a uniquely determined form can be used.

(Other Example of Transport Channel)

Also, the present technology is also applicable to a given standard (standard other than digital broadcasting standards) prescribed on the assumption that a transport channel other than a broadcasting network, i.e., for example, a communication line (communication network) such as the Internet or telephone network, is used as a transport channel. In that case, a communication line such as the Internet is used as a transport channel of the transport system 1 (FIG. 1), and the functions of the data processing apparatus 10 and the transmission apparatus 20 are provided by a communication server available on the Internet. Then, the communication server and the reception apparatuses 30 engage in bidirectional communication via the communication line.

7. Configuration of the Computer

Figure 66:
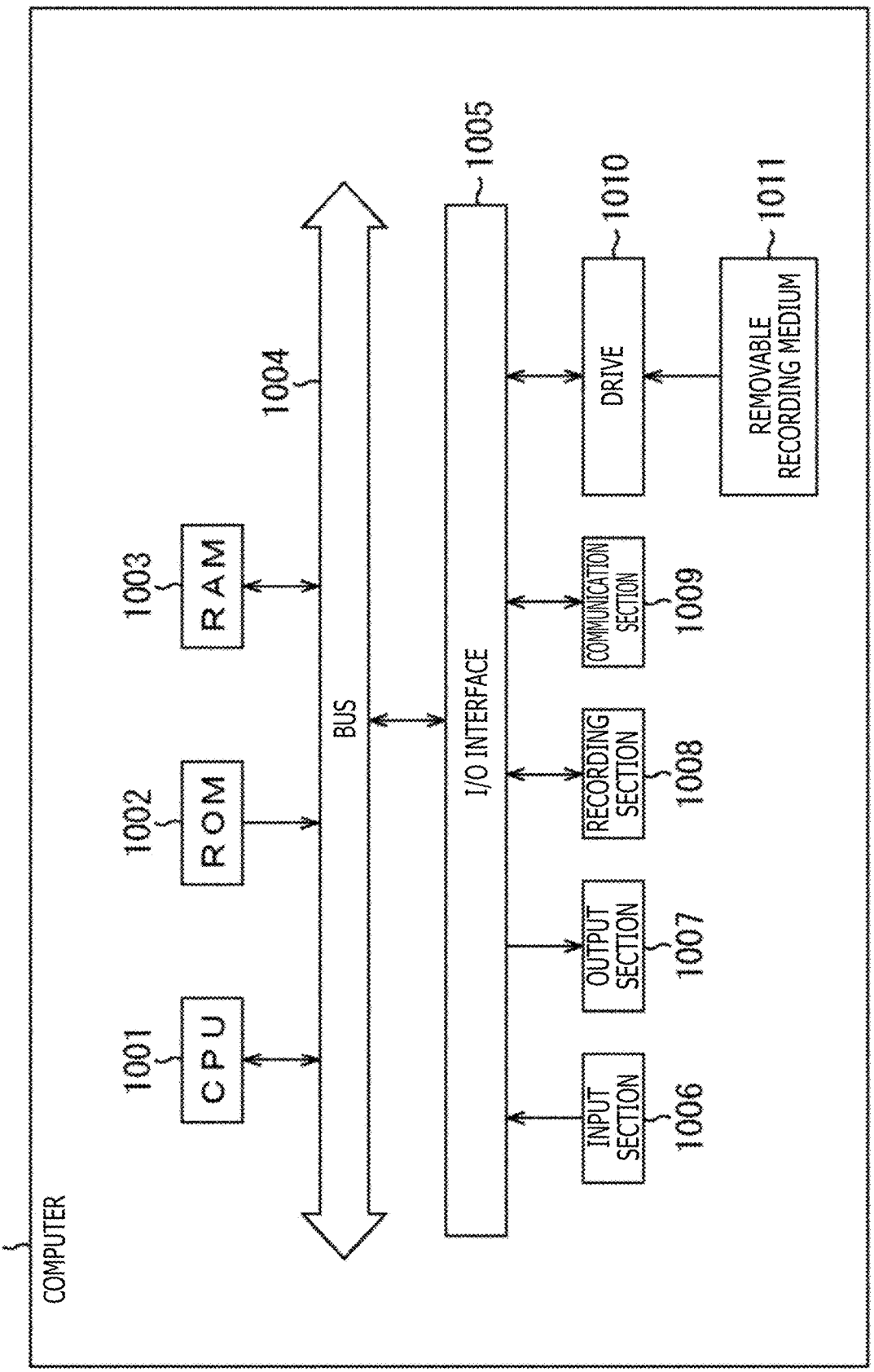
FIG. 66 is a block diagram illustrating a configuration example of a computer.

The series of processes described above may be performed by hardware or software. In the case where the series of processes are performed by software, the program included in the software is installed to a computer. FIG. 66 is a diagram illustrating a hardware configuration example of a computer for performing the above series of processes using the program.

In a computer 1000, a CPU (Central Processing Unit) 1001, a ROM (Read Only Memory) 1002, and a RAM (Random Access Memory) 1003 are connected to each other by a bus 1004. An I/O interface 1005 is further connected to the bus 1004. An input section 1006, an output section 1007, a recording section 1008, a communication section 1009, and a drive 1010 are connected to the I/O interface 1005.

The input section 1006 includes a keyboard, a mouse, a microphone, and so on. The output section 1007 includes a display, a speaker, and so on. The recording section 1008 includes a hard disk, a non-volatile memory, and so on. The communication section 1009 includes a network interface and so on. The drive 1010 drives a removable recording medium 1011 such as magnetic disk, optical disc, magneto-optical disk, or semiconductor memory.

In the computer 1000 configured as described above, the CPU 1001 loads, for example, the program recorded in the ROM 1002 or the recording section 1008 into the RAM 1003 via the I/O interface 1005 and the bus 1004 for execution, thereby allowing the above series of processes to be performed.

The program executed by the computer 1000 (CPU 1001) can be provided recorded, for example, in the removable recording medium 1011 as a packaged medium or the like. Alternatively, the program can be provided via a wired or wireless transport medium such as local area network, the Internet, and digital satellite broadcasting.

In the computer 1000, the program can be installed to the recording section 1008 via the I/O interface 1005 by inserting the removable recording medium 1011 into the drive 1010. Alternatively, the program can be received by the communication section 1009 via a wired or wireless transport medium and installed to the recording section 1008. In addition to the above, the program can be installed, in advance, to the ROM 1002 or the recording section 1008.

Here, in the present specification, the processes performed by the computer in accordance with the program need not necessarily be performed chronologically in accordance with the sequence described as a flowchart. That is, the processes performed by the computer in accordance with the program include those that are performed in parallel or individually (e.g., parallel processes or object-based processes). Also, the program may be processed by a single computer (processor) or by a plurality of computers in a distributed manner.

It should be noted that embodiments of the present technology are not limited to that described above and can be modified in various ways without departing from the gist of the present technology.

It should be noted that the effects described in the present specification are merely illustrative and are not limited and that there may be other effects.

Further, the present technology can also have the following configurations:

(1)

A transmission apparatus including:

a first generation section adapted to generate an FEC (Forward Error Correction) block on the basis of an input packet or an input stream;

a second generation section adapted to generate an FEC frame on the basis of the FEC block; and a transmission section adapted to transmit the FEC frame, in which a header of the FEC block includes type identification information identifying a type of the input packet or the input stream, information detecting a header error, and a minimum fixed length header having start position information of the input packet or the input stream stored in a payload of the FEC frame.

(2)

The transmission apparatus of feature (1), in which in the case where the type identification information is a TLV (Type Length Value) packet, the minimum fixed length header includes minimum fixed length identification information used to identify whether or not an input packet length of an input packet is a minimum fixed length and a minimum input packet length as information regarding the input packet length.

(3)

The transmission apparatus of feature (2), in which in the case where the minimum fixed length identification information indicates that the input packet length is not the minimum fixed length, the header includes not only the minimum fixed length header but also a variable length header, and when lower bits of the input packet length are minimum input packet length information indicating the minimum input packet length, the variable length header includes variable length packet length information that includes higher bits of the input packet length.

(4)

The transmission apparatus of any one of features (1) to (3), further including:

a third generation section adapted to generate a dummy cell for arranging time information at a beginning of an OFDM (Orthogonal Frequency Division Multiplexing) frame in which the FEC frame is provided.

(5)

A transmission method including:

generating an FEC block on the basis of an input packet or an input stream;

generating an FEC frame on the basis of the FEC block; and transmitting the FEC frame, in which a header of the FEC block includes type identification information identifying a type of the input packet or the input stream, information detecting a header error, and a minimum fixed length header having start position information of the input packet or the input stream stored in a payload of the FEC frame.

(6)

A reception apparatus including:

a reception section adapted to receive an incoming signal including an FEC frame;

a first generation section adapted to generate an FEC block on the basis of the received FEC frame; and a second generation section adapted to generate an input packet or an input stream on the basis of the FEC block, in which a header of the FEC block includes type identification information for identifying a type of the input packet or the input stream and a minimum fixed length header having start position information of the input packet or the input stream stored in a payload of the FEC frame.

(7)

The reception apparatus of feature (6), in which in the case where the type identification information is a TLV packet, the minimum fixed length header includes, in addition to the type identification information, minimum fixed length identification information used to identify whether or not an input packet length of the input packet is a minimum fixed length and a minimum input packet length as information regarding the input packet length.

(8)

The reception apparatus of feature (7), in which in the case where the minimum fixed length identification information indicates that the input packet length is not the minimum fixed length, the header includes not only the minimum fixed length header but also a variable length header, and when lower bits of the input packet length are minimum input packet length information indicating the minimum input packet length, the variable length header includes variable length packet length information that includes higher bits of the input packet length.

(9)

The reception apparatus of any one of features (6) to (8), in which by inserting a dummy cell in an OFDM frame in which the FEC frame is provided, time information is arranged at a beginning of the OFDM frame.

(10)

A reception method including:

receiving an incoming signal including an FEC frame;

generating an FEC block on the basis of the received FEC frame; and generating an input packet or an input stream on the basis of the FEC block, in which a header of the FEC block includes type identification information for identifying a type of the input packet or the input stream and a minimum fixed length header having start position information of the input packet or the input stream stored in a payload of the FEC frame.

REFERENCE SIGNS LIST

1 Transport system, 10, 10-1 to 10-N Data processing apparatuses, 20 Transmission apparatus, 30, 30-1 to 30-M Reception apparatuses, 40, 40-1 to 40-N Communication lines, 50 Broadcast transport channel, 111 Component processing section, 112 Signalling generation section, 113 Multiplexer, 114 Data processing section, 151 TLV packet generation section, 152 TS packet processing section, 153 FEC block generation section, 154 FEC frame generation section, 161 Dummy cell generation section, 211 Data processing section, 212 Modulation section, 311 Tuner, 312 Demodulation section, 313 Data processing section

The invention claimed is:

1. A transmission apparatus comprising:

processing circuitry configured to generate an FEC (Forward Error Correction) block on a basis of an input packet or an input stream, and generate an FEC frame on a basis of the FEC block; and a transmitter configured to transmit the FEC frame, wherein a header of the FEC block includes type identification information that identifies a type of the input packet or the input stream, information for detecting a header error, and a minimum fixed length header that includes start position information of the input packet or the input stream stored in a payload of the FEC frame, and in a case where the type identification information is a TLV (Type Length Value) packet, the minimum fixed length header includes minimum fixed length identification information used to identify whether or not an input packet length of the input packet is a minimum fixed length and a minimum input packet length as information regarding the input packet length.

2. The transmission apparatus of claim 1, wherein in a case where the minimum fixed length identification information indicates that the input packet length is not the minimum fixed length, the header includes not only the minimum fixed length header but also a variable length header, and when first bits of the input packet length are minimum input packet length information indicating the minimum input packet length, the variable length header includes variable length packet length information that includes second bits of the input packet length, the second bits of the input packet length being higher than the first bits of the input packet length.

3. The transmission apparatus of claim 1, wherein the processing circuitry is configured to
generate a dummy cell for arranging time information at a beginning of an OFDM (Orthogonal Frequency Division Multiplexing) frame in which the FEC frame is provided.

4. A transmission method comprising:
generating an FEC block on a basis of an input packet or an input stream;
generating, by processing circuitry, an FEC frame on a basis of the FEC block; and
transmitting the FEC frame, wherein
a header of the FEC block includes type identification information identifying a type of the input packet or the input stream, information for detecting a header error, and a minimum fixed length header including start position information of the input packet or the input stream stored in a payload of the FEC frame, and
in a case where the type identification information is a TLV (Type Length Value) packet, the minimum fixed length header includes minimum fixed length identification information used to identify whether or not an input packet length of the input packet is a minimum fixed length and a minimum input packet length as information regarding the input packet length.

5. The transmission method of claim 4 wherein
in a case where the minimum fixed length identification information indicates that the input packet length is not the minimum fixed length, the header includes not only the minimum fixed length header but also a variable length header, and
when first bits of the input packet length are minimum input packet length information indicating the minimum input packet length, the variable length header includes variable length packet length information that includes second bits of the input packet length, the second bits of the input packet length being higher than the first bits of the input packet length.

6. The transmission method of claim 4, further comprising:
generating a dummy cell for arranging time information at a beginning of an OFDM (Orthogonal Frequency Division Multiplexing) frame in which the FEC frame is provided.

7. A reception apparatus comprising:
a receiver configured to receive an incoming signal including an FEC frame; and
processing circuitry configured to
generate an FEC block on a basis of the received FEC frame, and
generate an input packet or an input stream on a basis of the FEC block, wherein a header of the FEC block includes type identification information for identifying a type of the input packet or the input stream and a minimum fixed length header having start position information of the input packet or the input stream stored in a payload of the FEC frame, and in a case where the type identification information is a TLV (Type Length Value) packet, the minimum fixed length header includes minimum fixed length identification information used to identify whether or not an input packet length of the input packet is a minimum fixed length and a minimum input packet length as information regarding the input packet length.

8. The reception apparatus of claim 7, wherein
in a case where the minimum fixed length identification information indicates that the input packet length is not the minimum fixed length, the header includes not only the minimum fixed length header but also a variable length header, and
when first bits of the input packet length are minimum input packet length information indicating the minimum input packet length, the variable length header includes variable length packet length information that includes second bits of the input packet length, the second bits of the input packet length being higher than the first bits of the input packet length.

9. The reception apparatus of claim 7, wherein
by inserting a dummy cell in an OFDM frame in which the FEC frame is provided, time information is arranged at a beginning of the OFDM frame.

10. A reception method comprising:
receiving an incoming signal including an FEC frame;
generating an FEC block on a basis of the received FEC frame; and
generating, by processing circuitry, an input packet or an input stream on a basis of the FEC block, wherein
a header of the FEC block includes type identification information for identifying a type of the input packet or the input stream and a minimum fixed length header having start position information of the input packet or the input stream stored in a payload of the FEC frame, and
in a case where the type identification information is a TLV (Type Length Value) packet, the minimum fixed length header includes minimum fixed length identification information used to identify whether or not an input packet length of the input packet is a minimum fixed length and a minimum input packet length as information regarding the input packet length.

11. The reception method of claim 10, wherein
in a case where the minimum fixed length identification information indicates that the input packet length is not the minimum fixed length, the header includes not only the minimum fixed length header but also a variable length header, and
when first bits of the input packet length are minimum input packet length information indicating the minimum input packet length, the variable length header includes variable length packet length information that includes second bits of the input packet length, the second bits of the input packet length being higher than the first bits of the input packet length.

12. The reception method of claim 10, wherein
by inserting a dummy cell in an OFDM frame in which the FEC frame is provided, time information is arranged at a beginning of the OFDM frame.

* * * * *